United States Patent [19]
Giorgianni et al.

[11] Patent Number: 5,609,978
[45] Date of Patent: Mar. 11, 1997

[54] METHOD FOR PRODUCING AN ELECTRONIC IMAGE FROM A PHOTOGRAPHIC ELEMENT

[75] Inventors: Edward J. Giorgianni, Rochester; Brian E. Mittelstaedt, W. Henrietta; Jose E. Rivera; Richard A. Simon, both of Rochester, all of N.Y.; Teresa A. Smith, Watertown, Mass.; James E. Sutton, Rochester, N.Y.

[73] Assignee: Eastman Kodak Company, Rochester, N.Y.

[21] Appl. No.: 466,862

[22] Filed: Jun. 6, 1995

[51] Int. Cl.⁶ .................... G03F 3/10; G03C 1/08
[52] U.S. Cl. .............. 430/30; 430/502; 430/503; 430/505; 430/506; 430/507; 430/508; 430/509; 430/510; 358/531; 358/527; 358/505; 358/506; 358/515; 358/518
[58] Field of Search ................... 358/531, 527, 358/505, 506, 515, 518; 430/502, 503, 505, 506, 507, 508, 509, 510, 30

[56] References Cited

U.S. PATENT DOCUMENTS 5,389,506 2/1995 Sutton .................. 430/509
5,391,443 2/1995 Simons et al. ............ 430/21

Primary Examiner—Mark F. Huff
Attorney, Agent, or Firm—Raymond L. Owens

[57] ABSTRACT

A photographic element, is disclosed which includes a support and at least three silver halide emulsion layers, that records exposure information. The exposure information is recorded in three image-recording units and wherein the spectral sensitivities of said image-recording units are chosen such that the average color error, $\overline{\Delta E^*}_{ab}$, is less than or equal to 3.1. $\overline{\Delta E^*}_{ab}$ is computed for a specified set of test colors of known spectral reflectance, and the light source is specified as $D_{65}$. $\overline{\Delta E^*}_{ab}$ is the average CIE 1976 (L*a*b*) $\Delta E^*_{ab}$ between the CIE 1976 (L*a*b*)-space coordinates of said test colors and the CIE 1976 (L*a*b*)-space coordinates corresponding to transformed exposure signals. The transformed exposure signals are formed by applying an exposure-space matrix to the exposure signals derived from the photographic element to transform the derived exposure signals to exposure signals corresponding to the color-matching functions of the CCIR Recommendation 709 primary set. The exposure-space matrix is derived so as to minimize $$\sum_{i=1}^{190} (\Delta E^*_{ab_i})^2,$$

and noise-gain factor, $\Psi$, defined as the sum of the square roots of the sum of the squares of each row of the elements in the exposure space matrix is less than or equal to 6.5.

19 Claims, 8 Drawing Sheets

METHOD FOR PRODUCING AN ELECTRONIC IMAGE FROM A PHOTOGRAPHIC ELEMENT

CROSS-REFERENCE TO RELATED APPLICATION

Reference is made to commonly-assigned U.S. patent application Ser. No. 08/469,062 filed Jun. 6, 1995 entitled "Photographic Elements Which Achieve Colorimetrically Accurate Recording" by Giorgianni et al, the disclosure of which is incorporated herein.

FIELD OF THE INVENTION

The present invention relates to a method of producing an electronic image using photographic elements whose spectral sensitivities are chosen to achieve specific color reproduction and noise performance.

BACKGROUND OF THE INVENTION

In classical black-and-white photography a photographic element containing a silver halide emulsion layer coated on a transparent film support is imagewise exposed to light. This produces a latent image within the emulsion layer. The film is then photographically processed to transform the latent image into a silver image that is a negative image of the subject photographed. Photographic processing involves developing (reducing silver halide grains containing latent image sites to silver), stopping development, and fixing (dissolving undeveloped silver halide grains). The resulting processed photographic element, commonly referred to as a negative, is placed between a uniform exposure light source and a second photographic element, commonly referred to as a photographic paper, containing a silver halide emulsion layer coated on a white paper support. Exposure of the emulsion layer of the photographic paper through the negative produces a latent image in the photographic paper that is a positive image of the subject originally photographed. Photographic processing of the photographic paper produces a positive silver image. The image bearing photographic paper is commonly referred to as a print.

In a well known, but much less common, variant of classical black-and-white photography a direct positive emulsion can be employed, so named because the first image produced on processing is a positive silver image, obviating any necessity of printing to obtain a viewable positive image. Another well known variation, commonly referred to as instant photography, involves imagewise transfer of silver ion to a physical development site in a receiver to produce a viewable transferred silver image.

In classical color photography the photographic element contains three superimposed silver halide emulsion layer units, one for forming a latent image corresponding to blue light (i.e., blue) exposure, one for forming a latent image corresponding to green exposure and one for forming a latent image corresponding to red exposure. During photographic processing, developing agent oxidized upon reduction of latent image containing grains reacts to produce a dye image with developed silver being an unused product of the oxidation-reduction development reaction. Silver is removed by bleaching and fixingduring photographic processing. The image dyes are complementary subtractive primaries—that is, yellow, magenta and cyan dye images are formed in the blue, green and red image recording units, respectively. This produces negative dye images (i.e., blue, green and red subject features appear yellow, magenta and cyan, respectively). Exposure of color paper through the color negative followed by photographic processing produces a positive color print. Again, bleaching and fixing remove developed silver and residual silver halide that would otherwise adversely affect the color print.

In one common variation of classical color photography reversal processing is undertaken to produce a positive dye image in the color photographic element, commonly referred to as a slide, the image typically being viewed by projection. In another common variation, referred to as color image transfer or instant photography, image dyes are transferred to a receiver for viewing.

In each of the classical forms of photography noted above the final image is intended to be viewed by the human eye. Thus, the conformation of the viewed image to the subject image, absent intended aesthetic departures, is the criterion of photographic success.

It is well known to those skilled in the art that the colors reproduced on, or produced from, a photographic color-imaging element generally are not colorimetric matches of the colors originally photographed by the element. Colorimetric errors can be caused by the color recording and color reproduction properties of the photographic element and system. The distinction between the color recording and color reproduction properties of a photographic element is fundamental. Color recording by a photographic element is determined by its spectral sensitivity. The spectral sensitivity of a photographic element is a measure of the amount of exposure of a given wavelength required to achieve a specific photographic response. Color reproduction by a photographic imaging system depends not only on the color recording properties of the capturing element as described above, but also on all subsequent steps in the image forming process. The color reproduction properties of the imaging element or system can vary the gamma, color saturation, hue, etc. but cannot fully compensate for problems caused by spectral sensitivities which are not correlates of the human visual system. Metamers are an example of such a problem. Metamerism occurs when two stimuli with different spectral reflectance appear identical to the eye under a specific illuminant. A photographic element whose spectral sensitivities differ from that of the human visual system record the stimuli differently. Once recorded as disparate, a photographic element's color reproduction will only amplify or minimize that difference.

In certain applications, it is desirable to form image representations that correspond more closely to the colorimetric values of the colors of the original scene recorded on the photographic color-imaging element rather than form image representations which correspond to the reproductions of those colors by the element itself. Examples of such applications include, but are not limited to, the production of medical and other technical images, product catalogues, magazine advertisements, artwork reproductions, and other applications where it is desirable to obtain color information which is a colorimetrically accurate record of the colors of the original scene. In these applications, the alterations in the color reproduction of the original scene colors by the color recording and color reproduction properties of the imaging element are undesirable.

To achieve absolute colorimetric accuracy during recording, the photographic element's spectral sensitivity must be color-matching functions. Color-matching functions are defined as the amounts of three linearly independent color stimuli (primaries) required to match a series of monochromatic stimuli of equal radiant power at each wavelength of the spectrum. A set of three color stimuli is linearly independent when none of the stimuli can be matched by a mixture of the other two. Negative amounts of a color stimulus are routine in color-matching functions and are interpreted as the amount of that color stimulus which would be added to the color being matched and not to the mixture itself. Color-matching functions for any real set of primaries must have negative portions. It is possible to functionally transform from one set of color-matching functions to any other set of color-matching functions using a simple linear transformation. By using the color-matching functions which correspond to the primaries of the intended output device or medium as the photographic element's spectral sensitivities, no additional color signal processing is necessary.

The selection of spectral sensitivities for colorimetric recording is based on the primaries of the imaging system in question. The primaries in a photographic system are defined by the imaging dyes of the element used to form the final reproduction of the recorded image, the spectral composition of which is all positive. Color-matching functions for a set of all-positive primaries contain negative responses. Within the realm of known photographic mechanisms, it is not possible to produce a photographic element having spectral sensitivities whose response is negative.

To date, no available photographic system has been developed which has spectral sensitivities which approximate a set of color-matching functions or a linearly combination thereof. Numerous ranges of spectral sensitization have been claimed for specific color reproduction advantage, but none approximate color-matching functions as spectral sensitivities and therefore do not have colorimetrically accurate color recording or reproduction.

A photographic element could be built using all-positive color-matching functions as spectral sensitivities, but these color-matching functions would not correspond to the primaries of the photographic system. Those skilled in the art will recognize that linear exposure-space signal processing (matrixing) would be required to transform the linear exposures recorded by all-positive color-matching-function spectral sensitivities to the linear exposures corresponding to the display primaries of the system. The signal processing available in photographic elements, however, is inherently non-linear in nature, i.e. it operates in what is effectively a log-exposure space, rather than a linear-exposure space. For example, the amount of chemical signal processing (hereafter referred to as interlayer interimage) produced by a dye-forming layer of a photographic element is essentially proportional to the amount of silver developed and/or the amount of image dye formed in that layer; and both silver development and dye formation are in turn essentially proportional to the logarithm of the exposure of that layer, rather than to the exposure. Color correction may also be produced by other methods. For example, colored dye-forming couplers can be used (in negative working and other intermediary photographic elements), and the hues of the image-forming dyes themselves can be adjusted. The color correction produced by these methods, however, is also logarithmic in nature and not of the linear type required in order to use color-matching-function spectral sensitivities.

If a conventional photographic element were to be built with all-positive color-matching functions, the preferred choice of spectral sensitivities would be an all-positive set with minimum overlap. David L. MacAdam derived a set of single-peaked all-positive functions with minimum overlap which very closely approximate color-matching functions. By minimizing the overlap of the spectral sensitivities, competition for light between image recording units during imagewise exposure and the amount of interimage required is minimized. Use of the MacAdam sensitivities reduces the problems encountered with spectral sensitivities which are color-matching functions but not sufficiently to make the use of such sensitivities practical in a conventional photographic element.

Further, the inter-record chemical interactions available in photographic chemistry are limited in their ability to address individual records. For example, it is difficult to affect a chemical interaction from layer A to layer C, if layer B is located between them, without affecting layer B. Inter-record chemical interactions are useful in correcting for the effects of unwanted absorptions of the imaging dyes and optical crosstalk, but the control of their magnitude and specificity is limited.

For these reasons, conventional photographic elements require spectral sensitivities which differ significantly from color-matching functions. The spectral sensitivities used in conventional photographic systems are designed to minimize the need for linear-space signal processing (color correction) because such color correction is not available from chemical color-correction mechanisms. Conventional photographic elements are therefore not well suited for applications in which the photographic elements of the present invention are intended.

References can also be found in the prior art suggesting the use of spectral sensitivities for various purposes which differ from conventional sensitivities but which do not reasonably approximate color-matching functions. For example, U.S. Pat. No. 3,672,898 entitled MULTICOLOR SILVER HALIDE PHOTOGRAPHIC MATERIAL AND PROCESSES by J. Schwan and J. Graham describes photographic elements incorporating red, green, and blue spectral sensitivities of specified peak wavelengths and specified ranges of spectral widths which provide good color rendition and acceptable neutrals under a variety of illuminants such as sunlight, tungsten or fluorescent.

U.S. Pat. No. 5,180,657 entitled COLOR PHOTOGRAPHIC LIGHT-SENSITIVE MATERIAL OFFERING EXCELLENT HUE REPRODUCTION by F. Fukazawa et al describes photographic elements incorporating red, green, and blue spectral sensitivities with specified ranges of peak wavelengths and increased levels of interlayer interimage for improved color reproduction, particularly of colors of certain difficult-to-reproduce hues.

In each of these and other related patents and applications, the photographic element spectral sensitivities, described by various ranges of peak locations and widths, do not reasonably approximate sets of color-matching functions. In order to achieve acceptable color reproduction, either directly or from subsequent imaging processes, the spectral sensitivities of the photographic elements described in these patents represent compromises constrained by the type and amount of color correction available within the conventional photographic system. These compromises result in a colorimetrically inaccurate recording of original scene colors, in the form of an exposed latent image.

Further, much of the prior art for the spectral sensitivity ranges of photographic elements specifies the response of the respective image recording units independently and a selection of any set of three in no way assures that the resultant photographic element's sensitivity will yield colorimetrically accurate recording or be satisfactory for a given set of imaging chemistry. The specification of a test method for evaluating color recording is necessary to ensure that the set of spectral sensitivities chosen will deliver the required performance.

It is well known and typical in the photographic an to judge the color reproduction of films and film-based systems using human judgments of a limited number of colors (whether in patch form or contained in an image). The selection of colors used, images selected for judgment, and individual preferences play a role in the judgment of color reproduction and therefore cannot lead to a definitive measure of film's or imaging system's colorimetric capabilities. To definitively differentiate between the color reproduction capabilities of various spectral sensitivities, a quantitative measure is required.

Quantitative measures based on correlation of spectral sensitivities to a set of color-matching functions have been proposed. The ability to predict color recording capabilities of a photographic element based on the correlation of its spectral sensitivities to color-matching functions is limited, as discussed by F. R. Clapper in *The Theory of the Photographic Process*, T. H. James, 4th Ed., Macmillan, N.Y., 1977, Chapter 19, Section D, pp. 566–571. Clapper points out that such a correlation is unable to differentiate the colorimetric accuracy of sets of spectral sensitivities which have equal correlation to color-matching functions but significantly different color recording properties. Therefore, a quantitative measure which will more effectively differentiate the colorimetric recording capabilities of various sets of spectral sensitivities in commonly encountered imaging situations is required. Such a quantitative measure requires the specification of the illumination source, test colors, and the metric to be calculated. The distribution of test colors are selected such that they are evenly distributed in color space, and have spectral reflectance representative of the colors typically encountered in imaging.

The following is a color test which meets all the aforementioned criteria, quantifies the colorimetric accuracy of a photographic element (or system), differentiates between the colorimetric capabilities of various photographic element spectral sensitivities, and simulates typical imaging conditions with colors which are distributed in color space and whose spectral reflectance is representative of real-world surface colors. For the test, color accuracy is judged according to the value of $\overline{\Delta E^*}_{ab}$. $\overline{\Delta E^*}_{ab}$ is the average CIE 1976 (L*a*b*) color difference, $\Delta E^*_{ab}$, between the CIE 1976 (L*a*b*)-space (CIELAB space) coordinates of the test colors and the CIE 1976 (L*a*b*)-space coordinates corresponding to a specific transformation of the exposure signals recorded by the photographic element. $\overline{\Delta E^*}_{ab}$ computed for a specified set of colors of known spectral reflectance using a $D_{65}$ illuminant. $D_{65}$ is a CIE standard illuminant which is specified to be representative of a daylight source with a correlated color temperature of 6500° K. The exposure signals are calculated using the measured spectral sensitivity of the photographic element. The exposure signals are transformed using a 3×3 matrix, Matrix M (applied in (linear) exposure space). The 3×3 exposure matrix is derived to minimize $$\sum_i (\Delta E^*_{ab_i})^2$$

using standard regression techniques. The test colors consist of 190 entires of known spectral reflectance specified at 10 nm increments (see Appendix A).

The foregoing discussion is mathematically described as follows: The red, green, and blue record relative exposures captured by the photographic element for the $i^{th}$ color ($H_{red_i}$, $H_{grn_i}$, $H_{blu_i}$, respectively) are calculated as:

$$H_{red_i} = n_{red} \int_{380}^{730} S(\lambda) \cdot R_i(\lambda) \cdot I_{red}(\lambda) d\lambda$$

$$H_{grn_i} = n_{grn} \int_{380}^{730} S(\lambda) \cdot R_i(\lambda) \cdot I_{grn}(\lambda) d\lambda$$

$$H_{blu_i} = n_{blu} \int_{380}^{730} S(\lambda) \cdot R_i(\lambda) \cdot I_{blu}(\lambda) d\lambda$$

where red, grn, blu designate the records of the photographic element, $S_\lambda$ is the spectral power output of the illuminant, $D_{65}$ $R_\lambda$ is the spectral reflectance of the $i^{th}$ test color $I_\lambda$ is the measured spectral sensitivity of the photographic element, and $$I_\lambda = \frac{1}{E_\lambda}$$

where $E_\lambda$ is the narrow bandwidth exposure of peak wavelength $\lambda$, required to achieve a defined density in the photographically processed photographic element, and values of $n_{red}$, $n_{grn}$, and $n_{blu}$ are determined such that $$n_{red} = 1/\int_{380}^{730} S(\lambda) \cdot I_{red}(\lambda) d\lambda$$

$$n_{grn} = 1/\int_{380}^{730} S(\lambda) \cdot I_{grn}(\lambda) d\lambda$$

$$n_{blu} = 1/\int_{380}^{730} S(\lambda) \cdot I_{blu}(\lambda) d\lambda$$

From the CIE 1931 system, the aim tristimulus values for the $i^{th}$ color patch, $X_{aim_i}$, $Y_{aim_i}$, and $Z_{aim_i}$, are computed:

$$X_{aim_i} = k \int_{380}^{730} S(\lambda) \cdot R_i(\lambda) \cdot \bar{x}(\lambda) d\lambda$$

$$Y_{aim_i} = k \int_{380}^{730} S(\lambda) \cdot R_i(\lambda) \cdot \bar{y}(\lambda) d\lambda$$

$$Z_{aim_i} = k \int_{380}^{730} S(\lambda) \cdot R_i(\lambda) \cdot \bar{z}(\lambda) d\lambda$$

where:

$$k = 100/\int_{380}^{730} S(\lambda) \cdot \bar{y}(\lambda) d\lambda, \text{ and } \bar{x}(\lambda), \bar{y}(\lambda), \text{ and } \bar{z}(\lambda)$$

are the CIE 1931 color-matching functions.

All mathematical integrations are performed over the range from to 730 nm as discussed by R. W. G. Hunt in *Measuring Color*, John Wiley and Sons, New York, Chapter 2, pg. 50.

The aim CIELAB values ($L^*_{aim_i}$, $a^*_{aim_i}$, $b^*_{aim_i}$) of the $i^{th}$-color patch are computed:

$$L^*_{aim_i} = 116 \cdot (X_{aim_i}/Y_n)^{1/3} - 16$$

$$a^*_{aim_i} = 500 \cdot [(X_{aim_i}/X_n)^{1/3} - (Y_{aim_i}/Y_n)^{1/3}]$$

$$b^*_{aim_i} = 200 \cdot [(Z_{aim_i}/Z_n)^{1/3} - (Y_{aim_i}/Y_n)^{1/3}],$$

$X_n$, $Y_n$, $Z_n$ are the tristimulus values (95.04, 100.00, 108.89, respectively) which describe a specified white achromatic stimulus ($D_{65}$ illuminant).

The tristimulus values ($X_{PE_i}$, $Y_{PE_i}$, $Z_{PE_i}$) of the $i^{th}$ color patch for the photographic element are calculated as follows:

$$\begin{bmatrix} X_{PE_i} \\ Y_{PE_i} \\ Z_{PE_i} \end{bmatrix} = P \cdot M \cdot \begin{bmatrix} H_{red_i} \\ H_{grn_i} \\ H_{blu_i} \end{bmatrix},$$

where:

$$P \equiv \begin{bmatrix} 0.412390 & 0.357584 & 0.180480 \\ 0.212639 & 0.715167 & 0.0721921 \\ 0.0193308 & 0.119194 & 0.950531 \end{bmatrix} \text{ and}$$

$$M \equiv \begin{bmatrix} m_{11} & m_{12} & m_{13} \\ m_{21} & m_{22} & m_{23} \\ m_{31} & m_{32} & m_{33} \end{bmatrix}.$$

Matrix P is the phosphor matrix for a video monitor having primaries defined by CCIR Recommendation 709, *Basic Parameter Values for the HDTV Standard for the Studio and for International Programme Exchange*, published 24 May 1990. The chromaticity coordinates (CIE 1931) of the primaries are red (x=0.640, y=0.330), green (x=0.300, y=0.600), and blue (x=0.150, y=0.060). The assumed chromaticity for equal primary signals, i.e. the reference white, is (x=0.3127, y=0.3290), corresponding to $D_{65}$. Matrix P in no way influences the magnitude of $\overline{\Delta E^*}_{ab}$, it is included so that the magnitude of the terms in matrix M are relevant in the noise test described below. The signals resulting after application of matrix M are suitable to drive a video monitor with phosphors having the specified chromaticities. Matrix M is derived using standard regression techniques and is calculated so as to minimize the quantity, $$\sum_{i}^{190} (\Delta E^*_{ab_i})^2,$$

where $\Delta E^*_{ab}$ is determined for each test color as defined below. The transformed exposure signals of the photographic element are used to calculate CIELAB coordinates as follows:

$$L^*_{PE_i} = 116(Y_{PE_i}/Y_n)^{1/3} - 16$$

$$a^*_{PE_i} = 500[(X_{PE_i}/X_n)^{1/3} - (Y_{PE_i}/Y_n)^{1/3}]$$

$$b^*_{PE_i} = 200[(Z_{PE_i}/Z_n)^{1/3} - (Y_{PE_i}/Y_n)^{1/3}]$$

The average CIELAB color difference, $\overline{\Delta E^*}_{ab}$, is defined as:

$$\overline{\Delta E^*}_{ab} = \frac{\sum_{i=1}^{190} \Delta E^*_{ab_i}}{190},$$

where $$\Delta E^*_{ab_i} = \sqrt{(L^*_{aim_i} - L^*_{PE_i})^2 + (a^*_{aim_i} - a^*_{PE_i})^2 + (b^*_{aim_i} - b^*_{PE_i})^2}.$$

Although the color recording and/or reproduction of an imaging system is an important characteristic to be considered in its design, it is not the only factor. Preferred embodiments of the invention have, as one of their features, excellent signal-to-noise properties for use in hybrid imaging systems. Image quality aspects of photographic elements used in hybrid systems must therefore be considered. R. W. G. Hunt in *The Reproduction of Colour in Photography, Printing, and Television*, 4th Ed., Fountain Press, England, 1987, Chapter 20, Section 20.10, pp. 414–416 points out "The practical choice of spectral sensitivities is usually based on a compromise aimed at achieving a balance between several conflicting requirements. Thus if the coefficients of the matrix are too high, the signal-to-noise may be adversely affected." The matrix coefficients to which Hunt refers are those used to transform from the spectral sensitivities of a video camera to the color-matching functions which correspond to the primaries of the output device or medium, which in Hunt's discussion are the phosphors of a video system. It is therefore important to also consider the signal-to-noise implications of a particular selection of spectral sensitivities. As in the case of assessing the color recording capabilities of a set of spectral sensitivities, it is useful to have a quantitative measure of the signal-to-noise implications of a particular choice of spectral sensitivities.

The measure used to quantify the noise implications is "$\Psi$", or noise-gain factor. As alluded to in Hunt's reference, the noise-gain factor, $\Psi$, is computed from the matrix used to transform the photographic element's exposures to a specified set of color-matching functions. The color-matching functions chosen for reporting the noise results correspond to the primaries outlined in the CCIR Recommendation 709, *Basic Parameter Values for the HDTV Standard for the Studio and for International Programme Exchange*, published 24 May 1990. The chromaticity coordinates (CIE 1931) of the primaries are red (x=0.640, y=0.330), green (x=0.300, y=0.600), blue (x=0.150, y=0.060), and the assumed chromaticity for equal primary signals, i.e. the reference white, is (x=0.3127, y=0.3290), corresponding to $D_{65}$. $\Psi$ is the sum of the square roots of the sum of the squares of the elements of each row in the matrix M which transforms the exposure signals. Mathematically this is expressed as:

$$\Psi = \sum_{i} \sqrt{\sum_{j} m_{ij}^2}.$$

where i and j represent the row and column number, respectively.

The tests described are useful measures to predict the capabilities of a photographic element and to differentiate between the capabilities of photographic elements. The color test is designed specifically to measure the colorimetric accuracy of the spectral sensitivities of the photographic element and does not indicate the colorimetric accuracy of the reproduced image; it is a measure of the colorimetric accuracy of the recorded image only.

With the emergence of computer-controlled data processing capabilities, interest has developed in extracting the information contained in an imagewise exposed photographic element instead of proceeding directly to a viewable image. It is now common practice to scan both black-and-white and color images. The most common approach to scanning a black-and-white negative is to record point-by-point or line-by-line the transmission of a light beam, relying on developed silver to modulate the beam. In color photography blue, green and red scanning beams are modulated by the yellow, magenta and cyan image dyes. In a variant color scanning approach, the blue, green and red scanning beams are combined into a single white scanning beam modulated by the image dyes that is read through red, green and blue filters to create three separate records. The records produced by image dye modulation can then be read into any convenient memory medium (e.g., an optical disk). Systems in which the image passes through an intermediary, such as a scanner or computer, are often referred to as "hybrid" imaging systems.

A hybrid imaging system must include a method for scanning or for otherwise measuring the individual picture elements of the photographic media, which serve as input to the system, to produce image-bearing signals. In addition, the system must provide a means for transforming the image-bearing signals to an image representation or encoding that is appropriate for the particular applications of the system.

Hybrid imaging systems have numerous advantages because they are free of many of the classical constraints of photographic embodiments. For example, systematic manipulation (e.g., image reversal, hue and tone alteration, etc.) of the image information that would be cumbersome or impossible to accomplish in a controlled manner in a photographic element are readily achieved. The stored information can be retrieved from memory to modulate light exposures necessary to recreate the image as a photographic negative, slide or print at will. Alternatively, the image can be viewed on a video display or printed by a variety of techniques beyond the bounds of classical photography—e.g., xerography, ink jet printing, dye-diffusion printing, etc.

For example, U.S. Pat. No. 4,500,919 entitled "COLOR REPRODUCTION SYSTEM" by W. F. Schreiber, discloses an image reproduction system of one type in which an electronic reader scans an original color image and converts it to electronic image-bearing signals. A computer workstation and an interactive operator interface, including a video monitor, permit an operator to edit or alter the image-bearing signals by means of displaying the image on the monitor. When the operator has composed a desired image on the monitor, the workstation causes the output device to produce an inked output corresponding to the displayed image. In that invention, the image representation or encoding is meant to represent the colorimetry of the image being scanned. Calibration procedures are described for transforming the image-bearing signals to an image representation or encoding so as to reproduce the colorimetry of a scanned image on the monitor and to subsequently reproduce the colorimetry of the monitor image on the inked output.

U.S. patent application Ser. No. 059,060 entitled METHODS AND ASSOCIATED APPARATUS WHICH ACHIEVE IMAGING DEVICE/MEDIA COMPATIBILITY AND COLOR APPEARANCE MATCHING by E. Giorgianni and T. Madden describes an imaging system in which image-bearing signals are converted to a different form of image representation or encoding, representing the corresponding colorimetric values that would be required to match, in the viewing conditions of a uniquely defined reference viewing environment, the appearance of the rendered input image as that image would appear, if viewed in a specified input viewing environment. The described system allows for input from disparate types of imaging media, such as photographic negatives as well as transmission and reflection positives. The image representation or encoding of that system is meant to represent the color appearance of the image being scanned (or the rendered color appearance computed from a negative being scanned), and calibration procedures are described so as to reproduce that appearance on the monitor and on the final output device or medium.

Each of these forms of image representation or encoding, produced by transformations of image-bearing-signals, is appropriate and desirable for applications where the intent is to represent the colors of the image reproduced directly on, or to be subsequently produced from, the color-imaging element being scanned into the system. For other applications, however, it would be more desirable to produce an image representation or encoding that is a colorimetrically accurate representation of original scene colors, rather than reproduced colors.

An improved photographic element for use in applications requiring colorimetrically accurate representations of captured scenes would provide the capability to produce image representations or encoding that accurately represent original scene colorimetric information. The improved photographic element could be used to form and store a colorimetrically accurate record of the original scene and/or used to produce colorimetrically accurate or otherwise appropriately rendered color images on output devices/media calibrated by techniques known to those skilled in the art.

One requirement for the use of photographic elements capable of colorimetrically accurate recording is the ability to remove color alterations produced by the color reproduction properties of the imaging element. U.S. Pat. No. 5,267,030 entitled METHODS AND ASSOCIATED APPARATUS FOR FORMING IMAGE DATA METRICS WHICH ACHIEVE MEDIA COMPATIBILITY FOR SUBSEQUENT IMAGING APPLICATIONS, filed in the names of E. Giorgianni and T. Madden, provides a method for deriving, from a scanned image, recorded color information which is substantially free of color alterations produced by the color reproduction properties of the imaging element. In that patent, a system is described in which the effects of media-specific signal processing are computationally removed, as far as possible, from each input element used by the system. In addition, the chromatic interdependencies introduced by the secondary absorptions of the image-forming dyes, as measured by the responsivities of the scanning device, are also computationally removed. Use of the methods and means of the invention transform the signals measured from the imaging element to the exposures recorded from the original scene.

The extraction of recorded exposure information from each input element allows for input from disparate types of imaging media, such as conventional photographic negatives and transmission and reflection positives. For the purposes of the present invention, that same process of extracting recorded exposure information can be used to effectively eliminate any contribution to color inaccuracy caused by chemical signal processing and by the image-forming dyes. However, the recorded exposure information so extracted will, in general, still not be an accurate record of the colorimetric values of colors in the actual original scene that was recorded photographically using the element, as described previously. The reason for this inaccurate recording is the selection of spectral sensitivities in conventional photographic products.

Values of $\overline{\Delta E^*}_{ab}$ and $\Psi$ were calculated as previously described for a variety of commercially available photographic elements. Table I contains representative photographic elements from that survey. Spectral sensitivity was measured for negative-working photographic elements by determining the exposures required to achieve a density of 0.2 above the minimum density formed in the absence of exposure. Spectral sensitivity for positive-working photographic elements was measured by determining the exposures required to achieve a density of 1.0. Included for reference are the MacAdam spectral sensitivities. The entry "J. Schwan and J. Graham" refers to spectral sensitivities selected from the ranges cited in U.S. Pat. No. 3,672,898 entitled MULTICOLOR SILVER HALIDE PHOTOGRAPHIC MATERIAL AND PROCESSES by J. Schwan and J. Graham. The entry "F. Fukazawa" refers to spectral sensitivities selected from ranges cited in U.S. Pat. No. 5,180,657 entitled COLOR PHOTOGRAPHIC LIGHT-SENSITIVE MATERIAL OFFERING EXCELLENT HUE REPRODUCTION by F. Fukazawa et al.

TABLE I

| Entry | Identification | $\overline{\Delta E^*}$ ab | $\Psi$ | FIG. |
|---|---|---|---|---|
| 1 | Color Reversal Film #1 | 7.0 | 3.4 | 1 |
| 2 | Color Reversal Film #2 | 5.4 | 3.6 | 2 |
| 3 | Color Negative Film #1 | 5.0 | 3.7 | 3 |
| 4 | Color Negative Film #2 | 5.6 | 3.5 | 4 |
| 5 | Color Negative Film #3 | 3.9 | 3.8 | 5 |
| 6 | Color Negative Film #4 | 3.4 | 4.0 | 6 |
| 7 | MacAdam | 0.1 | 7.3 | 7 |
| 8 | J. Schwan/J. Graham | 3.8 | 4.4 | 8 |
| 9 | F. Fukazawa | 3.9 | 3.8 | 9 |

The following discussion relates to the data presented in Table I. Entries 1–6 are representative of the normal range of colorimetric accuracy for photographic elements currently available based on measurements of their spectral sensitivities. Entry 6 marks the lower limit of $\overline{\Delta E^*}_{ab}$ of the photographic elements surveyed. Entry 7 establishes the value of $\overline{\Delta E^*}_{ab}$ for the MacAdam spectral sensitivities, the residual error is caused by the truncation of small negative responses present in the color-matching functions on which the MacAdam spectral sensitivities are based. The spectral sensitivities of the photographic elements listed in Table I are shown in FIGS. 1–9. The area under each spectral sensitivity response is normalized to unity for convenience.

From the data in Table I, it is clear that conventional photographic elements are not sensitized to achieve colorimetric accuracy. Subsequent stages in the color reproduction of these photographic elements will alter the colorimetric performance but can not improve the colorimetric accuracy. The colorimetric accuracy is fundamentally limited by the spectral sensitivity of the photographic element.

The data in Table I also illustrates that the prior art as manifest in the patents of J. Schwan and J. Graham and F. Fukazawa is insufficient in its specification of spectral sensitivities to produce colorimetrically accurate data. Because of the inter-related nature of the choice of spectral sensitivities, it is not possible to select, for example, the green spectral sensitivity independently of the red spectral sensitivity. The specification of spectral sensitivity must therefore be in terms of the colorimetric capability of the photographic element if it is to achieve a specified level of colorimetric accuracy.

SUMMARY OF THE INVENTION

This invention has as its object to provide a method of producing an electronic image from a photographic element which is superior in its colorimetric accuracy.

This object is achieved in a method of producing an electronic image comprising:

a) providing a photographic element, comprised of a support and at least three silver halide emulsion layers, that records exposure information, wherein the exposure information is recorded in three image-recording units and wherein the spectral sensitivities of the image-recording units are chosen, such that the average color error, $\overline{\Delta E^*}_{ab}$, is less than or equal to 3.1, wherein the $\overline{\Delta E^*}_{ab}$ is computed for a specified set of test colors of known spectral reflectance, and the light source is specified as $D_{65}$ and wherein the $\overline{\Delta E^*}_{ab}$ is the average CIE 1976 (L*a*b*) $\Delta E^*_{ab}$ between the CIE 1976 (L*a*b*)-space coordinates of the test colors and the CIE 1976 (L*a*b*)-space coordinates corresponding to transformed exposure signals, wherein the transformed exposure signals are formed by applying an exposure-space matrix to the exposure signals derived from the photographic element to transform the derived exposure signals to exposure signals corresponding to the color-matching functions of the CCIR Recommendation 709 primary set, and wherein the exposure-space matrix is derived so as to minimize $$\sum_i (\Delta E^*_{ab_i})^2,$$

and noise-gain factor, $\Psi$, defined as the sum of the square roots of the sum of the squares of each row of the elements in the exposure space matrix is less than or equal to 6.5;

b) exposing and photographically processing the photographic element to produce image-bearing density records;

c) scanning the image-bearing density records on a pixel-wise basis with an opto-electronic scanner to produce image-bearing electronic signals;

d) digitizing the image-bearing electronic signals; and e) manipulating the electronic image-bearing signals in a computer to provide the electronic image.

Another object of this invention is to provide a method of producing an electronic image from a photographic element in combination with selected optical filters which is superior in its colorimetric accuracy. This object is achieved in a method of producing an electronic image comprising:

a) providing a photographic element, comprised of a support and at least three silver halide emulsion layers, that records exposure information, wherein the exposure information is recorded in three image-recording units, used in combination with a means of optical filtration external to the photographic element, wherein the spectral sensitivities of the image-recording units and optical transmission of the optical filtration means are chosen such that the average color error, $\overline{\Delta E^*}_{ab}$, is less than or equal to 3.1, wherein the $\overline{\Delta E^*}_{ab}$ is computed for a specified set of test colors of known spectral reflectance, and the light source, is specified as $D_{65}$, and wherein the $\overline{\Delta E^*}_{ab}$ is the average CIE 1976 (L*a*b*) $\Delta E^*_{ab}$ between the CIE 1976 (L*a*b*)-space coordinates of the test colors and the CIE 1976 (L*a*b*)-space coordinates corresponding to transformed exposure signals, wherein the transformed exposure signals are formed by applying an exposure-space matrix to the exposure signals derived from the photographic element to transform the derived exposure signals to exposure signals corresponding to the color-matching functions of the CCIR Recommendation 709 primary set, and wherein the exposure-space matrix is derived so as to minimize $$\sum_i (\Delta E^*_{ab_i})^2,$$

and noise-gain factor, $\Psi$, defined as the sum of the square roots of the sum of the squares of each row of the elements in the exposure space matrix is less than or equal to 6.5;

b) photographically processing the photographic element to produce image-bearing density records;

c) scanning the image-bearing density records on a pixel-wise basis with an opto-electronic scanner to produce image-bearing electronic signals;

d) digitizing the image-bearing electronic signals; and e) manipulating the electronic image-bearing signals in a computer to provide the electronic image.

DETAILED DESCRIPTION OF PREFERRED EMBODIMENTS

Figure 10:
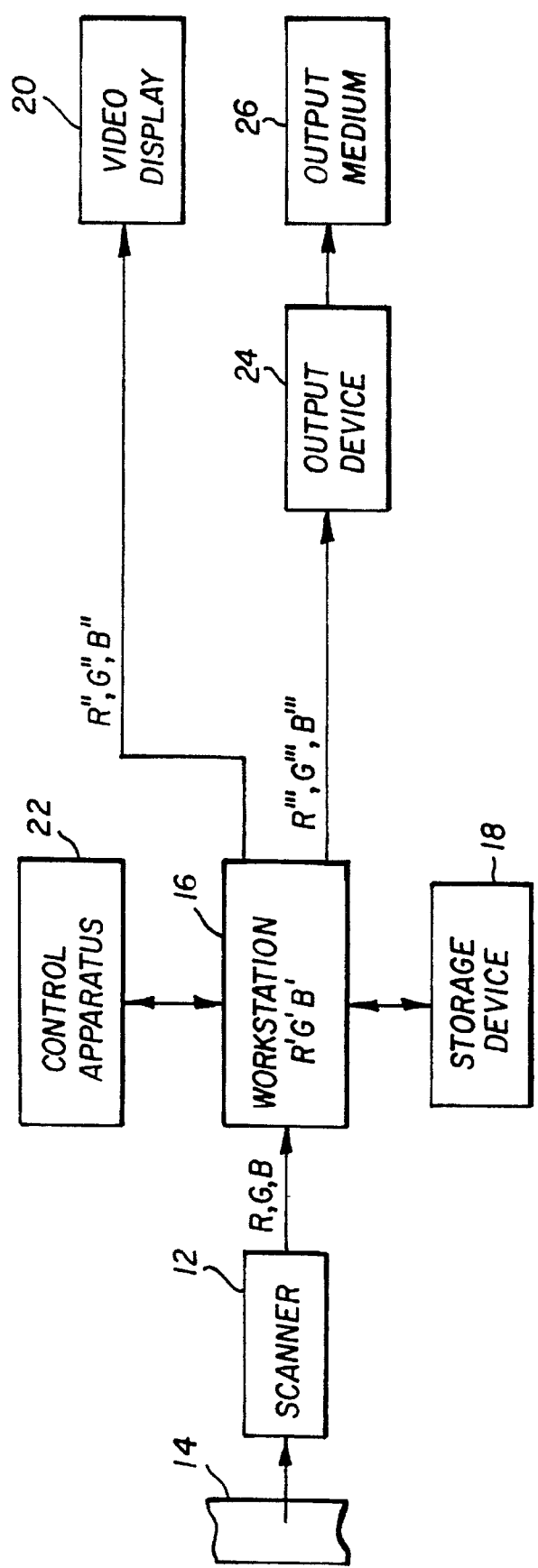
FIG. 10 shows, in block diagram form, color imaging system apparatus, in accordance with a preferred embodiment of the invention.

Turning to FIG. 10 wherein an imaging system apparatus 10 is shown, an image scanner 12 serves for scanning an image on a positive or negative photographic element 14, and for producing R, G, B (red, green, and blue) image-bearing signals for each picture element of the image being scanned. A computer-based workstation 16, which receives the image-bearing signals from the scanner transforms the input image-bearing signals into intermediary image-bearing signals R', G', B'. The workstation allows for archival storage of the intermediary image-bearing signals using any of a variety of archival storage writing devices 18, and media such as magnetic tape or disk, or optical disk. The workstation enables an operator to view and edit the image. For that purpose, a video monitor 20, serves to display an image corresponding to an R", G", B" image-bearing signal provided by the workstation. Control apparatus 22, which may include a keyboard and cursor, enables the operator to provide image manipulation commands pertinent to modifying the video image displayed and to produce, display and/or store the modified image. An output device 24, which may be a silver halide media writer, thermal, ink-jet, electrostatic, or other type of printer, or electronic output device may also be present to receive R''', G''', B''' image-bearing signals from the workstation for output onto the appropriate color-imaging medium, 26.

In order to achieve the objects of the invention, R, G, B image-bearing signals produced by scanning an image recorded on a photographic element intended for use in the invention with a transmission scanner, are first converted to image-bearing signals representing the relative trichromatic exposure values that each input film received when it captured the original scene. U.S. Pat. No. 5,267,030 describes the method and means for developing the transformations needed for this conversion and are herein included by reference.

One method for performing the mathematical operations required to transform R, G, B image-bearing signals to the intermediary image-bearing signals of this preferred embodiment is as follows:

1) the R, G, B image-bearing signals, which correspond to the measured transmittances of the input medium, are converted to RGB densities by using appropriate 1-dimensional look-up-tables (LUTs), 2) the RGB densities of step 1 are adjusted, by using a matrix or a 3-dimensional LUT, to correct for differences among scanners in systems where multiple input scanners are used, 3) the RGB densities of step 2 are adjusted, by using another matrix operation or 3-dimensional LUT, to remove the interdependencies of the image-bearing signals produced by the unwanted absorptions of the imaging dyes and/or by inter-layer chemical interactions in the input medium, and 4) the RGB densities of step 3 are individually transformed through appropriate 1-dimensional LUTs, derived such that the neutral scale densities of the input medium are transformed to the neutral scale exposures of that medium, to produce the linear exposure values that were recorded by the input medium.

The exposures of step 4 may be further transformed by another matrix, a 3-dimensional LUT, or any other similar operation to arrive at exposure values that correspond to colorimetric values such as CIE XYZ values. The accuracy limit of this final transform, however, will depend on the relationship of the spectral sensitivities of the image-capturing photographic element to CIE color-matching functions.

As will be understood by one skilled in the art, the above described method of producing an image record wherein manipulation of the image-bearing electronic signals occurs in the computer can also be accomplished using any single mathematical operation or combination of mathematical operations performed by the computer including, but not limited to:

a) matrix algebra;

b) algebraic expressions dependent on one or more of the image-bearing electronic signals; and c) n-dimensional LUTs.

To produce a viewable image, the three exposure records can be used to modulate light exposures necessary to recreate the image as a photographic negative, slide, or print at will. Alternatively, the image can be viewed as a video display or printed by a variety of techniques beyond the bounds of classical photography. Means of producing viewable images include, but are not limited to:

a) photographic film writer;

b) photographic paper writer;

c) color thermal printer;

d) color inkjet printer;

e) color electrophotographic printer; and f) graphic arts printer using four or more inks.

The image-bearing electronic signals can be stored at any intermediate or final stage in the process. Useful means for storing the image-bearing electronic signals include, but are not limited to:

a) magnetic memory;

b) optical memory; and c) magneto-optical memory.

The photographic element useful in the practice of the invention to produce superior electronic color image contains at least three silver halide emulsion recording units each capable of recording an imagewise exposure where the spectral sensitivities of the three image recording units are non-coextensive and satisfy specified criteria for color recording capability and noise gain.

The basic features of the invention can be appreciated by reference to a photographic element according to the invention satisfying Structure I:

STRUCTURE I

| Overcoat |
| --- |
| Silver Halide Emulsion Image Recording Unit 1 |
| Silver Halide Emulsion Image Recording Unit 2 |
| Silver Halide Emulsion Image Recording Unit 3 |
| Photographic Support |

The silver halide emulsion image recording units can take any convenient conventional form capable of forming a latent image in response to imagewise exposure within the selected regions of the spectrum. In the simplest possible form, the emulsion image recording units contain grains of the same silver halide or combination of silver halides. The silver halide emulsion layer whose sensitivity falls predominantly in the blue region of the spectrum may rely on native spectral sensitivity. All emulsion image recording units can contain one or more spectral sensitizing dyes extending sensitivity to any desired region of the spectrum and/or enhancing sensitivity within the region of native sensitivity. To the extent that spectral sensitizing dye rather than native silver halide absorption of exposing radiation is relied upon for latent image formation during exposure, it follows that the emulsion image recording units can be formed of any combination of silver halides. Further, it is immaterial whether the same silver halides are selected for each emulsion image recording unit.

A feature that distinguishes the photographic elements of Structure I from the prior art is that the spectral sensitivities are chosen such that the value of $\overline{\Delta E^*}_{ab}$ calculated according to the procedure outlined above is less than or equal to 3.1. One particularly preferred set of spectral sensitivities is defined in Table II. A spectral sensitivity corresponding to the definition of Table II is shown

TABLE II

Figure 11:
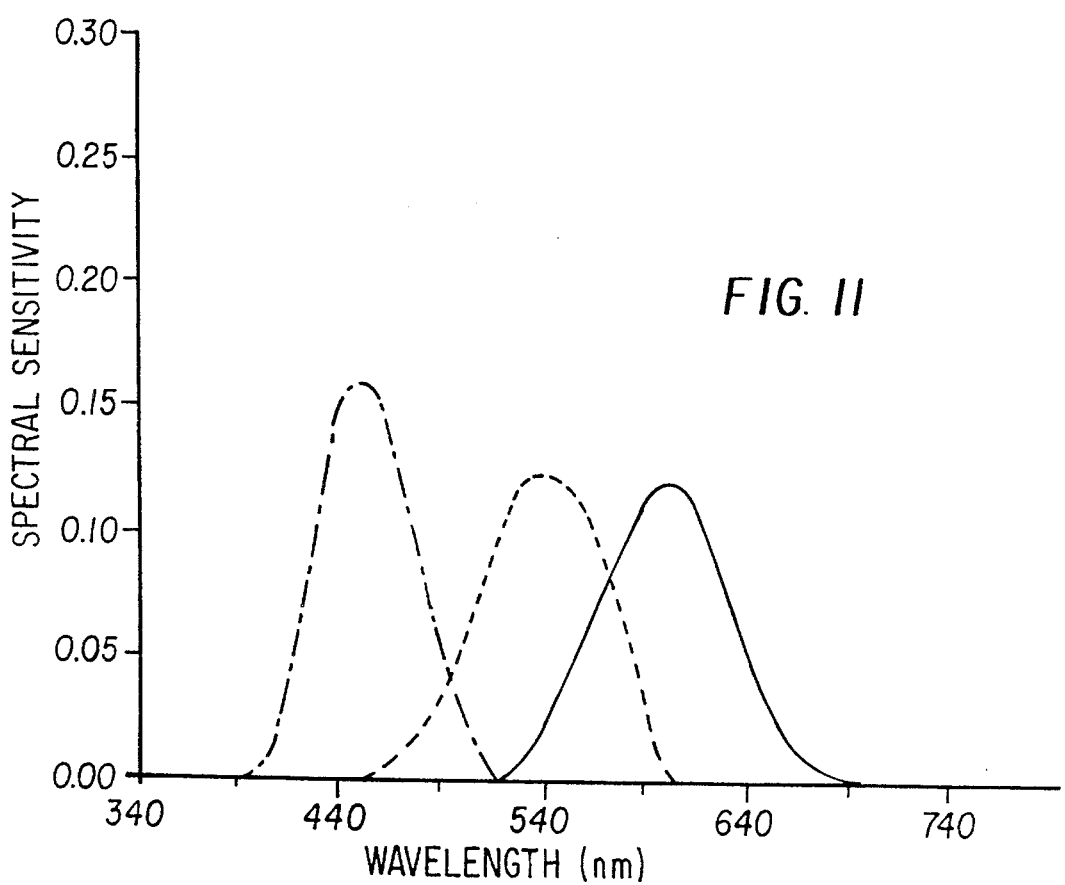
FIG. 11 is a plot of one preferred set of spectral sensitivities according to the present invention.

| Percent of Peak Response | Red Recording Unit | Green Recording Unit | Blue Recording Unit |
| --- | --- | --- | --- |
| 5 | 510–575; 670–680 | 450–470; 595–615 | 395–405; 510–520 |
| 20 | 520–580; 650–660 | 480–495; 585–600 | 410–420; 485–500 |
| 40 | 545–580; 640–650 | 490–500; 575–590 | 415–425; 475–490 |
| 60 | 555–580; 630–645 | 500–510; 570–580 | 420–430; 465–480 |
| 80 | 565–585; 620–640 | 510–520; 560–570 | 425–435; 460–470 |
| Peak | 595–615 | 530–545 | 440–455 | in FIG. 11. Photographic elements produced thus far have not contemplated using spectral sensitivities as shown in FIG. 11 because of an inability to produce an acceptable color image from such a photographic element using conventional means. Photographic elements satisfying this invention are particularly chosen from those which satisfy the color recording accuracy criterion defined by $\overline{\Delta E^*}_{ab}$ and would not be considered by those skilled in the art of photography to be useful in forming an acceptable color image using conventional methods of photographic image reproduction. In addition to those photographic elements exhibiting spectral sensitivities satisfying the $\overline{\Delta E^*}_{ab}$ requirement, those spectral sensitivities which result in values of $\Psi$ as defined above of less than 6.5 are particularly preferred embodiments.

In the simplest contemplated form, each emulsion image recording unit produces a spectrally distinguishable image. A preferred way of producing spectrally distinguishable images is to have image dye formation occur in each image recording unit in proportion to the amount of silver development produced during processing where a different dye hue is produced in each of the three image recording units. The dye image requirement is preferably satisfied by incorporating in each emulsion image recording unit a different dye-forming coupler. Conventional photographic imaging dyes have relatively narrow absorption profiles, with half maximum absorption widths (hereinafter also referred to as half-peak absorption bands) typically well below 125 nm. It is preferred that the dye images produced in the three emulsion image recording units have non-overlapping half peak absorption bands. That is, preferably the half peak absorption band width of each image dye occupies a portion of the spectrum that is unoccupied by the half peak absorption band width of any other image dye contained in the photographic element after processing. Nevertheless, it is possible to discriminate between different image dyes even if some overlap of the half peak band widths occurs. It is common to have the three image dyes produced absorb primarily in the blue, green and red regions of the spectrum and are referred to as yellow, magenta and cyan image dyes, respectively.

When Structure I is imagewise exposed and conventionally photographically processed, three spectrally distinguishable dye images can be produced, one in each of the three emulsion image recording units. By scanning Structure I after processing first with a light beam having wavelengths absorbed primarily by one of the dye images and recording the modulation of the light beam, and repeating the scanning step twice more with light beams each having wavelengths absorbed primarily by one of the dye images which did not primarily absorb wavelengths of light contained in one of the other scanning beams, three separate image records can be obtained, corresponding to the images present in each of the three emulsion image recording units. Alternatively, the three light beams can be combined to allow a single scan of Structure I. In this instance the beam after modulation by Structure I is passed through three filters selected such that each transmits only the portion of the beam that is modulated primarily by one of the dye images. The information contained in the modulated light beam(s) is converted into image bearing electrical signals to form three separate representations of exposure information recorded by Structure I. Manipulation and storage of the image-bearing electronic signals have been described in detail above.

The discussion above of producing a superior image employing Structure I is recognized to present only one of many different forms of the invention. The scope of the invention and its further advantages can be better appreciated by reference to the description of preferred features and embodiments described above.

The emulsion image recording units of differing spectral sensitivities for recording exposures within the visible spectrum can be formed of conventional silver halide emulsions or blends of silver halide emulsions. Preferred emulsions are negative-working emulsions and particularly negative-working silver bromoiodide emulsions. However, the invention is generally applicable to both positive or negative-working silver halide emulsions and to the full range of conventional approaches for forming dye images. *Research Disclosure*, Item 36544, published September 1994, (all cited sections of which are incorporated by reference) in Section I provides a summary of conventional emulsion grain features and in Section IV describes chemical sensitization. *Research Disclosure* is published by Kenneth Mason Publications, Ltd., Emsworth, Hampshire P010 7DD, England.

The silver halide emulsions incorporated in the photographic element can obtain their sensitivity to light in the visible region of the spectrum by any combination of native silver halide response or by the addition of spectral sensitizing dyes. Spectral sensitizing dyes useful in the practice of the invention include the polymethine dye class, which includes the cyanines, merocyanines, complex cyanines and merocyanines (i.e., tri-, tetra- and poly-nuclear cyanines and merocyanines), oxonols, hemioxonols, styryls, merostyryls, streptocyanines, hemicyanines and arylidenes.

The cyanine spectral sensitizing dyes include, joined by a methine linkage, two basic heterocyclic nuclei, such as those derived from quinolinium, pyridinium, isoquinolinium, 3H-indolium, benz[e]indolium, oxazolium, thiazolium, selenazolinium, imidazolium, benzoxazolinium, benzothiazolium, benzoselenazolium, benzimidazolium, naphthoxazolium, naphthothiazolium, naphthoselenazolium, thiazolinium, dihydronaphthothiazolium, pyrylium and imidazopyrazinium quaternary salts. The basic heterocyclic nuclei can also include tellurazoles or oxatellurazoles as described by Gunther et al U.S. Pat. Nos. 4,575,483, 4,576,905 and 4,599,410. Varied cyanine dyes, including varied substituents, are described in Parton et al U.S. Pat. No. 4,871,656 (heptamethine dyes with sulfoethyl or carboxyethyl nitrogen substituents), Ficken et al U.S. Pat. No. 4,996,141 (simple cyanine with particular substituents on a thiazole ring), Tanaka et al U.S. Pat. No. 4,940,657 (iodide substituent on cyanine, merocyanine or trinuclear dye), Matsunaga et al U.S. Pat. No. 5,223,389 (with aromatic polycyclic substituents), Anderson et al U.S. Pat. No. 5,210,014 (benzimidazoles with methyl, methylthio, fluoromethyl or fluoromethylthio substituents), Hinz et al U.S. Pat. No. 5,254,455 (5-fluoro substituted pentamethine benzothiazoles), Parton et al U.S. Pat. No. 5,091,298 (sulfo substituted carbamoyl nitrogen substituents), Burrows et al U.S. Pat. No. 5,216,166 (bridge nitro containing substituent), MacIntyre et al U.S. Pat. No. 5,135,845 (fluoro substituted), Ikegawa et al U.S. Pat. No. 5,198,332 (trimethine benzoxazoles with substituents defined by STERIMOL parameters), Kagawa et al EPO 0 362 387 (sulfo substituent on benzo or naphtho back ring) and EPO 0 521 632 (benzothiazole with alkoxy substituents), Hioki et al EPO 0 443 466 (with aromatic polycyclic substituent) and 0 474 047 (with aromatic polycyclic substituent), Ikegawa et al EPO 0 530 511 (nitrogen sulfonamide or carbonamide type substituents), Nagaoki et al EPO 0 534 283 (dyes with various particular emulsions), Kawata et al EPO 0 565 121 (with nitrogen substituents cleavable upon processing to reduce residual color) and Benard et al WO 93/08505 (with macrocyclic thioether substituents).

Cyanine dyes with carbocyclic rings in the methine chain linking nuclei are described in Lea et al U.S. Pat. No. 4,959,294 (Cl or Br substituent on bridging ring), Sato et al U.S. Pat. No. 4,999,282, Muenter et al U.S. Pat. No. 5,013,642 (fused bridging rings), Parton et al U.S. Pat. No. 5,108,882 (fused bridging rings), Hioki et al U.S. Pat. Nos. 5,166,047 (also includes merocyanines with carbocyclic bridging ring), 5,175,080, and 4,939,080, Parton et al U.S. Pat. No. 5,061,618, Sakai U.S. Pat. No. 5,089,382, Suzumoto et al U.S. Pat. No. 5,252,454, Patzold et al EPO 0 317 825, Burrows et al EPO 0 465 078 (with nitro substituent or bridging carbocyclic or heterocyclic ring), Kato (et al) EPO 0 532 042 and EPO 0 559 195 (6-membered bridging ring with one substituent).

Trinuclear type dyes which have a general cyanine type structure but with a heterocyclic nucleus in the bridging methine chain are described in Arai et al U.S. Pat. No. 4,945,036, Mee et al U.S. Pat. No. 4,965,183, Ono U.S. Pat. No. 4,920,040 (trinuclear, cyanine structure with intermediate heterocyclic ring), Koya et al U.S. Pat. No. 5,250,692, Bolger et al U.S. Pat. No. 5,079,139 and Kaneko et al U.S. Pat. No. 5,234,806.

Cyanine dyes which have an indole nucleus are illustrated by Proehl et al U.S. Pat. No. 4,876,181, Usagawa et al U.S. Pat. No. 5,057,406, Kaneko et al U.S. Pat. Nos. 5,077,186 and 5,153,114, Proehl et al EPO 0 251 282 and Fichen et al U.K. Patent No. 2,235,463.

The merocyanine spectral sensitizing dyes include, joined by a methine linkage, a basic heterocyclic nucleus of the cyanine-dye type and an acidic nucleus such as can be derived from barbituric acid, 2-thiobarbituric acid, rhodanine, hydantoin, 2-thiohydantoin, 4-thiohydantoin, 2-pyrazolin-5-one, 2-isoxazolin-5-one, indan-1,3odione, cyclohexan-1,3-dione, 1,3-dioxane-4,6-dione, pyrazolin-3,5-dione, pentan-2,4-dione, alkylsulfonyl acetonitrile, malononitrile, isoquinolin-4-one, and chroman-2,4-dione. The merocyanine dyes may include telluracyclohexanedione as acidic nucleus as described in Japanese Patent Application JA 51/136,420. Merocyanine type dyes are described in Fabricius et al U.S. Pat. Nos. 5,108,887, and 5,102,781, Link U.S. Pat. No. 5,077,191, Callant et al U.S. Pat. No. 5,116,722, Diehl et al EPO 0 446 845, Ito et al EPO 0 540 295 (trinuclear merocyanine) and U.K. Patent No. 2,250,298.

Additional types of sensitizing dyes include those described in Hioki et al U.S. Pat. Nos. 4,814,265 (azulene nucleus) and 5,003,077 (methine dyes with a cycloheptimidazole nucleus), Okazaki et al U.S. Pat. No. 4,839,269 (dyes with two or more cyclodextran groups), Wheeler U.S. Pat. No. 4,614,801 (cyanine dyes with an indolizine nucleus), Burrows et al U.S. Pat. No. 4,857,450 (hemicyanines), Roberts et al U.S. Pat. No. 4,950,587 (dye polymers), Tabor et al U.S. Pat. No. 5,051,351 (dye polymers with repeating amino acid units) and Inagaki et al U.S. Pat. No. 5,183,733, Mee EPO 0 512 483 (hemicyanines).

One or more spectral sensitizing dyes may be used to achieve spectral sensitivities satisfying the requirements of the invention. Dyes with sensitizing maxima at wavelengths throughout the visible and infrared spectrum and with a great variety of spectral sensitivity curve shapes are known. The choice and relative proportions of dyes is determined based on the ability of the resulting sensitivity of the photographic element to satisfy the requirements of the invention. Dyes with overlapping spectral sensitivity curves will often yield in combination a sensitivity exhibiting characteristics of the individual dyes. Thus, it is possible to use combinations of dyes with different maxima to achieve a spectral sensitivity curve with a maximum intermediate to the sensitizing maxima of the individual dyes.

Combinations of spectral sensitizing dyes can be used which result in supersensitization-that is, spectral sensitization greater in some spectral region than that from any concentration of one of the dyes alone or that which would result from the additive effect of the dyes. Supersensitization can be achieved with selected combinations of spectral sensitizing dyes and other addenda such as stabilizers and antifoggants, development accelerators or inhibitors, coating aids, brighteners and antistatic agents. Any one of several mechanisms, as well as compounds which can be responsible for supersensitization, are discussed by Gilman, *Photographic Science and Engineering*, Vol. 18, 1974, pp. 418–430. Examples of dye combinations said to provide supersensitization are provided in Ikegawa et al U.S. Pat. Nos. 4,970,141 (trimethine benzoxazole with a substituent of required STERIMOL parameters plus another trimethine oxazole cyanine dye) and 4,889,796, Asano et al U.S. Pat. No. 5,041,366, Dobles et al EPO 0 472 004 (two cyanine dyes with particular log P & oxidation and reduction potentials), Kawabe EPO 0 514 105 (three cyanine dyes, two being symmetric but with differing nuclei and one being asymmetric), Vaes et al EPO 0 545 453 (infrared sensitizer and red sensitizing cationic dye), Vaes et al EPO 0 545 452 (merocyanine or cyanine dye plus complex merocyanine), Irie et al U.S. Pat. No. 549,986 (trimethine benzothiazole with alkoxy substituent plus triamethine benzothiazole or benzoselenazole), Miyake et al EPO 0 563 860 (infrared sensitized emulsion with two bridged cyanine dyes).

Examples of addenda said to provide supersensitization or enhance speed, are provided in Philip et al U.S. Pat. No. 4,914,015 (thio or oxy thiatriazoles added), Mihara U.S. Pat. No. 4,965,182 (infrared cyanine sensitizers plus tetraazaindene), Tanaka et al U.S. Pat. No. 4,863,846 (dyes plus inorganic sulfur), Sills et al U.S. Pat. No. 4,780,404 (thiatriazoles for infrared sensitized emulsions), Momoki et al U.S. Pat. No. 4,945,038 (bridged benzoxothiazoles plus bis-triazinyl compounds), Takahashi et al U.S. Pat. No. 4,910,129 (triazole or tetrazole mercapto compounds), Gingello et al U.S. Pat. No. 4,808,516 (added rhodanine), Ikeda et al U.S. Pat. No. 4,897,343 (sensitized emulsion plus alkali metal sulfite and ascorbic acid), Davies et al U.S. Pat. No. 4,988,615 (infrared sensitized emulsion plus Group V salt), Okusa et al U.S. Pat. No. 5,166,046 (cyanine dye plus specific styrene substituted benzoles), Goedeweeck U.S. Pat. No. 5,190,854, Okuyama et al U.S. Pat. No. 5,246,828 (red sensitized emulsion with macrocyclic compounds), Beltramini et al U.S. Pat. No. 5,212,056 (blue dye plus disulfide compound), Arai et al U.S. Pat. No. 5,229,262 (zeromethine merocyanine plus heterocyclic mercapto compound), Mihara et al U.S. Pat. No. 5,149,619 (infrared cyanine sensitizer plus aromatic-carbamoyl or azole salts), Bucci et al U.S. Pat. No. 5,232,826 (thiatriazole compounds), Simpson et al U.S. Pat. No. 5,013,622 (added metal chelating agents), Friedrich et al U.S. Pat. No. 5,009,992 (infrared sensitizers plus aromatic thiosulfonic acid or salt), Bucci et al EPO 0 440 947 (infrared sensitized emulsion with 1-aryl 5-mercaptotetrazole), Moriya et al EPO 0 445 648 (cyanine dye plus phenyl pyrazalone), Fabricius et al EPO 0 487 010 (zeromethine merocyanine plus tetraazaindene) and Yamada et al German OLS 4,002,016 (infrared sensitizer plus betaine).

Compounds used with sensitizing dyes to enhance other attributes of their performance include compounds to reduce coloration by residual sensitizing dyes as in Mishigaki et al EPO 0 426 193 or Kawai et al U.S. Pat. No. 4,894,323 (rhodanine compound), metal complexes to inhibit dye desorption as in Ohzeki EPO 0 547 568, thiazole quaternary salt compounds to improve color reproduction with monomethine cyanine dyes in Loiacono et al U.S. Pat. No. 5,024,928, acrylate or acrylamide polymers to reduce sensitizing dye stain as in Schofield et al WO 91/19224, dye bis-triazinyl compounds to reduce the width of sensitization as in Tanemura et al U.S. Pat. No. 4,556,633, bis-aminostilbenes and ascorbic acid to reduce desensitization from dyes as in Ikeda et al U.S. Pat. No. 4,917,997 and compounds to reduce variations in sensitivity or other properties during coating, standing, or as a result of storage or processing conditions as in Ohbayashi et al U.S. Pat. No. 4,818,671 (high chloride emulsion sensitized with gold, sulfur and limited amount of monomethine benzothiazole), Kojima et al U.S. Pat. No. 4,839,270, Gilman et al U.S. Pat. No. 4,933,273, Goda U.S. Pat. No. 5,037,733, Hioki et al U.S. Pat. No. 5,192,654, Tanaka et al U.S. Pat. No. 5,219,722, Asami U.S. Pat. No. 5,244,779, Lenhard et al U.S. Pat. No. 5,037,734, Otani U.S. Pat. No. 5,043,256, Suzumoto et al EPO 0 313 021, Hall EPO 0 351 077, Waki EPO 0 368 356, Kobayashi et al EPO 0 402 087 and Ogawa EPO 0 421 464. Other combinations include those in Ikeda et al U.S. Pat. No. 4,837,140 (various sensitizing dyes on element having up to 0.78 g/m² of silver as silver halide) and Tanaka et al U.S. Pat. No. 5,081,006 (high chloride emulsion having benzothiazole cyanine with benzo- or naptho-selenazole or thiazole dye, and phenolic cyan coupler).

Among useful spectral sensitizing dyes for sensitizing silver halide emulsions are those found in U.K. Patent No. 742, 112, Brooker U.S. Pat. Nos. 1,846,300, '301, '302, '303, '304, 2,078,233 and 2,089,729, Brooker et al U.S. Pat. Nos. 2,165,338, 2,213,238, 2,493,747, '748, 2,526,632, 2,739,964 (Reissue 24,292), 2,778,823, 2,917,516, 3,352, 857, 3,411,916 and 3,431,111, Sprague U.S. Pat. No. 2,503, 776, Nys et al U.S. Pat. No. 3,282,933, Riester U.S. Pat. No. 3,660,102, Kampfer et al U.S. Pat. No. 3,660,103, Taber et al U.S. Pat. Nos. 3,335,010, 3,352,680 and 3,384,486, Lincoln et al U.S. Pat. No. 3,397,981, Fumia et al U.S. Pat. Nos. 3,482,978 and 3,623,881, Spence et al U.S. Pat. No. 3,718,470, Mee U.S. Pat. No. 4,025,349 and Kofron et al U.S. Pat. No. 4,439,510.

Examples of useful supersensitizing-dye combinations, of non-light-absorbing addenda which function as supersensitizers or of useful dye combinations are found in McFall et al U.S. Pat. No. 2,933,390, Jones et al U.S. Pat. No. 2,937,089, Motter U.S. Pat. No. 3,506,443 and Schwan et al U.S. Pat. No. 3,672,898. Among desensitizing dyes useful as spectral sensitizers for fogged direct-positive emulsions are those found in Kendall U.S. Pat. No. 2,293,261, Coenen et al U.S. Pat. No. 2,930,694, Brooker et al U.S. Pat. No.

3,431,111, Mee et al U.S. Pat. Nos. 3,492,123, 3,501,312 and 3,598,595, Illingsworth et al U.S. Pat. No. 3,501,310, Lincoln et al U.S. Pat. No. 3,501,311, VanLare U.S. Pat. No. 3,615,608, Carpenter et al U.S. Pat. No. 3,615,639, Riester et al U.S. Pat. No. 3,567,456, Jenkins U.S. Pat. No. 3,574, 629, Jones U.S. Pat. No. 3,579,345, Mee U.S. Pat. No. 3,582,343, Fumia et al U.S. Pat. No. 3,592,653 and Chapman U.S. Pat. No. 3,598,596.

Spectral sensitizing dyes can be added at any stage during the emulsion preparation. They may be added at the beginning of or during precipitation as described by Wall, *Photographic Emulsions,* American Photographic Publishing Co., Boston, 1929, p. 65, Hill U.S. Pat. No. 2,735,766, Philippaerts et al U.S. Pat. No. 3,628,960, Locker U.S. Pat. No. 4, 183,756, Locker et al U.S. Pat. No. 4,225,666 and *Research Disclosure,* Vol. 181, May, 1979, Item 18155, Tani et al EPO 0 301 508, and Tani et al U.S. Pat. No. 4,741,995. They can be added prior to or during chemical sensitization as described by Kofron et al U.S. Pat. No. 4,439,520, Dickerson U.S. Pat. No. 4,520,098, Maskasky U.S. Pat. No. 4,435,501, Philippaerts et al cited above, and Beltramini EPO 0 540 656. They can be added before or during emulsion washing as described by Asami et al EPO 0 287 100, Metoki et al EPO 0 291 399 and Leichsenring East German DD 288 251. The dyes can be mixed in directly before coating as described by Collins et al U.S. Pat. No. 2,912,343. They can be added at controlled temperatures of 50°–80° C. as in Urata U.S. Pat. No. 4,954,429, or for defined mixing times as in Takiguchi EPO 0 460 800, or in specific solvents as in Tani U.S. Pat. No. 5,192,653, in controlled amounts as in Hiroaki et al Japanese Patent Application JP 4 145 429 and Price et al U.S. Pat. No. 5,219,723.

Small amounts of halide ion that forms a silver halide less soluble than that of the grains (e.g., $Br^-$ or $I^-$ on AgCl grains or $I^-$ on AgIBr grains) can be adsorbed to the emulsion grains to promote aggregation and adsorption of the spectral sensitizing dyes as described by U.K. Patent No. 1,413,826 and Kofron et al U.S. Pat. No. 4,439,520. Post-processing dye stain can be reduced by the proximity to the dyed emulsion layer of fine high-iodide grains as described by Dickerson U.S. Pat. No. 4,520,098. Depending on their solubility, the spectral sensitizing dyes can be added to the silver halide emulsion as solutions in water or solvents such as methanol, ethanol, acetone or pyridine, dissolved in surfactant solutions as described by Sakai et al U.S. Pat. No. 3,822,135 or as dispersions as described by Owens et al U.S. Pat. No. 3,469,987 and Japanese Patent Application 24185/71. The dyes can be selectively adsorbed to particular crystallographic faces of the emulsion grain as a means of restricting chemical sensitization centers to other faces, as described by Mifune et al EPO 0 302 528. Substituents which can perform additional photographic functions such as direct-positive nucleation or development acceleration can be included in the dye structure, as described by Spence et al U.S. Pat. Nos. 3,718,470 and 3,854,956, *Research Disclosure,* Vol. 151, November, 1976, Item 15162, and Okazaki et al U.S. Pat. No. 4,800,154. The spectral sensitizing dyes may be used in conjunction with poorly adsorbed luminescent dyes, as described by Miyasaka et al U.S. Pat. Nos. 4,908,303, 4,876,183 and 4,820,606, EPO 0 270 079, EPO 0 270 082 and EPO 0 278 510 and Sugimoto et al U.S. Pat. No. 4,963,476.

Means for the formation and alteration of colored images upon photographic processing of the photographic element are summarized in Section XI of *Research Disclosure,* Vol. 365, September, 1994, Item 36544. In the discussion of the invention it is assumed for simplicity that absorption of the processed photographic element during photographic element scanning in a selected spectral region is attributable to the image produced by only one emulsion layer unit. It is, in fact, preferred to avoid or minimize overlapping absorptions by the image dyes produced in different emulsion layer units. When significant overlapping absorptions are presented by image dyes in two or more emulsion layer units, the observed densities should be convened to actual individual dye densities (usually referred to as analytical densities) by conventional calculation procedures, such as those discussed by James *The Theory of the Photographic Process,* 4th Ed., Macmillan, New York, 1977, Chapter 18, Sensitometry of Color Films and Papers, Section 3. Density Measurements of Color Film Images and Section 4. Density Measurements of Color Paper Images, pp. 520–529, the disclosure of which is here incorporated by reference.

Section XV of *Research Disclosure,* Vol. 365, September, 1994, Item 36544 describes a wide selection of supports useful for photographic elements. The photographic support in Structure I can take the form of any conventional transparent or reflective support as described in Section XV. The inclusion in Structure I of other conventional photographic element features, such as one or more of the hardeners summarized in Section II, antifoggants and stabilizers as described in Section VII, materials which may be incorporated in one or more of the coated layers to assist coating or alter the physical properties of the coated layers as described in Section IX conform to the routine practices of the art and require no detailed description.

The first step of the process of the invention is to photographically process Structure I after it has been imagewise exposed to produce separate dye images in the three emulsion image recording units. Any convenient conventional color processing employed in silver halide photography can be undertaken. Conventional photographic processing of color photographic elements particularly suited to the practice of this invention includes those summarized in Item 36544, cited above, Section XVIII, particularly the color reversal processing of subsection B. A typical sequence of steps includes black-and-white development of the exposed silver halide grains, stopping development, rendering the residual silver halide grains developable either chemically of by exposure to light, development of remaining silver halide grains to produce dye images, bleaching of elemental silver and fixing to remove silver halide. Washing may be interposed between successive processing steps.

Conventional scanning techniques satisfying the requirements described above can be employed and require no detailed description. It is possible to scan successively the photographic element within each of the wavelength ranges discussed above or to combine in one beam the different wavelengths and to resolve the combined beam into separate image density records by passing the beam through separate filters which allow transmission within only the spectral region corresponding to the image density record sought to be formed. A simple technique for scanning is to scan the photographically processed Structure I point-by-point along a series of laterally offset parallel scan paths. When the photographic support is transparent, as is preferred, the intensity of light passing through the photographic element at a scanning point is detected by a sensor which converts radiation received into an electrical signal. Alternatively, the photographic support can be reflective and the sensed signal can be reflected from the support. Preferably the electrical signal is passed through an analog to digital converter and sent to memory in a digital computer together with locant information required for pixel location within the image. Except for the wavelength(s) chosen for scanning, successive image density scans, where employed, can be identical to the first.

Enhancing image sharpness and minimizing the impact of aberrant pixel signals (i.e., noise) are common approaches to enhancing image quality when images are represented as electronic signals. A conventional technique for minimizing the impact of aberrant pixel signals is to adjust each pixel density reading to a weighted average value by factoring in readings from adjacent pixels, closer adjacent pixels being weighted more heavily. Although the invention is described in terms of point-by-point scanning, it is appreciated that conventional approaches to improving image quality are contemplated. Illustrative systems of scan signal manipulation, including techniques for maximizing the quality of image records, are disclosed by Bayer U.S. Pat. No. 4,553,165, Urabe et al U.S. Pat. No. 4,591,923, Sasaki et al U.S. Pat. No. 4,631,578, Alkofer U.S. Pat. No. 4,654,722, Yamada et al U.S. Pat. No. 4,670,793, Klees U.S. Pat. No. 4,694,342, Powell U.S. Pat. No. 4,805,031, Mayne et al U.S. Pat. No. 4,829,370, Abdulwahab U.S. Pat. No. 4,839,721, Matsunawa et al U.S. Pat. Nos. 4,841,361 and 4,937,662, Mizukoshi et al U.S. Pat. No. 4,891,713, Petilli U.S. Pat. No. 4,912,569, Sullivan et al U.S. Pat. No. 4,920,501, Kimoto et al U.S. Pat. No. 4,929,979, Klees U.S. Pat. No. 4,962,542, Hirosawa et al U.S. Pat. No. 4,972,256, Kaplan U.S. Pat. No. 4,977,521, Sakai U.S. Pat. No. 4,979,027, Ng U.S. Pat. No. 5,003,494, Katayama et al U.S. Pat. No. 5,008,950, Kimura et al U.S. Pat. No. 5,065,255, Osamu et al U.S. Pat. No. 5,051,842, Lee et al U.S. Pat. No. 5,012,333, Sullivan et al U.S. Pat. No. 5,070,413, Bowers et al U.S. Pat. No. 5,107,346, Telle U.S. Pat. No. 5,105,266, MacDonald et al U.S. Pat. No. 5,105,469, and Kwon et al U.S. Pat. No. 5,081,692, the disclosures of which are here incorporated by reference.

The purpose of this invention is to produce colorimetrically accurate, electronic color image records. It is common in the practice of digital imaging to manipulate the image-bearing electronic signals as described above to increase the utility of the recorded images. One specifically contemplated means of increasing the utility of electronic image records produced by this invention involves manipulating the image records to alter the colorimetric character of the recorded image to meet intended, aesthetic departures from colorimetric accuracy. The colorimetric accuracy of the image-bearing signals obtained by the practice of this invention will improve the efficiency of obtaining the desired modifications routinely and reliably. Any of the mathematical means of manipulating image-bearing electronic signals, as described above, are useful to achieve the desired aesthetic alterations.

In conventional color photography the image dye hue of each emulsion image recording unit is chosen according to the following relationship: yellow dye represents blue exposure information, magenta dye represents green exposure information, and cyan dye represents red exposure information. It is recognized that the image dye hue of an emulsion image recording unit of a photographic element satisfying the requirements of the invention is not required to correspond to the region of the spectrum recorded as described above since the element is intended to be scanned. The correspondence between image record hue and the region of the spectrum recorded can be altered as required in the digital computer.

The following are illustrations of specific contemplated applications of the invention:

Positive Image Forming Element and Process

A preferred photographic element is illustrated by Structure II:

STRUCTURE II

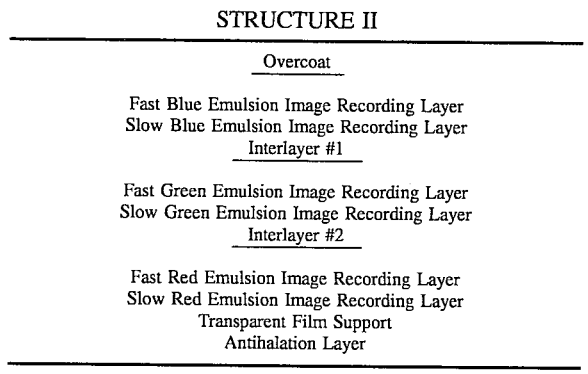

| Overcoat |
| --- |
| Fast Blue Emulsion Image Recording Layer |
| Slow Blue Emulsion Image Recording Layer |
| Interlayer #1 |
| Fast Green Emulsion Image Recording Layer |
| Slow Green Emulsion Image Recording Layer |
| Interlayer #2 |
| Fast Red Emulsion Image Recording Layer |
| Slow Red Emulsion Image Recording Layer |
| Transparent Film Support |
| Antihalation Layer |

Structure II demonstrates one of numerous possible embodiments which satisfies all of the requirements of the general discussion of Structure I. Structure II can be used for photographic elements intended to produce either color reversal or negative images upon photographic processing, but is particularly suited for color reversal image forming elements. Structure I above was chosen to demonstrate the simplest photographic element contemplated for practicing the invention. It is recognized that Structure I could be readily expanded by including two or more emulsion layers of similar spectral sensitivity for each of the three emulsion image recording units shown and additional layers can be added between any or all of the image recording units.

One common technique for improving the speed-granularity relationship of an image produced in a silver halide photographic element is to provide multiple (usually two or three) superimposed silver halide emulsion layers differing in speed (i.e., differing in their threshold sensitivities) to record exposing light from each selected region of the spectrum. By coating the fastest of the emulsion layers to receive imagewise exposing radiation first, the effective speed of the fastest layer is increased relative to that of the underlying layers without unduly increasing the granularity. Hellmig U.S. Pat. No. 3,846,135 discloses fast over slow emulsion layer arrangements in black-and-white photographic elements while Eeles et al U.S. Pat. No. 4,184,876 and Kofron et al U.S. Pat. No. 4,439,520 discloses arrangements in color photographic elements. To obtain the most favorable speed-granularity relationship (signal to noise level), a difference in threshold speeds of emulsion layers contributing to the formation of one exposure record is preferably obtained by varying the average grain size of the emulsions in one layer relative to the others. Each emulsion component is optimally chemically sensitized. In a preferred form of the invention, each image recording unit is composed of two emulsion layers. When more than one emulsion layer is used to form an emulsion image recording unit, the image dyes produced by each of the contributing emulsion layers are chosen to produce similar dye hues after processing. Scanning of the photographic element in a region of the spectrum modulated by the image dyes contained in the emulsion layers of an image recording unit produces an exposure record that is a composite of the information recorded in each of the contributing emulsion layers. The relative contributions of the contributing emulsion layers are controlled by the formulation and development of the photographic element. Relative contributions are adjusted to improve the quality of the information recorded by the emulsion image recording unit. In another preferred form of the invention, an emulsion image recording unit composed of two or more image recording emulsion layers can produce upon photographic processing spectrally distinguishable records in each sub-layer as disclosed by Sutton U.S. Pat. No. 5,314,794, the disclosure of which is here incorporated by reference.

The preferred silver halide emulsions are silver bromoiodide negative-working emulsions. Negative-working emulsions are preferred, since they are simpler in their structure and preparation. Silver bromoiodide grain compositions provide the most favorable relationship of photographic sensitivity (speed) to granularity (noise) and are generally preferred for camera speed (>ISO 25) imaging. While any conventional iodide level can be employed, only low levels of iodide are required for increased sensitivity. Iodide levels as low as 0.5 mole percent, based on total silver are contemplated in preferred embodiments. Iodide levels in the range of from 3.0 to 6.0 mole percent based on total silver are contemplated for use in preferred embodiments. Although the preferred emulsions are referred to as silver bromoiodide emulsions, it is appreciated that minor amounts of chloride can be present. For example, silver bromoiodide grains that are epitaxially silver chloride sensitized are specifically contemplated. Examples of such emulsions are provided by Maskasky U.S. Pat. Nos. 4,435,501 and 4,463,087.

Optimum photographic performance is realized when the silver bromoiodide emulsions are tabular grain emulsions. As employed herein the term "tabular grain emulsion" refers to an emulsion in which greater than 50 percent (preferably greater than 70 percent) of the total grain projected area is accounted for by tabular grains. For the green and red image recording units preferred tabular grain emulsions are those in which the projected area criterion above is satisfied by tabular grains having thicknesses of less than 0.3 mm (optimally less than 0.2 mm), an average aspect ratio (ECD/t) of greater than 8 (optimally greater than 12), and/or an average tabularity (ECD/t$^2$) of greater than 25 (optimally greater than 100), where ECD is the mean equivalent circular diameter and t is the mean thickness of the tabular grains, both measured in micrometers (mm). Specific examples of preferred silver bromoiodide emulsions include *Research Disclosure*, Item 22534, January 1983; Wilgus et al U.S. Pat. No. 4,434,426; Kofron et al U.S. Pat. No. 4,439,520; Daubendiek et al U.S. Pat. Nos. 4,414,310, 4,672,027, 4,693,964 and 4,914,014; Solberg et al U.S. Pat. No. 4,433,048; the Maskasky patents cited above; and Piggin et al U.S. Pat. Nos. 5,061,609 and 5,061,616, the disclosures of which are here incorporated by reference. Examples of preferred tabular grain emulsions other than silver bromoiodide emulsions are provided by *Research Disclosure*, Item 308119, December 1989, Section I, subsection A, and Item 22534, cited above.

Interlayers #1 and #2 are hydrophilic colloid layers. Each interlayer preferably contains a conventional oxidized developing agent scavenger to minimize or eliminate color contamination by oxidized developing agent diffusion from one emulsion layer to a next adjacent layer. Interlayer #1 preferably contains a processing solution bleachable yellow absorber such as Carey Lea Silver (CLS) or decolorizable yellow dye to decrease the sensitivity of underlying layers to light in the blue region of the spectrum arising from native or dyed sensitivity. Additional process decolorizable filter dyes may be contained in the Overcoat and/or Interlayers #1 and #2 to further alter the effective spectral sensitivities of underlying layers. Useful absorbers can absorb light in the visible spectrum as well as in the ultraviolet and near infrared regions. Absorbing materials can include filter dyes such as the pyrazolone oxonol dyes of Gaspar U.S. Pat. No. 2,274,782 and Adachi et al U.S. Pat. No. 4,833,246, Diehl et al U.S. Pat. No. 4,877,721, Tanaka et al U.S. Pat. No. 4,904,578, Ohno et al U.S. Pat. No. 4,933,268, Kawashima et al U.S. Pat. No. 4,960,686, Murai et al U.S. Pat. No. 4,996,138, Waki et al U.S. Pat. No. 5,057,404 (with phenolic or naphtholic cyan couplers), Kuwashima et al U.S. Pat. Nos. 5,091,295 (pyrazolediones) and 5,204,236, Momoki et al EPO 0 326 161 (used with amido or carbamoyl substituted hydroxyphenyl compounds), Tai et al EPO 0 388 908, Kawashima et al EPO 0 476 928. Further absorber dyes include the solubilized diaryl azo dyes of Van Campen U.S. Pat. No. 2,956,879, Fujiwhara et al U.S. Pat. No. 4,871,655, Kitchin et al EPO 0 377 961 (azomethines), the solubilized styryl and butadienyl dyes of Heseltine et al U.S. Pat. Nos. 3,423,207 and 3,384,487, the merostyryl dyes of Diehl EPO 0 274 723, the merocyanine dyes of Silberstein et al U.S. Pat. No. 2,527,583 and Ohno U.S. Pat. No. 5,223,382 (with chromanone nucleus), Adachi et al EPO 0 434 026, Callant et al EPO 0 489 973, Jimbo et al EPO 0 519 306 (isoxazole containing methine dyes) and EPO 0 566 063, the merocyanine and oxonol dyes of Oliver (et al) U.S. Pat. Nos. 3,486,897, 3,652,284 and 3,718,472 and the enaminohemioxonol dyes of Brooker et al U.S. Pat. No. 3,976,661.

Ultraviolet absorbers are also known, such as the cyanomethyl sulfone-derived merocyanines of Oliver U.S. Pat. No. 3,723,154, the thiazolidones, benzotriazoles and thiazolothiazoles of Sawdey U.S. Pat. Nos. 2,739,888, 3,253,921 and 3,250,617, Sawdey et al U.S. Pat. No. 2,739,971, Hirose et al U.S. Pat. No. 4,783,394, Takahashi U.S. Pat. No. 5,200,307, Tanji et al U.S. Pat. No. 5,112,728, and Leppard et al EPO 0 323 408, Liebe et al EPO 0 363 820, Roth East German DD 288 249, the triazoles of Heller et al U.S. Pat. No. 3,004,896, the hemioxonols of Wahl et al U.S. Pat. No. 3,125,597 and Weber et al U.S. Pat. No. 4,045,229, the acidic substituted methine oxonols of Diehl et al EPO 0 246 553, the triazines of Leppard et al EPO 0 520 938 and EPO 0 530 135, as well as the other UV absorbers of Liebe et al EPO 0 345 514.

The dyes and ultraviolet absorbers can be mordanted as illustrated by Jones et al U.S. Pat. No. 3,282,699 and Heseltine et al U.S. Pat. Nos. 3,455,693, 3,438,779 and Foss et al U.S. Pat. No. 5,169,747.

Absorbing dyes can be added as particulate dispersions, as described by Lemahieu et al U.S. Pat. No. 4,092,168, Diehl et al WO 88/04795 and EPO 0 274 723, and Factor et al EPO 0 299 435. Additional particulate dispersions of absorbing dyes are described in Factor et al U.S. Pat. No. 4,900,653, Diehl et al U.S. Pat. No. 4,940,654 (dyes with groups having ionizable protons other than carboxy), Factor et al U.S. Pat. No. 4,948,718 (with arylpyrazolone nucleus), Diehl et al U.S. Pat. No. 4,950,586, Anderson et al U.S. Pat. No. 4,988,611 (particles of particular size ranges and substituent pKa values), Diehl et al U.S. Pat. No. 4,994,356, Usagawa et al U.S. Pat. No. 5,208,137, Adachi U.S. Pat. No. 5,213,957 (merocyanines), Usami U.S. Pat. No. 5,238,798 (pyrazolone oxonols), Usami et al U.S. Pat. No. 5,238,799 (pyrazolone oxonols), Diehl et al U.S. Pat. No. 5,213,956 (tricyanopropenes and others), Inagaki et al U.S. Pat. No. 5,075,205, Otp et a; U.S. Pat. No. 5,098,818, Texta U.S. Pat. No. 5,274,109, McManus et al U.S. Pat. No. 5,098,820, Inagaki et al EPO 0 385 461, Fujita et al EPO 0 423 693, Usui EPO 0 423 742 (containing groups with specific pKa values), Usagawa et al EPO 0 434 413 (pyrazolones with particular sulfamoyl, carboxyl and similar substituents), Jimbo et al EPO 0 460 550, Diehl et al EPO 0 524 593 (having alkoxy or cyclic ether substituted phenyl substituents), Diehl et al EPO 0 524 594 (furan substituents) and Ohno EPO 0 552 646 (oxonols).

Absorbing dyes can absorb infrared radiation, as described by Proehl et al EPO 0 251 282, Parton et al EPO 0 288 076, and Japanese Patent Application JA 62/123454. Further infrared absorbing dyes are described in Parton et al U.S. Pat. No. 4,933,269 (cyanines with carbocyclic ring in bridge), Hall et al U.S. Pat. No. 5,245,045 (heptamethine oxonols), Harada EPO 0 568 857. Particular infrared absorbing dyes include those of the cyanine type with indole nuclei such as described in West et al U.S. Pat. No. 5,107,063, Laganis et al U.S. Pat. No. 4,882,265, Harada et al EPO 0 430 244, Parton et al EPO 0 288 076, Delprato et al EPO 0 523 465, Delprato et al EPO 0 539 786 (indolotricarbocyanines with bridge amine substituents) and Harada EPO 0 568 022.

Absorbing dyes having specific substituents intended to assist in their removal during processing by solubilization, oxidation or other methods, are described in Yagihara et al U.S. Pat. No. 4,923,789, Harder et al U.S. Pat. No. 5,158,865, Karino et al U.S. Pat. No. 5,188,928, Kawashima et al EPO 0 409 117 (particular amido, ureido and the like solubilizing groups), Matushita EPO 0 508 432 and Mooberry et al WO 92/21064.

Various other azo type dyes are described in Matejec et al U.S. Pat. No. 5,108,883 (azomethines), Jimbo U.S. Pat. No. 5,155,015 (arylazooxazolinones or arylazobutenolides), Motoki et al U.S. Pat. No. 5,214,141 (azomethines with N-aryl substituents and cyclic amino group), Yamazaki U.S. Pat. No. 5,216,169 (hydroxypyridineazomethines) and Fabricius WO 93/13458 (diketo diazo dyes).

Other absorber dyes are described in Masukawa et al U.S. Pat. No. 4,788,284 (diphenylimidazoles), Ohno et al U.S. Pat. No. 4,920,031 (pyridone oxonols), Shuttleworth et al U.S. Pat. No. 4,923,788 (furanones), Kuwashima et al U.S. Pat. No. 4,935,337 (pyridone oxonols), Carlier et al U.S. Pat. No. 5,187,282 (xanthene derivatives), Loer et al EPO 0 329 491 (trinuclear cyanine with methine bridge having acidic nucleus of type in oxonol or merocyanine dyes), Usagawa et al EPO 0 342 939 (indolocyanines with acid solubilizing groups on back rings), Adachi et al EPO 0 366 145 (pyrazoloazoles), Suzuki et al EPO 0 518 238 (pyrazolotriazoles), Usagawa et al EPO 0 521 664 (silver salts of various dyes), Hirabayashi et al EPO 0 521 668 (silver salts of various dyes), Kawashima et al EPO 0 521 711 (silver salts of pyrimidine containing compounds) and Hall EPO 0 552 010.

Absorbing dyes or dye combinations used to obtain absorption at particular wavelengths, manner of incorporating them in a photographic element, or absorbing dyes plus other components, are described in Ailliet et al U.S. Pat. No. 4,770,984 (location of absorber dyes), Szajewski U.S. Pat. No. 4,855,220 (dye absorbing in region to which layer underneath is sensitized), Toya et al U.S. Pat. No. 5,147,769 (dye in oil droplet dispersion or polymer latex), Stockel et al U.S. Pat. No. 5,204,231 (absorber dye combinations for various wavelengths of absorption), Okada et al EPO 0 319 999 (yellow absorber dye plus colloidal silver), Harada et al EPO 0 412 379, Ohno et al EPO 0 445 627 (dye combinations), Karino EPO 0 456 163 (location and dye amounts), Murai et al EPO 0 510 960, Kawai et al EPO 0 539 978.

In a specifically preferred form of the invention dye images are produced by dye-forming couplers. Couplers capable of forming yellow, magenta, cyan and near infrared absorbing dyes on development are preferred. The couplers forming yellow, magenta and cyan dyes are preferred, since a large selection of photographically optimized couplers of these types are known and in current use in silver halide photography (refer to *Research Disclosure*, Item 36544, Section X, cited above, and to James *The Theory of the Photographic Process*, 4th Ed., Macmillan, N.Y., 1977, Chapter 12, Section III, pp. 353–363).

In this preferred embodiment, the couplers are selected so that the exposure information obtained primarily in the red region of the spectrum results in a cyan dye image, the exposure information obtained primarily in the green region of the spectrum results in a magenta dye image, and the exposure information obtained primarily in the blue region of the spectrum results in a yellow dye image. This correspondence between image dye hue and spectral region recorded when used with a photographic element and photographic process producing a reversal color image facilitates direct viewing of the exposed and photographically processed photographic element. For embodiments in which the color dye forming coupler is contained in the photographic element as coated, the stoichiometric relationship between the amount of silver development and coupler can take on any value useful in controlling density production or image granularity. Emulsion containing layers can contain conventional oxidized developing agent scavengers to modify the relationship between dye image producing silver development and the amount of density produced during photographic development. Oxidized developing agent scavengers are described in *Research Disclosure*, Item 36544, cited above, Section X, sub-section D.

A conventional processing solution decolorizable antihalation layer is shown coated on the surface of the transparent photographic support opposite the image recording units. Alternatively, the antihalation layer can be located between the first emulsion layer above the support and the support. At the latter location it is more effective in improving image sharpness, since reflection at the interface of the first-coated image recording unit and the support is minimized, but at this location it is also less accessible to the processing solutions. Specific examples of antihalation materials and their decoloration are provided by *Research Disclosure*, Item 36544, cited above, Section VIII, sub-section B. An antihalation layer is a preferred feature, but not essential to imaging.

Following imagewise exposure, the photographic element is processed to produce a positive image. Conventional reversal processing includes the steps of black-and-white development of the exposed silver halide grains, stopping development, rendering residual silver halide grains developable by chemical treatment or exposure to actinic radiation, color development to produce a dye image corresponding to the amount of silver halide not imagewise exposed, bleaching of the silver and fixing to remove silver halide.

The photographically processed photographic element is scanned as described above to produce three electronic records. The electronic records obtained are mathematically manipulated to yield a record of the original scene that is advantaged for colorimetric accuracy relative to the photographic elements of the prior art.

STRUCTURE III

Color Negative Photographic Element and Process

Overcoat

Fast Blue Emulsion Image Recording Layer
Slow Blue Emulsion Image Recording Layer
Interlayer #1

Fast Green Emulsion Image Recording Layer
Mid Green Emulsion Image Recording Layer
Slow Green Emulsion Image Recording Layer
Interlayer #2

Fast Red Emulsion Image Recording Layer
Mid Red Emulsion Image Recording Layer
Slow Red Emulsion Image Recording Layer
Antihalation Layer
Transparent Film Support
Auxiliary Information Recording Unit Structure III, described below, demonstrates one of numerous possible embodiments particularly useful for photographic elements and photographic processes which produce negative images. Structure III satisfies all of the requirements of the general discussion of Structure I and features not explicitly otherwise described preferably conform to the comparable features of Structure II described above.

The highest signal-to-noise ratio of an image recording unit made up of a set of emulsion layers of differing threshold sensitivities intended to record exposures in the same region of the spectrum is obtained by controlling the amount of density produced by each contributing emulsion layer. Since the dye image formed in each emulsion layer of the set is of the same hue, the resulting overall dye image cannot be resolved into its component contributions by the individual layers of the set. The most common approach to reducing image granularity in photographic elements photographically processed to produce a negative image is to "coupler starve" some of the emulsion layers. The term "coupler starve" means simply that there is a stoichiometric deficiency of dye image providing material. Thus, at a selected exposure level all of the available dye image providing material is reacted and any additional oxidized developing agent formed as a result of the higher levels of exposure of the emulsion layer does not produce any additional dye. This eliminates the unneeded noisy imaging contribution of the fastest emulsion layer at higher exposure levels.

Preferred embodiments of photographic elements intended to produce negative images after photographic processing are not generally useful for direct viewing. In these embodiments the relationship between the spectral distribution of the exposing radiation recorded and the hue of the associated dye image in each image recording unit formed during photographic processing can take any convenient form.

In addition to incorporated image dye forming couplers, any or all layers within the photographic element may contain colored image dye forming couplers to form integral masks which partially or completely compensate for the interdependencies of image bearing signals obtained by scanning the exposed and photographically processed photographic element. Colored image dye forming couplers useful for this application are described in *Research Disclosure*, Item 36544, cited above, section XII, sub-sections 1 and 2.

While not essential, each emulsion layer containing a dye-forming coupler or other conventional dye image providing material can have its image structure improved by also including a material capable of inhibiting development, such as a development inhibitor releasing (DIR) coupler. DIR couplers of any conventional type can be incorporated in any layer of the photographic element, including interlayers and any emulsion layer that does not form a dye image. Exemplary development inhibitors are illustrated by Whitmore et al U.S. Pat. No. 3,148,062, Barret al U.S. Pat. No. 3,227,554, Hotta et al U.S. Pat. No. 4,409,323, Harder U.S. Pat. No. 4,684,604, and Adachi et al U.S. Pat. No. 4,740,453, the disclosures of which are here incorporated by reference.

Photographic processing of the exposed photographic element to produce a negative image consists of color development of the exposed silver halide grains, stopping development, bleaching of elemental silver, and fixing of silver halide. Washing steps may be added between specified processing steps. Photographic processes resulting in negative images are desired because of their simplicity.

The auxiliary information recording unit is shown in Structure III for the purpose of illustrating ( 1 ) that information recording units can be present in addition to those required to produce the image of the subject being replicated and (2) that the location of information recording units is not restricted to one side of the support. The auxiliary information recording unit can be used to incorporate into the photographic element a scannable record usefully stored with the photographic record. For example, the auxiliary information recording unit can be exposed with a code pattern indicative of the date, time, aperture, shutter speed, frame locant and/or photographic element identification usefully correlated with the photographic image information. The back side (the side of the support opposite the emulsion layers) of the photographic element can be conveniently exposed to auxiliary information immediately following shutter closure concluding imagewise exposure of the front side (the emulsion layer side) of the photographic element. Films containing a magnetic recording layer, such as any of those disclosed in Research Disclosure, Item 34390, Nov. 1992, p. 869, are specifically contemplated. Recent additional publications relating to a transparent magnetic recording layer on a photographic element are illustrated by Sakakibara U.S. Pat. Nos. 5,215,874 and 5,147,768; Kitagawa U.S. Pat. No. 5,187,518, Nishiura U.S. Pat. No. 5,188,789, Mori U.S. Pat. No. 5,227,283, Yokota U.S. Pat. No. 5,229,259, Hirose et al U.S. Pat. No. 5,238,794, Yasuo et al EPO 0 476 535, Masahlko EPO 0 583 787, Yokota Japanese Kokai 92/123,040, Yagi et al Japanese Kokai 92/125,548, 92/146,429 and 92/163,541 and Nagayasu et al Japanese Kokai 92/125,547.

The photographic elements can contain an edge region particularly adapted for scanning, such as those employed to form sound tracks, as illustrated by Sakakibara U.S. Pat. Nos. 5,147,768 and 5,215,84, Kitagawa U.S. Pat. No. 5,187, 518, Nishiura U.S. Pat. No. 5,188,789, Mori U.S. Pat. No. 5,227,283, Yokota U.S. Pat. No. 5,229,259 and Japanese Patent Application 92/203,098, Hirose et al U.S. Pat. No. 5,238,794, Yasuo et al EPO 0 476 535, Masahlko EPO 0 583 787, Yagi et al Japanese Patent Application 90/291,135 and Nagayasu et al Japanese Patent Application 90/246,923.

It is appreciated that the preferred form of Structure III described above is only one of many varied recording layer unit arrangements that can be employed in the practice of the invention. For example, any of the varied Layer Order Arrangements I to VIII inclusive of Kofron et al U.S. Pat. No. 4,439,520, the disclosure of which is here incorporated by reference, are specifically contemplated. Still other layer order arrangements are disclosed by Ranz et al German OLS 2,704,797 and Lohman et al German OLS 2,622,923, 2,622,924 and 2,704,826.

While the invention has been described in terms of photographic elements that produce image dyes that remain within the emulsion image recording unit in which they are formed, it is appreciated that, if desired, any one or all of the image dyes can be transferred to a separate receiver for scanning. Color image transfer imaging systems easily adapted to the practice of the invention in view of the teachings above are summarized in *Research Disclosure*, Item 308119, cited above, Section XXIII, Item 15162 published November 1976, and Item 12331 published July 1974, the disclosures of which are here incorporated by reference.

The photographic elements described above produce spectrally distinguishable dye images upon processing which can be scanned using conventional methods of photographic element scanning. Since photographic elements which satisfy the invention are intended to be scanned and the resultant electronic signals mathematically manipulated prior to production of the final output image, alternate means of producing distinguishable images are also useful in the practice of this invention. Evans et al U.S. Pat. No. 5,350,651 and U.S. Ser. No. 198,415, Simons U.S. Pat. No. 5,350,644 and U.S. Ser. No. 199,862, and Gasper et al U.S. Pat. No. 5,350,650 and U.S. Ser. No. 199,866, the disclosures of which are here incorporated by reference, illustrate photographic elements and means of distinguishing the images formed upon photographic processing of non-image dye forming layers which, apart from the selection of the spectral sensitivity satisfy the imaging requirements of this invention.

While the invention has been described in terms of photographic elements and photographic process which require removal of the developed silver image before scanning, it is appreciated that, if desired, photographic processing can be simplified by elimination of the bleach step. Formation of dye images in at least N-1 image recording units of a photographic element containing N image recording units, in addition to formation of developed silver images in N of the image recording units, is described by Simons et al U.S. Ser. No. 119,866, the disclosure of which is incorporated herein by reference.

Another means useful in producing electronic image records of the required colorimetric accuracy is to use a photographic element in combination with at least one optical filter chosen such that the combination produces effective spectral sensitivities which meet the $\overline{\Delta E^*}_{ab}$ and $\Psi$ requirements of the invention. Suitable filtration may be placed between the scene and the camera lens, between the scene illumination source and the scene, or in both locations. The effective sensitivities of the photographic element in combination with the selected filter, $I'_{red}, I'_{grn}, I'_{blu}$, can be calculated using the following expressions:

$$I'_{red}(\lambda) = I_{red}(\lambda) \cdot F(\lambda)$$

$$I'_{grn}(\lambda) = I_{grn}(\lambda) \cdot F(\lambda)$$

$$I'_{blu}(\lambda) = I_{blu}(\lambda) \cdot F(\lambda)$$

where $I_{red}, I_{grn}, I_{blue}$ are the measured spectral sensitivities of the photographic element determined as previously described and $F(\lambda)$ is the spectral transmission of the filter(s). Alternatively, the spectral sensitivities of the photographic element in combination with the optical filter(s) can be determined by placing the filter(s) of choice between the narrow bandwidth exposure source and the photographic element when determining the exposure required to achieve the specified photographic density. The effective spectral sensitivities determined by calculation or measured directly as described above are substituted for the measured spectral sensitivities in the equations previously described ($I_{red}, I_{grn}, I_{blu}$) for determining values of $\overline{\Delta E^*}_{ab}$ and $\Psi$.

Filters useful for modifying the spectral sensitivity of a photographic element to satisfy the requirements of the invention can be formed using any material which modulates the transmission of light with the required spectral dependence by means of absorption, reflection or luminescence. Selected materials may be formed into useful filters in any of the ways commonly practiced by those skilled in the art including formation into a sheet as a pure material or as a solution or dispersion in a solid matrix (such as gelatin, glass or plastic), applying as a coating on a transparent substrate (such as glass, or plastic), or used in a solution held in a transparent cell. It is also appreciated that any of the mentioned means of producing and utilizing filters useful in the practice of the invention may be combined to achieve the required photographic response.

Spectral sensitizing dyes useful for extending the sensitivity of silver halide emulsions as described previously represent preferred types of chemical compounds useful in the practice of this invention. Transition metal ions and their complexes are also preferred in the practice of this invention. Solvents useful in the preparation of filter solutions include water, alcohols, and other organic solvents, or combinations. Filters commonly used in conventional photographic applications are also contemplated and preferred for use in the practice of this invention. Representative types of filters include, but are not limited to, Conversion Filters, Light Balancing Filters, Photometric Filters, Color Compensating Filters and Color Printing Filters. Filters useful in scientific applications, such as interference filters, are contemplated for use in the practice of this invention.

The invention has been described in terms of one method for transforming image-bearing signals from a scanner to signals which represent the recorded exposure values of the image-capturing photographic element comprised of a specific series of discrete operations. Other methods, such as direct calibration relating recorded exposures to scanned signals or values, may also be used. A direct calibration relating scanner signals from a scanner to original scene colorimetric values can also be used. When these or other appropriate calibration and transformation methods are used, photographic elements incorporating the spectral sensitivities of this invention will yield color signals which closely approximate colorimetric values of the original scene. Transformations can be accomplished using look-up tables or explicit mathematical functions dependent on one or more signals obtained by scanning the exposed and processed photographic element.

EXAMPLES

The invention can be better appreciated by reference to the following specific examples. In each of the examples coating densities, set out in brackets ([]) are reported in terms of grams per square meter (g/m$^2$), except as specifically noted. Silver halide coverages are reported in terms of silver. All emulsions were sulfur and gold sensitized and spectrally sensitized to the spectral region indicated by the layer title. Dye-forming couplers were dispersed in gelatin solution in the presence of approximately equal amounts of coupler solvents, such as tricresyl phosphate, dibutyl phthalate, or diethyl lauramide.

Example 1

A photographic element (Invention Film #1) useful for the practice of the invention was prepared by coating onto a transparent photographic support. The following layers were coated to prepare Invention Film #1 beginning with the layer closest to the photographic support:

Invention Film #1

Layer 1: Process Bleachable Antihalation Underlayer
Layer 2: Slow Red Sensitive Recording Layer
  Gelatin [140];
  Slow red-sensitized silver bromoiodide emulsion (CE3) [10];
  Mid red-sensitized silver bromoiodide emulsion (CE2) [28];
  Cyan dye forming coupler (CC1) [39].
Layer 3: Fast Red Sensitive Recording Layer
  Gelatin [200];
  Fast red-sensitized silver bromoiodide emulsion (CE1) [77];
  Cyan dye forming coupler (CC1) [83].
Layer 4: Interlayer
  Gelatin [60];
  Oxidized Developer Scavenging Agent (DOX2) [13.5].
Layer 5: Slow Green Sensitive Recording Layer
  Gelatin [200];
  Slow green-sensitized silver bromoiodide emulsion (ME3) [15];
  Mid green-sensitized silver bromoiodide emulsion (ME2) [24];
  Magenta dye forming coupler (MC2) [13];
  Magenta dye forming coupler (MC1) [29].
Layer 6: Fast Green Sensitive Recording Layer
  Gelatin [180];
  Fast green-sensitized silver bromoiodide emulsion (ME 1) [73];
  Magenta dye forming coupler (MC2) [21];
  Magenta dye forming coupler (MC1) [50].
Layer 7: Yellow Filter Layer
  Gelatin [180];
  Yellow filter dye (YFD1) [18];
  Yellow filter dye (YFD2) [2];
  Carey Leigh Silver [0.2];
  Oxidized developer scavenging agent (DOX1) [7].
Layer 8: Slow Yellow Recording Layer
  Gelatin [140];
  Slow yellow-sensitized silver bromoiodide emulsion (YE3) [29];
  Mid yellow-sensitized silver bromoiodide emulsion (YE2) [19];
  Yellow dye forming coupler (YC) [68];
Layer 9: Fast Yellow Recording Layer
  Gelatin [250];
  Fast yellow-sensitized silver bromoiodide emulsion (YE 1 ) [99];
  Yellow dye forming coupler (YC) [149];
Layer 10: Supercoat
  Gelatin [220];
  Lippmann silver halide grains [11.4];
  UV filter dye (UV1) [50];
  UV filter dye (UV2) [15];
  Carey-Leigh silver [0.25];
  Bis(vinylsulfonyl)methane (1.8% of total gelatin).

Cyan dye forming coupler (CC1) had the following structure:

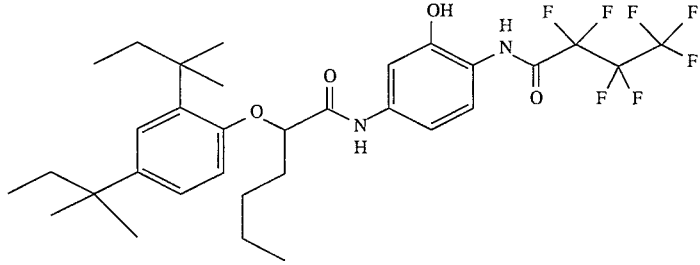

Magenta dye forming coupler (MC1) had the following structure:

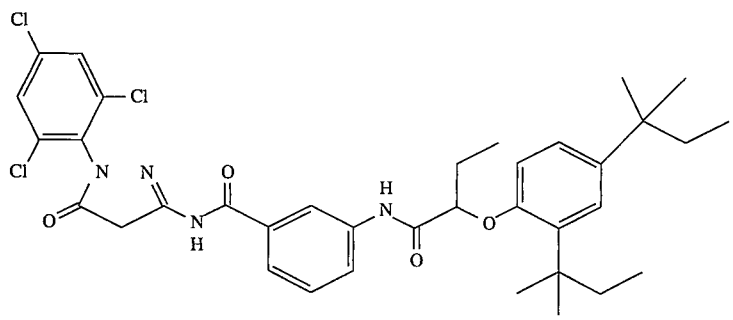
Magenta dye forming coupler (MC2) had the following structure:
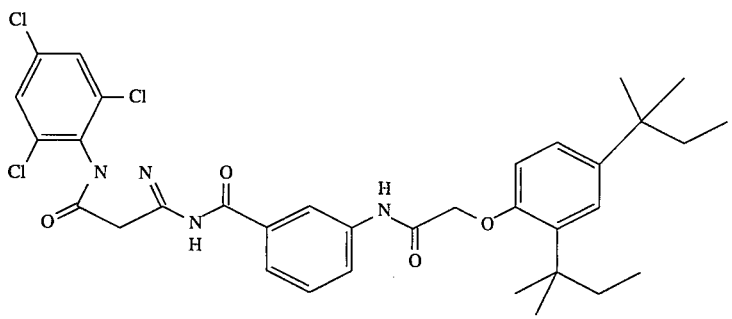
Yellow dye forming coupler (YC) had the following structure:
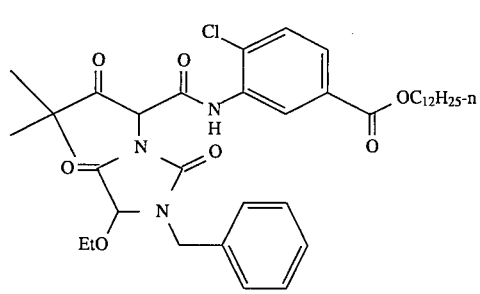
Oxidized developer scavenger (DOX1) had the following structure:
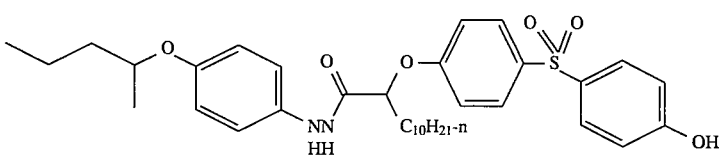
Oxidized developer scavenger (DOX2) had the following structure:
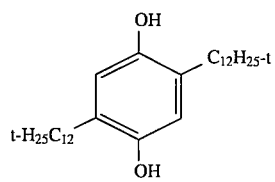
Yellow filter dye (YFD1) had the following structure:
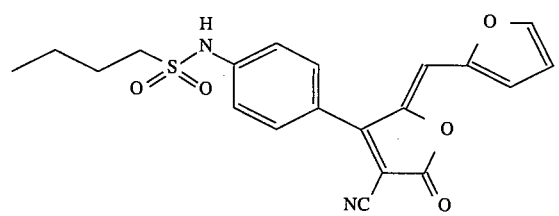

Yellow filter dye (YFD2) had the following structure:

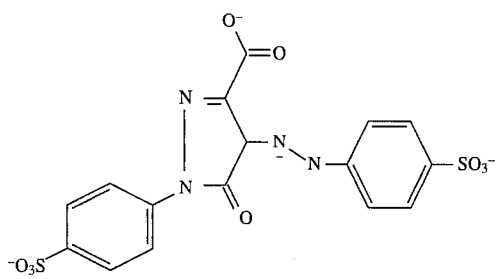

UV filter dye (UV1) had the following structure:

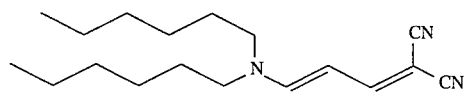

UV filter dye (UV2) had the following structure:

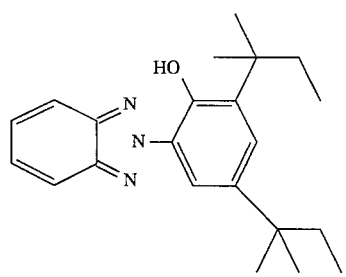

The characteristics of the silver halide image recording emulsions are tabulated in the following table.

| Emulsion Component | Average Grain Size | Mole % Iodide | Spectral Sensitizing Dye (mmole of dye/mole silver) | |
|---|---|---|---|---|
| YE1 | 1.46 | 2.0 | 0.180 | YSD1 |
|  |  |  | 0.120 | YSD2 |
| YE2 | 0.68 | 3.4 | 0.360 | YSD1 |
|  |  |  | 0.240 | YSD2 |
| YE3 | 0.37 | 3.4 | 0.420 | YSD1 |
|  |  |  | 0.280 | YSD2 |
| ME1 | 0.56 | 3.0 | 0.130 | MSD1 |
|  |  |  | 0.210 | MSD2 |
|  |  |  | 0.210 | MSD3 |
| ME2 | 0.26 | 4.8 | 0.220 | MSD1 |
|  |  |  | 0.400 | MSD2 |
|  |  |  | 0.260 | MSD3 |
| ME3 | 0.15 | 4.8 | 0.250 | MSD1 |
|  |  |  | 0.450 | MSD2 |
|  |  |  | 0.300 | MSD3 |
| CE1 | 0.50 | 3.0 | 0.220 | CSD1 |
|  |  |  | 0.140 | CSD2 |
|  |  |  | 0.040 | CSD3 |
| CE2 | 0.26 | 4.8 | 0.330 | CSD1 |
|  |  |  | 0.210 | CSD2 |
|  |  |  | 0.040 | CSD3 |
| CE3 | 0.15 | 4.8 | 0.385 | CSD1 |
|  |  |  | 0.245 | CSD2 |
|  |  |  | 0.070 | CSD3 |

Yellow spectral sensitizing dye (YSD1) had the following structure:

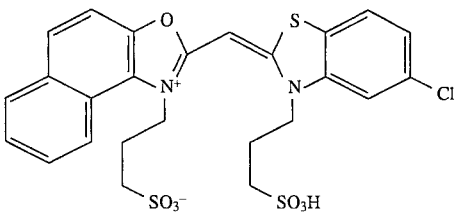

Yellow spectral sensitizing dye (YSD2) had the following structure:

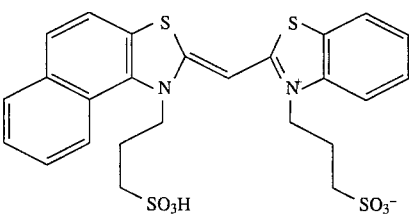

Magenta spectral sensitizing dye (MSD1) had the following structure:

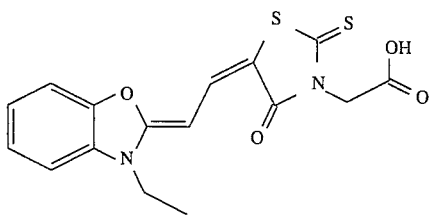

Magenta spectral sensitizing dye (MSD2) had the following structure:

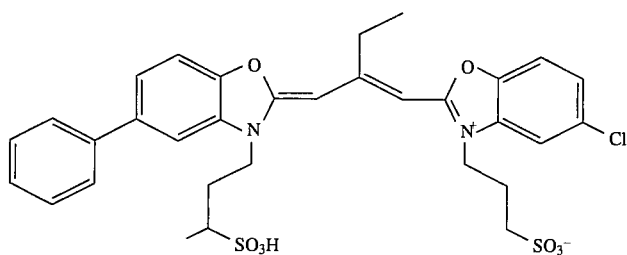

Magenta spectral sensitizing dye (MSD3) had the following structure:

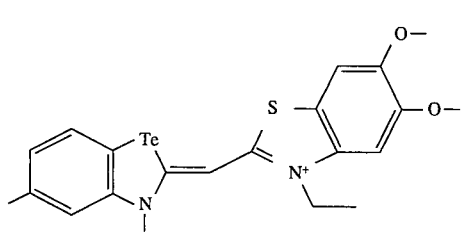

Cyan spectral sensitizing dye (CSD1) had the following structure:

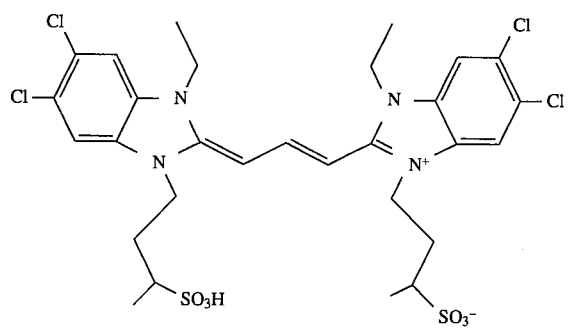

Cyan spectral sensitizing dye (CSD2) had the following structure:

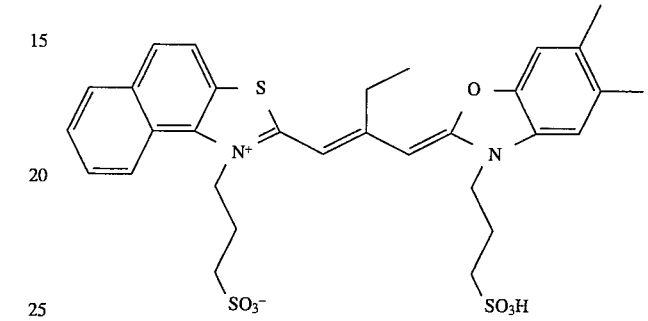

Cyan spectral sensitizing dye (CSD3) had the following structure:

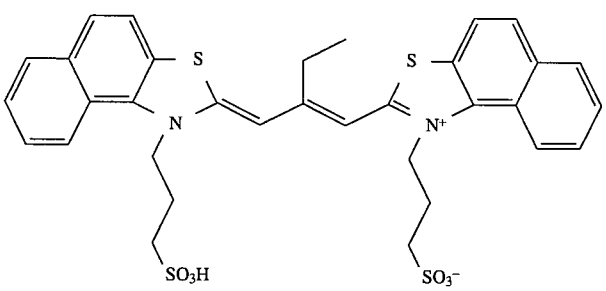

In addition to the components specified above, 4-hydroxy-6-methyl-1,3,3A,7-tetraazindene, sodium salt was included in each imaging emulsion containing layer and surfactants were included in all layers to facilitate coating.

Comparison Film #1 was prepared by coating onto a transparent photographic support. The following layers were coated to prepare Comparison Film #1 beginning with the layer closest to the photographic support:

Comparison Film #1

Layer 1: Process Bleachable Antihalation Underlayer
Layer 2: Slow Red Sensitive Recording Layer
  Gelatin [140];
  Slow red-sensitized silver bromoiodide emulsion (CE6) [10];
  Mid red-sensitized silver bromoiodide emulsion (CE5) [28];
  Cyan dye forming coupler (CC1) [39].
Layer 3: Fast Red Sensitive Recording Layer
  Gelatin [200];
  Fast red-sensitized silver bromoiodide emulsion (CE1) [77];
  Cyan dye forming coupler (CC1) [83].
Layer 4: Interlayer
  Gelatin [60];
  Oxidized Developer Scavenging Agent (DOX2) [13.5].
Layer 5: Slow Green Sensitive Recording Layer
  Gelatin [200];
  Slow green-sensitized silver bromoiodide emulsion (ME6) [15];
  Mid green-sensitized silver bromoiodide emulsion (ME5) [24];
  Magenta dye forming coupler (MC2) [13];
  Magenta dye forming coupler (MC1) [29].
Layer 6: Fast Green Sensitive Recording Layer
  Gelatin [180];
  Fast green-sensitized silver bromoiodide emulsion (ME4) [73];
  Magenta dye forming coupler (MC2) [21];
  Magenta dye forming coupler (MC1) [50].
Layer 7: Yellow Filter Layer
  Gelatin [54];
  Yellow filter dye (YFD2) [11.5];
  Carey Leigh Silver [6.9];
  Oxidized developer scavenging agent (DOX1) [7].
Layer 8: Slow Yellow Recording Layer
  Gelatin [140];
  Slow yellow-sensitized silver bromoiodide emulsion (YE6) [29];
  Mid yellow-sensitized silver bromoiodide emulsion (YE5) [19];
  Yellow dye forming coupler (YC) [68];
Layer 9: Fast Yellow Recording Layer
  Gelatin [250];
  Fast yellow-sensitized silver bromoiodide emulsion (YE4) [99];
  Yellow dye forming coupler (YC) [149];
Layer 10: Supercoat
  Gelatin [220];
  Lippmann silver halide grains [11.4];
  UV filter dye (UV 1 ) [8];
  UV filter dye (UV2) [35.2];
  Carey-Leigh silver [0.25];
  Bis(vinylsulfonyl)methane (1.8% of total gelatin).

The characteristics of the silver halide image recording emulsions are summarized in the following table:

| Emulsion Component | Average Grain Size | Mole % Iodide | Spectral Sensitizing Dye (mmole of dye/mole silver) |
|---|---|---|---|
| YE4 | 1.46 | 2.0 | 0.300 YSD1 |
| YE5 | 0.68 | 3.4 | 0.700 YSD1 |
| YE6 | 0.37 | 3.4 | 0.700 YSD1 |
| ME4 | 0.70 | 2.0 | 0.276 MSD4 |
|  |  |  | 0.149 MSD5 |
| ME5 | 0.26 | 4.8 | 0.247 MSD4 |
|  |  |  | 0.462 MSD5 |
| ME6 | 0.15 | 4.8 | 0.286 MSD4 |
|  |  |  | 0.534 MSD5 |
| CE4 | 0.56 | 3.0 | 0.318 CSD4 |
|  |  |  | 0.025 CSD5 |
| CE5 | 0.26 | 4.8 | 0.523 CSD4 |
|  |  |  | 0.042 CSD5 |
| CE6 | 0.15 | 4.8 | 0.737 CSD4 |
|  |  |  | 0.059 CSD5 |

Magenta spectral sensitizing dye (MSD4) had the following structure:

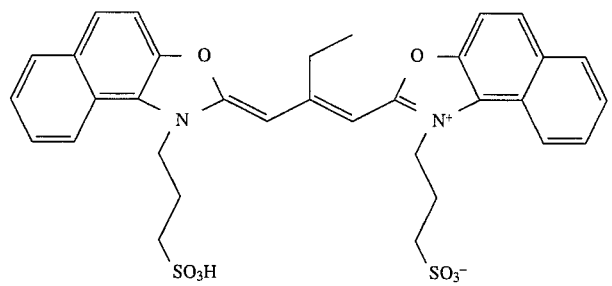

Magenta spectral sensitizing dye (MSD5) had the following structure:

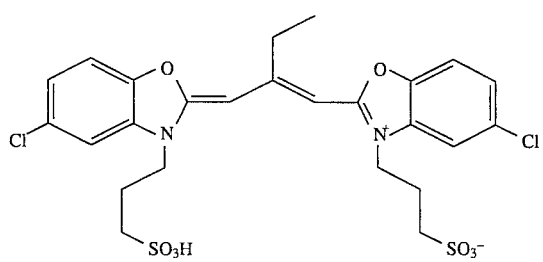

Cyan spectral sensitizing dye (CSD4) had the following structure:

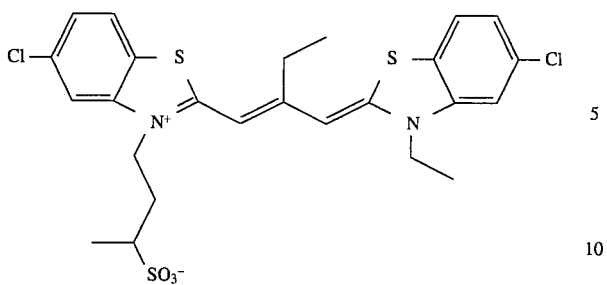

Cyan spectral sensitizing dye (CSD5) had the following structure:

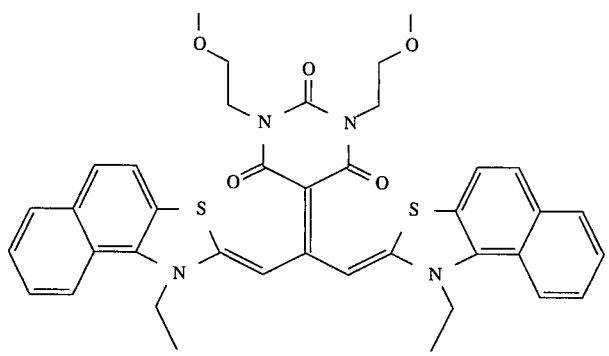

In addition to the components specified above, 4-hydroxy-6-methyl-1,3,3A,7-tetraazindene, sodium salt was included in each imaging emulsion containing layer and surfactants were included in all layers to facilitate coating.

Samples of the Invention and Comparison Films were exposed in a sensitometer using a light source passed through a graduated neutral density step wedge. The central wavelength of the exposing light source was varied in 10 nm increments and a separate exposure was made for each. The exposure source intensity and exposure time were known for each exposure condition.

The exposed photographic element was processed according to the following procedure:

1. Black-and-white develop in Kodak First Developer, Process E6 at 38° C. (6 minutes).
2. Wash (2 minutes).
3. Fog in Kodak Reversal Bath, Process E6 (2 minutes).
4. Color develop in Kodak Color Developer, Process E6 at 38° C. (6 minutes).
5. Treat with Kodak Conditioner, Process E6 (2 minutes).
6. Bleach in Kodak Bleach, Process E6 (6 minutes).
7. Fix in Kodak Fixer, Process E6 (4 minutes).
8. Wash (4 minutes).
9. Stabilize with Kodak Stabilizer, Process E6 (1 minute).
10. Dry photographic element.

Figure 1:
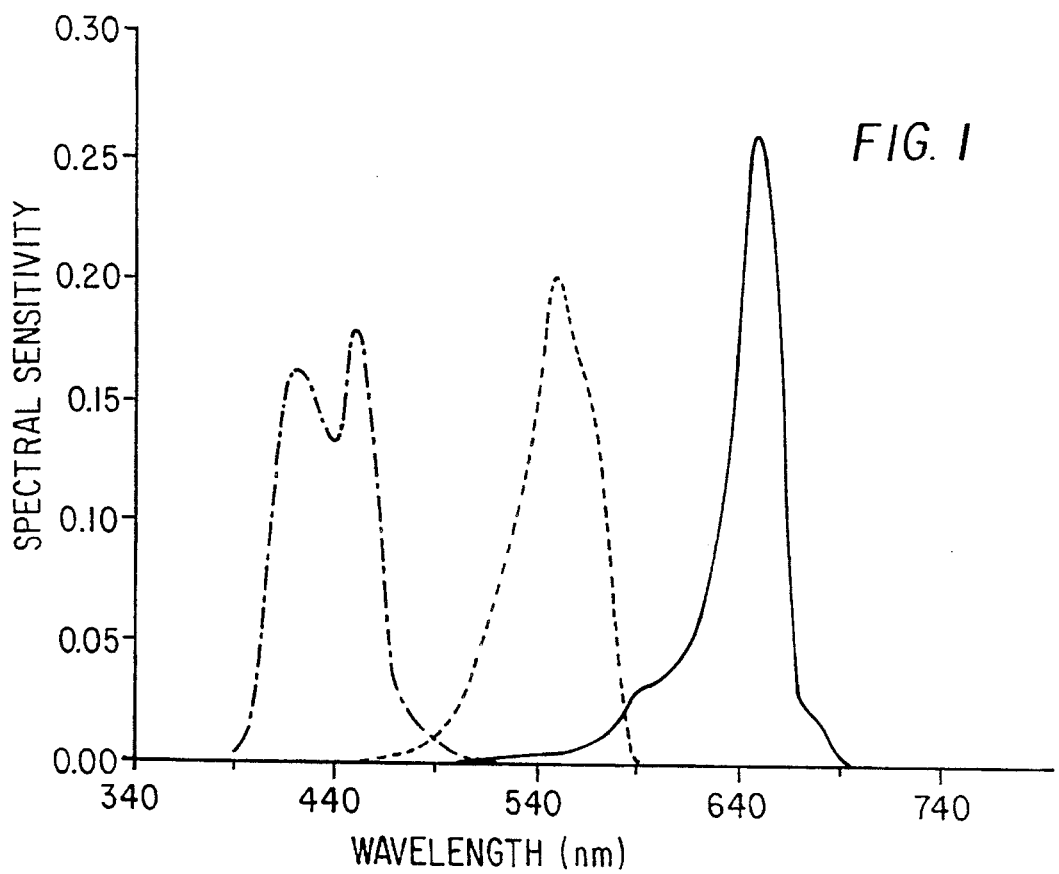
FIG. 1 is a plot of the spectral sensitivities of color reversal Film #1.
Figure 2:
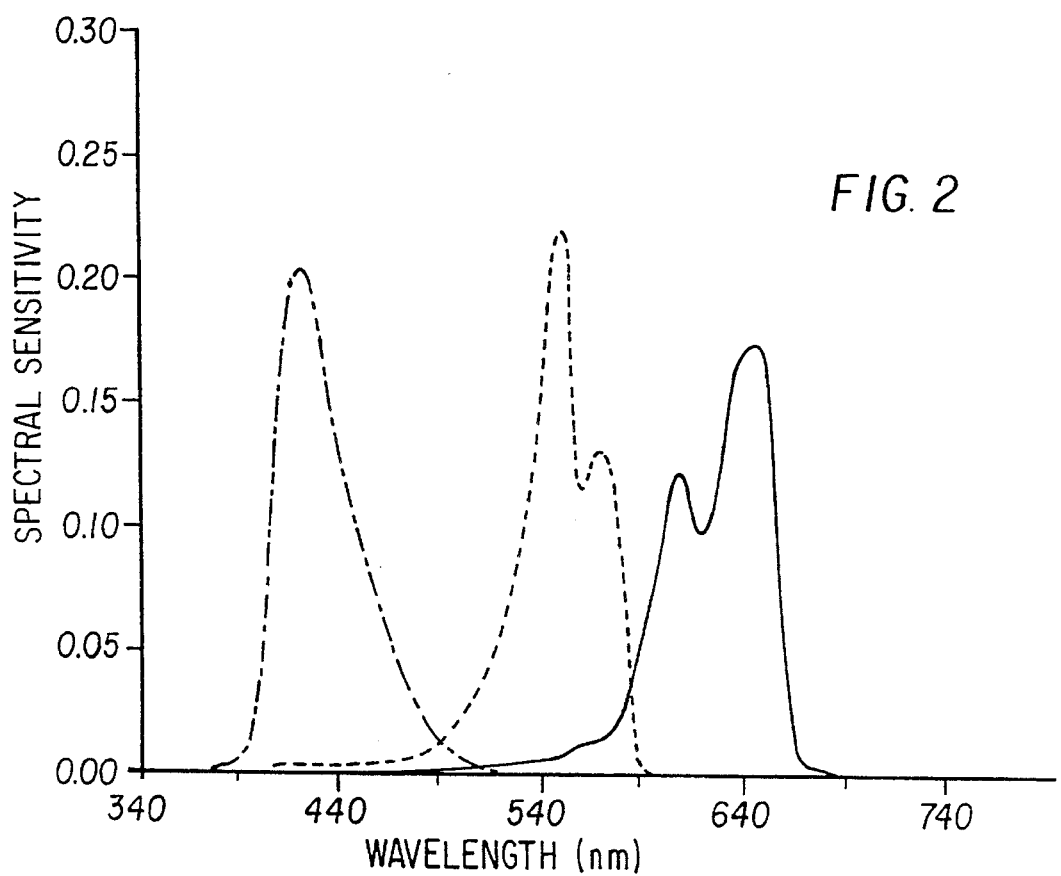
FIG. 2 is a plot of the spectral sensitivities of color reversal Film #2.
Figure 3:
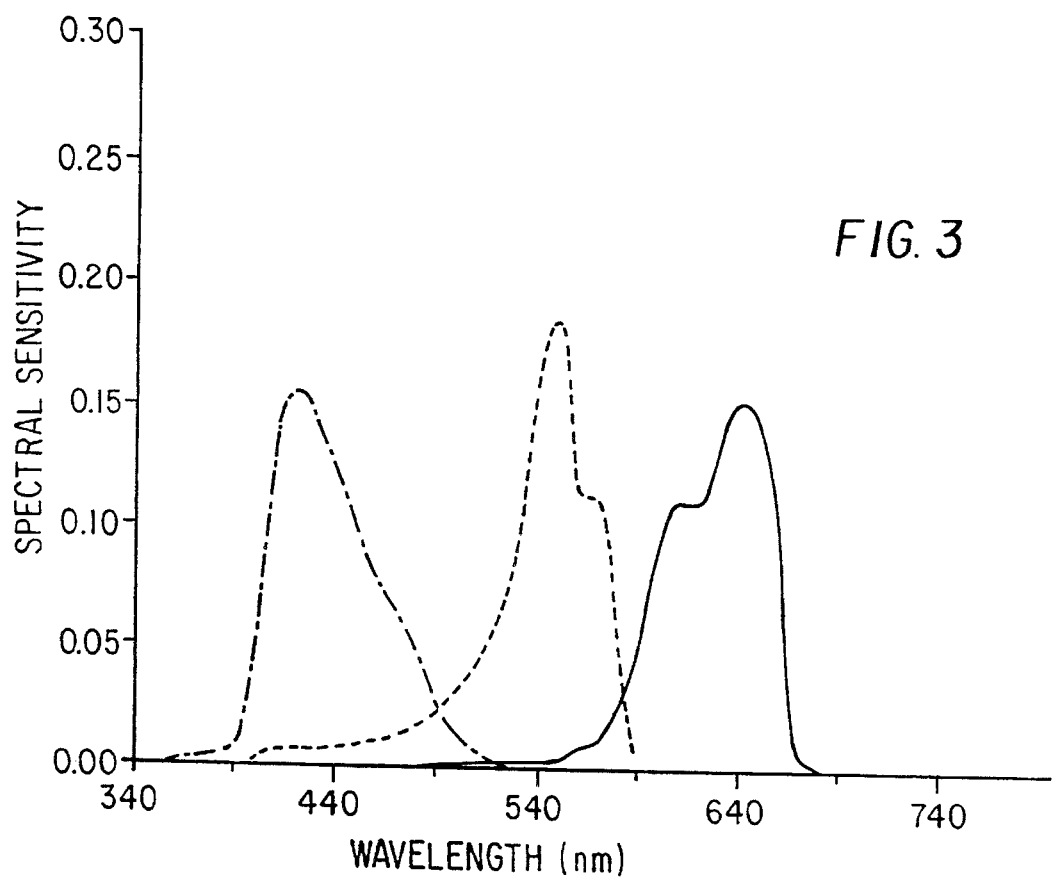
FIG. 3 is a plot of the spectral sensitivities of color negative Film #1.
Figure 4:
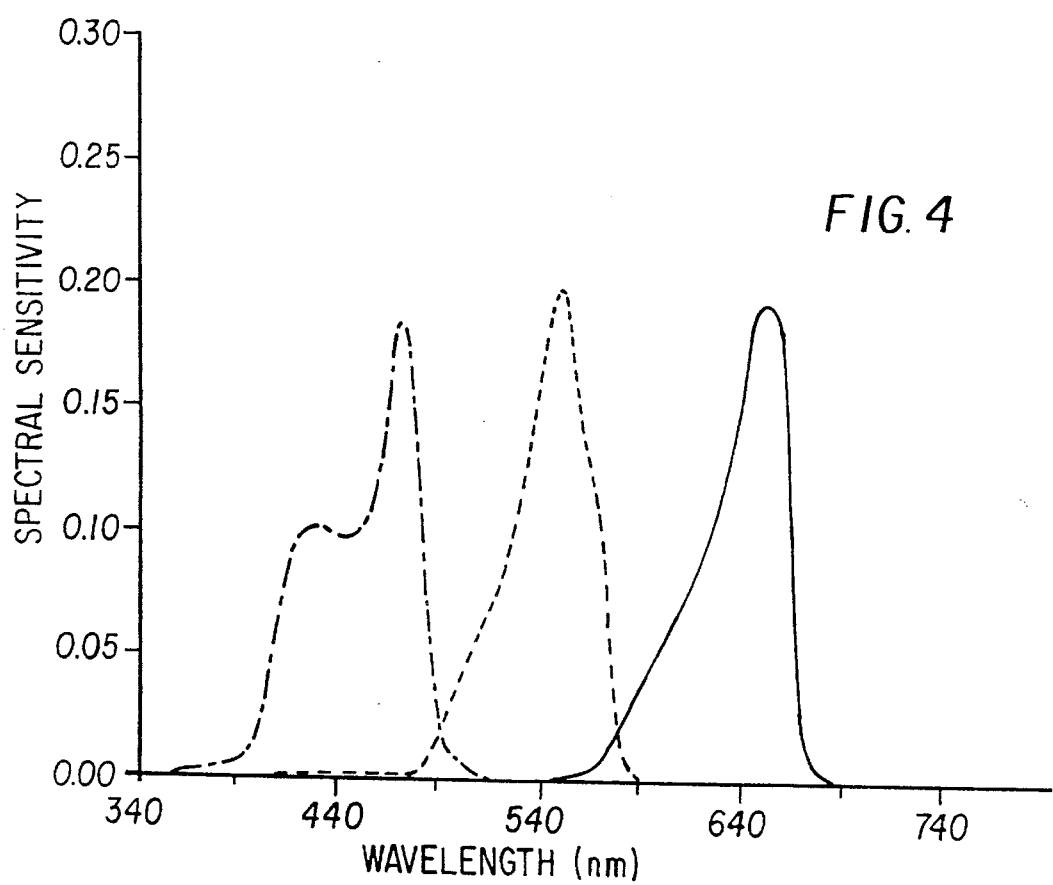
FIG. 4 is a plot of the spectral sensitivities of color negative Film #2.
Figure 5:
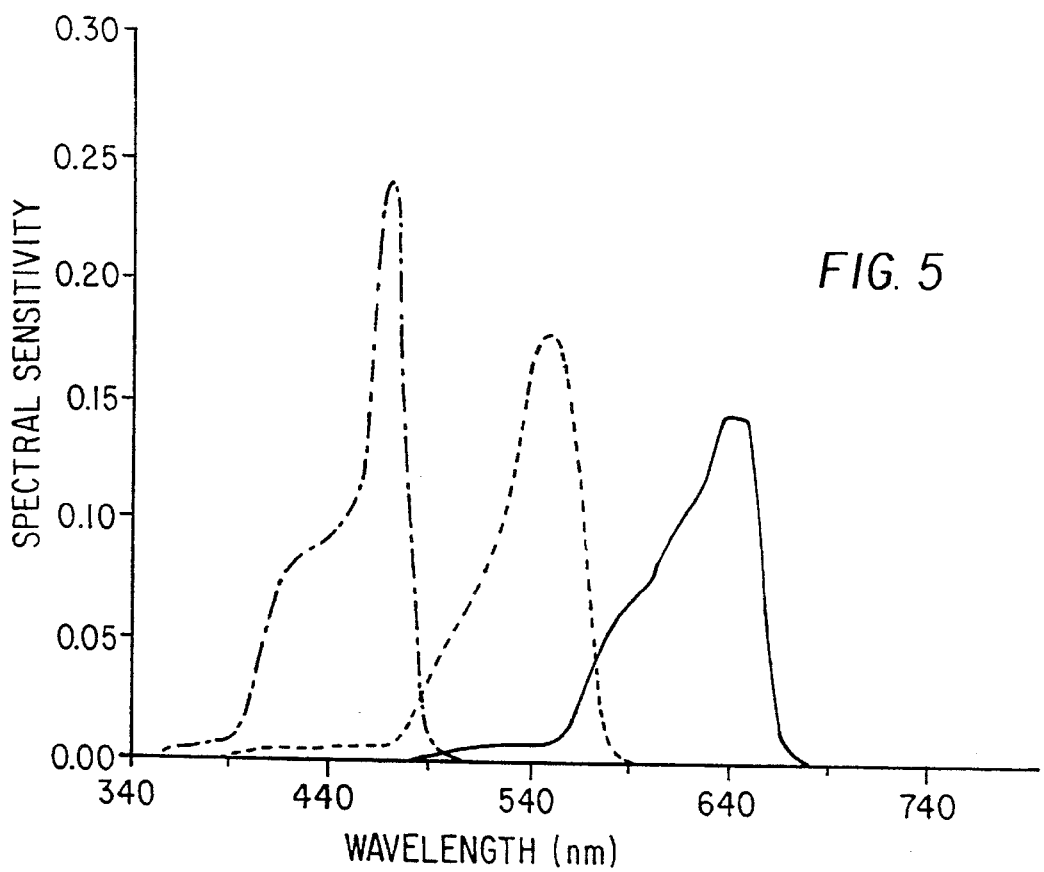
FIG. 5 is a plot of the spectral sensitivities of color negative Film #3.
Figure 6:
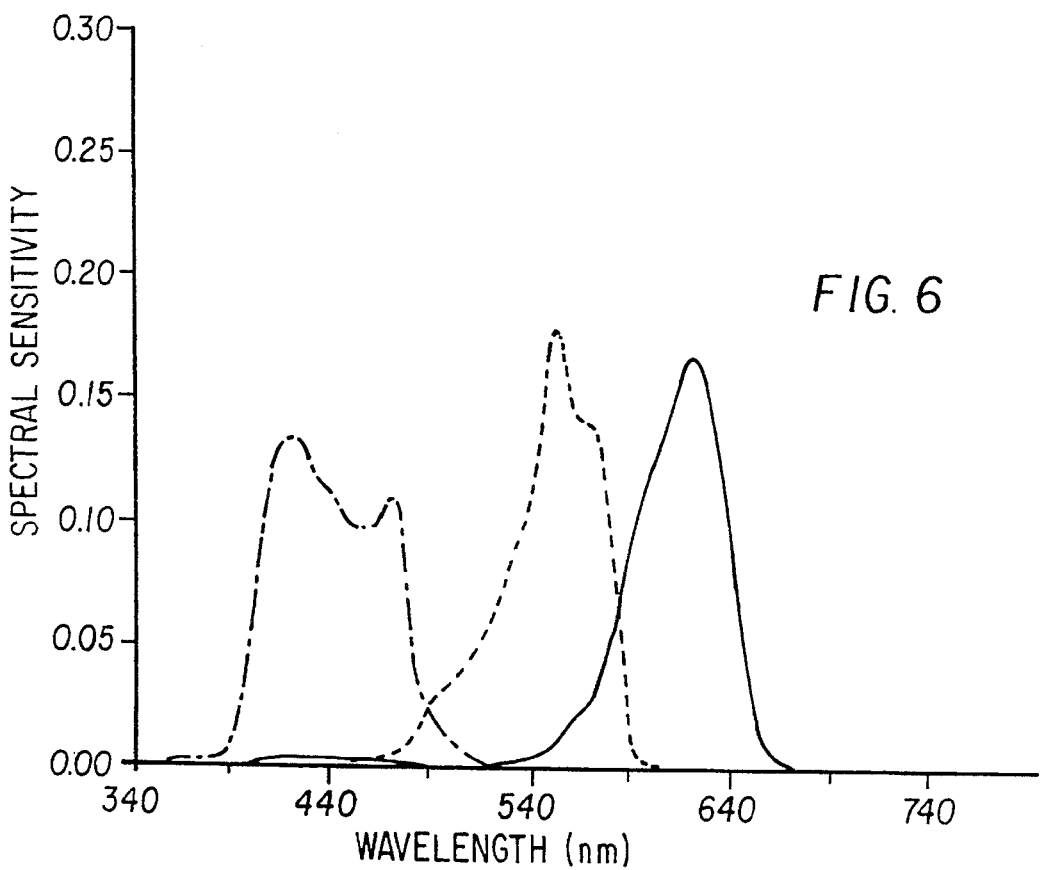
FIG. 6 is a plot of the spectral sensitivities of color negative Film #4.
Figure 7:
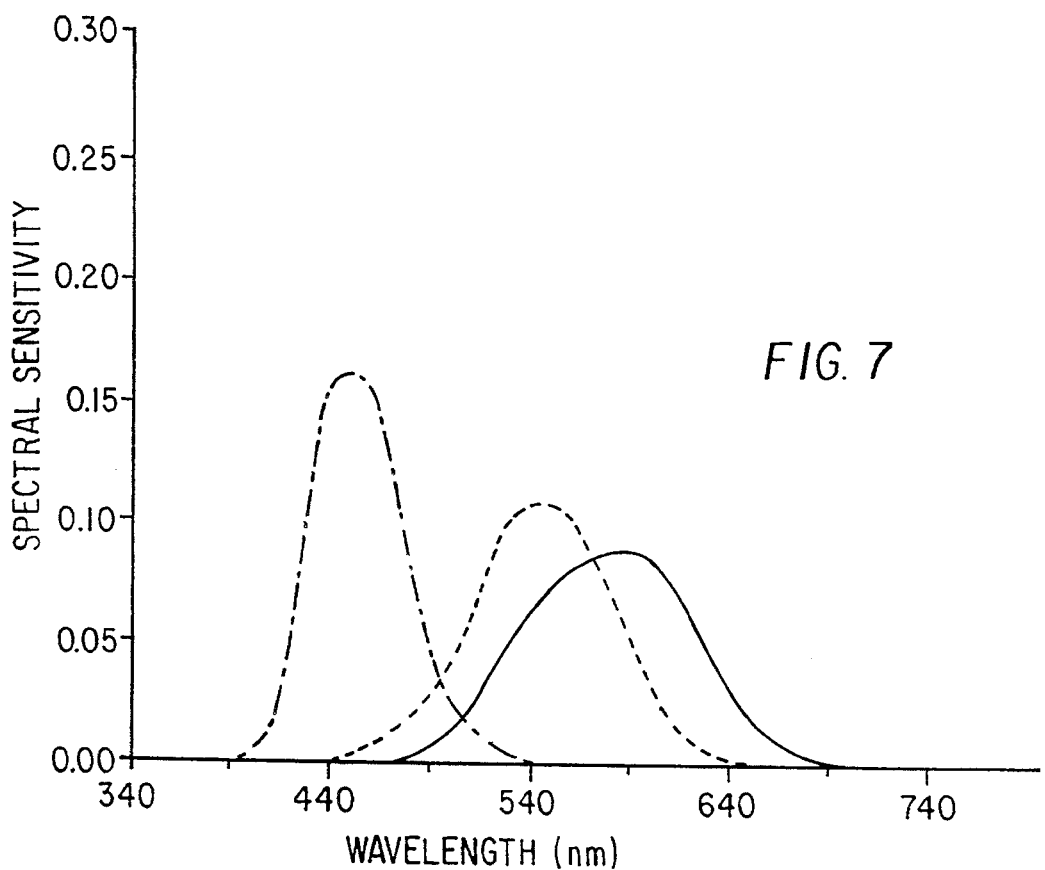
FIG. 7 is a plot of the spectral sensitivities to approximate color matching functions of the prior art.
Figure 8:
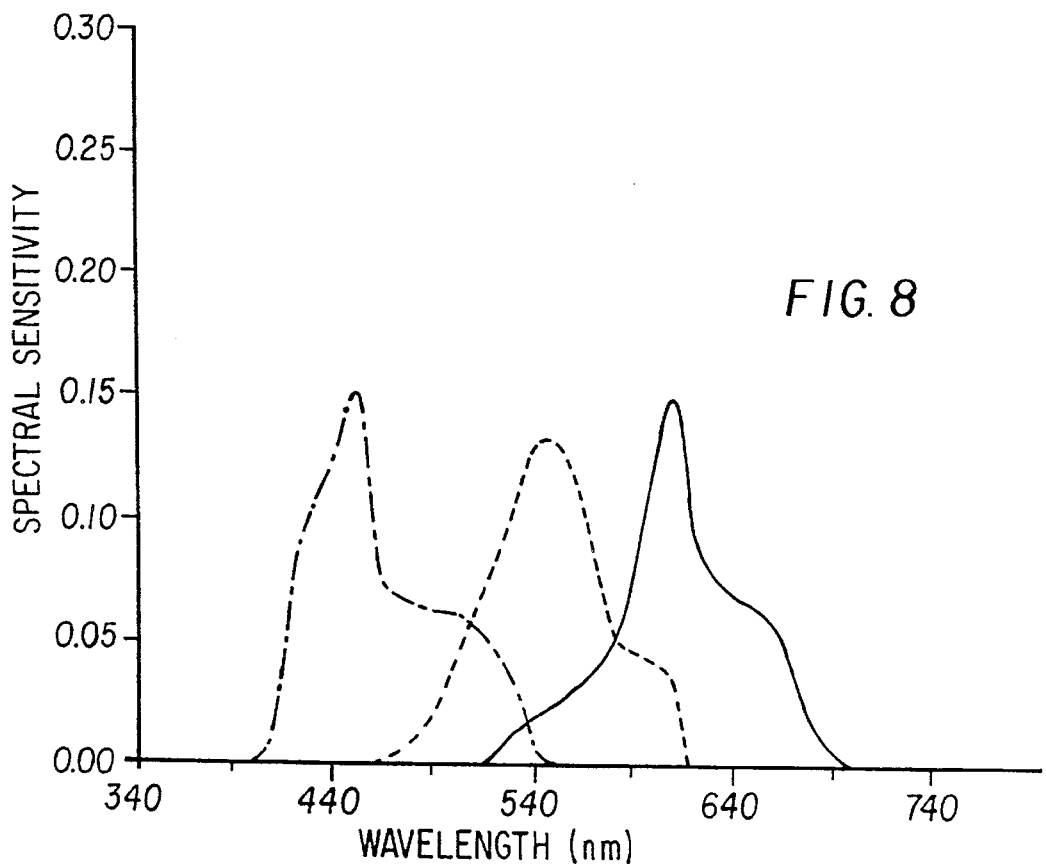
FIG. 8 is a plot of one representative set of spectral sensitivities of the prior art.
Figure 9:
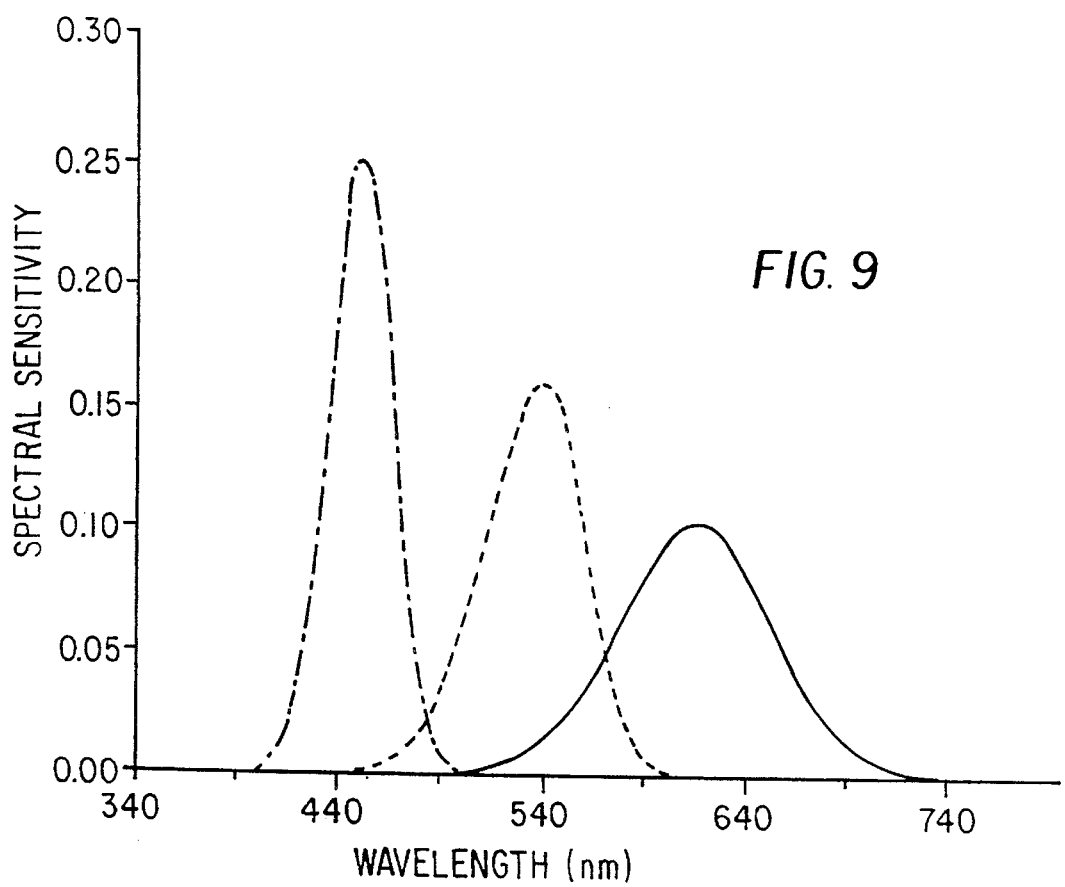
FIG. 9 is another plot of one representative set of spectral sensitivities of the prior art.
Figure 12:
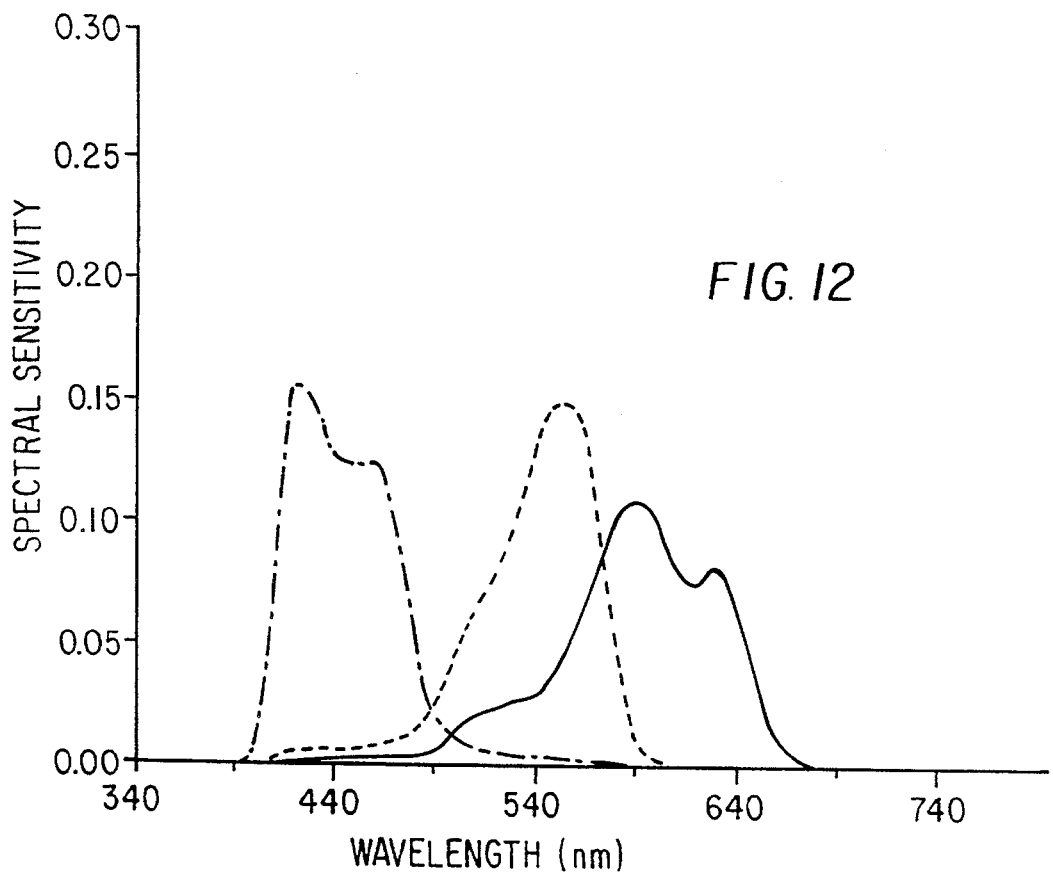
FIG. 12 is a plot of the spectral sensitivities of Invention Film #1.

The red, green, and blue transmission integral densities of the exposed and processed photographic element were measured using a densitometer having Status A responsivities. Spectral sensitivity was measured by determining the exposure values required to achieve a density of 1.0 for each exposing wavelength. A plot of spectral sensitivity as a function of exposing wavelength for the Invention and Comparison Films are shown in FIGS. 12 and 2, respectively.

Matrix M for Invention Film#1 was determined to be as follows:

$$M_{InventionFilm1} = \begin{bmatrix} 2.299 & -1.276 & -0.024 \\ -0.071 & 1.199 & -0.128 \\ -0.036 & -0.106 & 1.141 \end{bmatrix}.$$

Matrix M for the Comparison Film was determined to be as follows:

$$M_{ComparisonFilm} = \begin{bmatrix} 1.418 & -0.306 & -0.112 \\ -0.022 & 1.053 & -0.031 \\ 0.001 & -0.100 & 1.099 \end{bmatrix}.$$

Values of $\overline{\Delta E^*}_{ab}$ and $\Psi$ were calculated using the procedures described above and the M matrices shown. Values found for Invention Film #1 were 2.1 and 5.0, respectively. Values of $\overline{\Delta E^*}_{ab}$ and $\Psi$ found for the Comparison Film were, 5.4 and 3.6, respectively. Electronic image-bearing signals which satisfy the requirements of the invention are produced when Invention Film #1 is used to record a scene, the exposed film is photographically processed as described above and the processed film is scanned with an electro-optical scanning device pixel-wise.

Example 2

Invention Film #1 was repeated with the following exceptions:
Layer 4: Interlayer
  Gelatin [60];
  Magenta filter dye (MFD) [15].
  Oxidized Developer Scavenging Agent (DOX2) [13.5].
Layer 7: Yellow Filter Layer
  Gelatin [54];
  Yellow filter dye (YFD2) [11.5];
  Carey-Leigh Silver [6.9];
  Oxidized developer scavenging agent (DOX1) [7].
Layer 10: Supercoat
  Gelatin [220];
  Lippmann silver halide grains [I 1.4];
  UV filter dye (UV 1 ) [8];
  UV filter dye (UV2) [35.2];
  Carey-Leigh silver [0.25];
  Bis(vinylsulfonyl)methane (1.8% of total gelatin).

Figure 13:
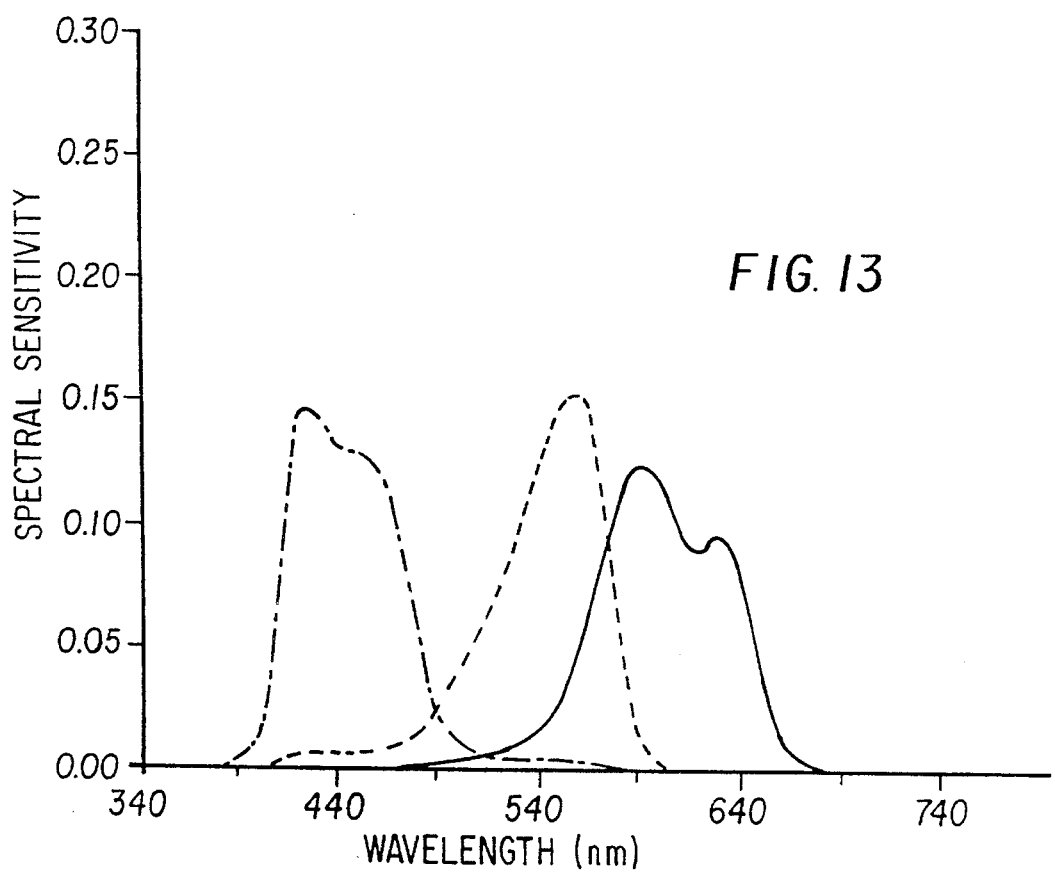
FIG. 13 is a plot of the spectral sensitivities of Invention Film #2.

Invention Film #2 was exposed and chemically processed as described in example 1. The spectral sensitivity of Invention Film #2 was determined as described above and is shown in FIG. 13. Matrix M was determined to be the following:

$$M_{InventionFilm2} = \begin{bmatrix} 1.885 & -0.895 & 0.010 \\ -0.070 & 1.191 & -0.121 \\ -0.028 & -0.114 & 1.141 \end{bmatrix}.$$

Values of $\overline{\Delta E^*}_{ab}$ and $\Psi$ for Invention Film #2 were determined to be 2.0 and 4.4, respectively. As seen by the values of $\overline{\Delta E^*}_{ab}$ and $\Psi$ Invention Film #2 has comparable colorimetric recording accuracy to Invention Film #1, but superior signal to noise performance. Electronic image-bearing signals which satisfy the requirements of the invention are produced when Invention Film #2 is used to record a scene, the exposed film is photographically processed as described above and the processed film is scanned with an electro-optical scanning device pixel-wise.

Example 3

A photographic element was combined with a sheet filter and a solution filter to produce a system for producing electronic image records satisfying the requirements of the invention. Color Negative Film #3 from Table I was combined with a solution filter and a sheet filter. A filter solution containing $7.0 \times 10^-$ moles of FD 1 and $1.0 \times 10^{-5}$ moles of FD2 dissolved in a mixture of 500 ml of methanol and 500 ml of water was prepared and placed in a transparent glass filter cell having an optical pathlength of 1 cm. The solution filter was used in combination with a Kodak Color Compensating Filter™ CC20Y.

Filter Dye 1 (FD1) had the following structure:

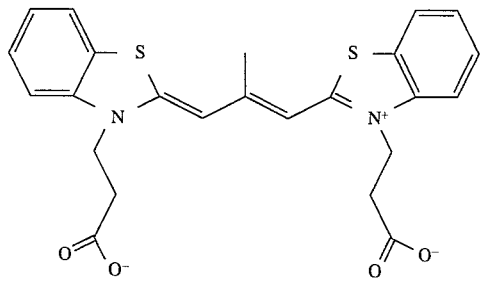

Filter Dye 2 (FD2) had the following structure:

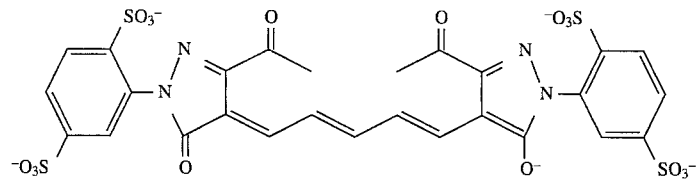

Spectral sensitivity of the combination of photographic element and optical filters is determined by placing the described filter combination between Color Negative Film #3 and the exposing light source in a sensitometer in which the light source passes through a graduated neutral density step wedge. The central wavelength of the exposing light source is varied in 10 nm increments making separate exposures for each. The exposure source intensity and exposure time are known for each exposure condition.

The exposed photographic element is processed according to the following procedure:

1. Develop in Kodak Flexicolor C41™ developer at 38° C. (3.25 minutes).
2. Bleach in Kodak Flexicolor C41™ bleach (4 minutes).
3. Wash (3 minutes).
4. Fix in Kodak Flexicolor C41™ fixer (6 minutes).
5. Wash (4 minutes).
6. Dry photographic element.

Figure 14:
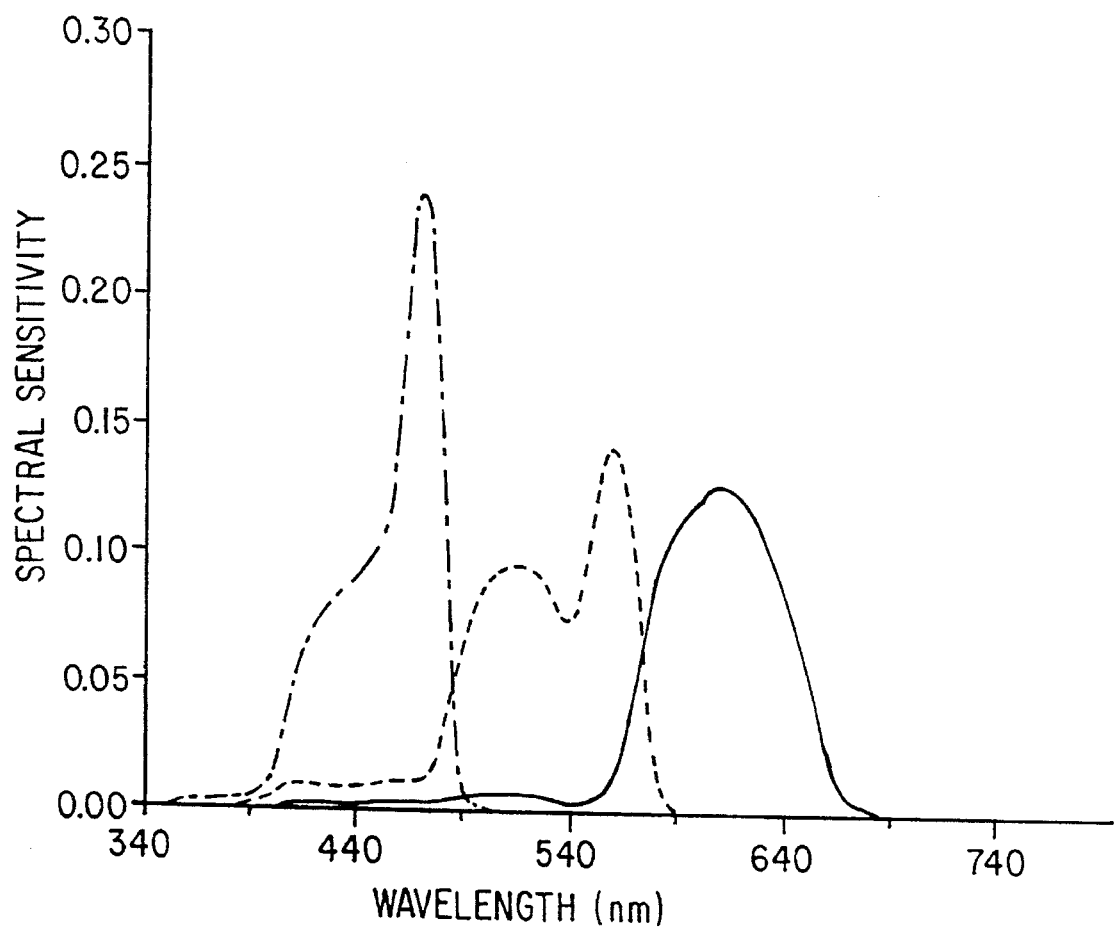
FIG. 14 is a plot of the spectral sensitivities of color negative Film #3 and its filters.

The red, green, and blue transmission integral densities of the exposed and processed photographic element are measured using a densitometer having Status M responsivities. Spectral sensitivity is measured by determining the exposure values required to achieve a density of 0.2 above the minimum density formed in the absence of exposure for each exposing wavelength. FIG. 14 represents a plot of spectral sensitivity as a function of exposing wavelength for the combination of Color Negative Film #3 and the described filters.

Matrix M for the Color Negative Film #3 and the described filters is as follows:

$$M_{Film+Filter} = \begin{bmatrix} 1.560 & -0.544 & -0.093 \\ -0.025 & 1.306 & -0.281 \\ -0.018 & -0.127 & 1.145 \end{bmatrix}.$$

Values of $\overline{\Delta E^*}_{ab}$ and $\Psi$ are calculated using the procedures described above and the M matrix shown. Values found for the combination of Color Negative Film #3 and the filters are 2.3 and 4.1, respectively. Color Negative Film #3 in combination with the described filters produces electronic image-bearing signals which satisfy the requirements of the invention when used to record a scene, the exposed film is photographically processed as described above and the processed film is scanned with an electro-optical scanning device pixel-wise.

The invention has been described in detail with particular reference to preferred embodiments thereof, but it will be understood that variations and modifications can be effected within the spirit and scope of the invention.

APPENDIX A
Spectral Reflectance of 190 Test Colors

| Wavelength (nm) | Patch Number | | | | | | | | | |
|---|---|---|---|---|---|---|---|---|---|---|
| | 1 | 2 | 3 | 4 | 5 | 6 | 7 | 8 | 9 | 10 |
| 380 | 0.0600 | 0.0649 | 0.1365 | 0.1995 | 0.1161 | 1.1193 | 0.1089 | 0.0944 | 0.0700 | 0.0548 |
| 390 | 0.0418 | 0.0758 | 0.2251 | 0.1995 | 0.1934 | 0.1923 | 0.1638 | 0.1302 | 0.0869 | 0.0592 |
| 400 | 0.0299 | 0.0833 | 0.4026 | 0.1995 | 0.3419 | 0.3034 | 0.2334 | 0.1664 | 0.1013 | 0.0625 |
| 410 | 0.0237 | 0.0862 | 0.6230 | 0.1995 | 0.4966 | 0.3883 | 0.2756 | 0.1846 | 0.1078 | 0.0635 |
| 420 | 0.0209 | 0.0882 | 0.7415 | 0.1995 | 0.5611 | 0.4166 | 0.2879 | 0.1912 | 0.1110 | 0.0644 |
| 430 | 0.0195 | 0.0889 | 0.7686 | 0.1995 | 0.5760 | 0.4217 | 0.2919 | 0.1929 | 0.1118 | 0.0648 |
| 440 | 0.0190 | 0.0898 | 0.7776 | 0.1995 | 0.5830 | 0.4247 | 0.2944 | 0.1946 | 0.1130 | 0.0656 |
| 450 | 0.0190 | 0.0905 | 0.7837 | 0.1995 | 0.5881 | 0.4268 | 0.2964 | 0.1958 | 0.1137 | 0.0661 |
| 460 | 0.0190 | 0.0899 | 0.7861 | 0.1995 | 0.5903 | 0.4270 | 0.2964 | 0.1955 | 0.1134 | 0.0657 |
| 470 | 0.0190 | 0.0890 | 0.7874 | 0.1995 | 0.5923 | 0.4268 | 0.2967 | 0.1948 | 0.1129 | 0.0652 |
| 480 | 0.0195 | 0.0889 | 0.7895 | 0.1995 | 0.5946 | 0.4279 | 0.2969 | 0.1951 | 0.1131 | 0.0651 |
| 490 | 0.0203 | 0.0889 | 0.7913 | 0.1995 | 0.5961 | 0.4287 | 0.2970 | 0.1955 | 0.1133 | 0.0649 |
| 500 | 0.0206 | 0.0886 | 0.7873 | 0.1995 | 0.5953 | 0.4275 | 0.2979 | 0.1948 | 0.1129 | 0.0652 |
| 510 | 0.0202 | 0.0885 | 0.7837 | 0.1995 | 0.5933 | 0.4263 | 0.2974 | 0.1942 | 0.1125 | 0.0652 |
| 520 | 0.0192 | 0.0885 | 0.7814 | 0.1995 | 0.5920 | 0.4261 | 0.2974 | 0.1941 | 0.1125 | 0.0652 |
| 530 | 0.0182 | 0.0890 | 0.7807 | 0.1995 | 0.5915 | 0.4273 | 0.2976 | 0.1949 | 0.1129 | 0.0654 |
| 540 | 0.0174 | 0.0891 | 0.7797 | 0.1995 | 0.5913 | 0.4273 | 0.2981 | 0.1950 | 0.1130 | 0.0656 |
| 550 | 0.0167 | 0.0893 | 0.7771 | 0.1995 | 0.5901 | 0.4267 | 0.2987 | 0.1950 | 0.1129 | 0.0656 |
| 560 | 0.0165 | 0.0897 | 0.7750 | 0.1995 | 0.5885 | 0.4276 | 0.3000 | 0.1958 | 0.1132 | 0.0658 |
| 570 | 0.0166 | 0.0904 | 0.7751 | 0.1995 | 0.5876 | 0.4288 | 0.3010 | 0.1968 | 0.1135 | 0.0657 |
| 580 | 0.0170 | 0.0906 | 0.7788 | 0.1995 | 0.5892 | 0.4293 | 0.3018 | 0.1972 | 0.1134 | 0.0653 |
| 590 | 0.0176 | 0.0909 | 0.7847 | 0.1995 | 0.5926 | 0.4303 | 0.3023 | 0.1979 | 0.1135 | 0.0652 |
| 600 | 0.0179 | 0.0908 | 0.7880 | 0.1995 | 0.5943 | 0.4300 | 0.3022 | 0.1976 | 0.1130 | 0.0650 |
| 610 | 0.0175 | 0.0905 | 0.7887 | 0.1995 | 0.5942 | 0.4293 | 0.3019 | 0.1973 | 0.1128 | 0.0648 |
| 620 | 0.0165 | 0.0896 | 0.7879 | 0.1995 | 0.5928 | 0.4277 | 0.3007 | 0.1964 | 0.1122 | 0.0642 |
| 630 | 0.0160 | 0.0892 | 0.7878 | 0.1995 | 0.5931 | 0.4268 | 0.3000 | 0.1958 | 0.1118 | 0.0640 |
| 640 | 0.0160 | 0.0886 | 0.7905 | 0.1995 | 0.5957 | 0.4254 | 0.2995 | 0.1946 | 0.1111 | 0.0638 |
| 650 | 0.0166 | 0.0879 | 0.7963 | 0.1995 | 0.5995 | 0.4247 | 0.2982 | 0.1938 | 0.1106 | 0.0633 |
| 660 | 0.0193 | 0.0872 | 0.7989 | 0.1995 | 0.6003 | 0.4226 | 0.2969 | 0.1927 | 0.1099 | 0.0629 |
| 670 | 0.0280 | 0.0866 | 0.8003 | 0.1995 | 0.5993 | 0.4199 | 0.2958 | 0.1914 | 0.1092 | 0.0626 |
| 680 | 0.0521 | 0.0865 | 0.8032 | 0.1995 | 0.5989 | 0.4178 | 0.2947 | 0.1911 | 0.1088 | 0.0624 |
| 690 | 0.1004 | 0.0866 | 0.8067 | 0.1995 | 0.5993 | 0.4168 | 0.2942 | 0.1915 | 0.1089 | 0.0625 |
| 700 | 0.1771 | 0.867 | 0.8052 | 0.1995 | 0.6004 | 0.4167 | 0.2950 | 0.1909 | 0.1087 | 0.0626 |
| 710 | 0.2726 | 0.0860 | 0.8043 | 0.1995 | 0.6021 | 0.4171 | 0.2922 | 0.1897 | 0.1081 | 0.0624 |
| 720 | 0.3682 | 0.0862 | 0.8013 | 0.1995 | 0.6059 | 0.4192 | 0.2921 | 0.1893 | 0.1080 | 0.0628 |
| 730 | 0.4546 | 0.0853 | 0.7979 | 0.1995 | 0.6065 | 0.4188 | 0.2893 | 0.1881 | 0.1074 | 0.0620 |

| Wavelength (nm) | Patch Number | | | | | | | | | |
|---|---|---|---|---|---|---|---|---|---|---|
| | 11 | 12 | 13 | 14 | 15 | 16 | 17 | 18 | 19 | 20 |
| 380 | 0.0300 | 0.0760 | 0.0612 | 0.0902 | 0.0575 | 0.0432 | 0.3355 | 0.0662 | 0.0000 | 0.0946 |
| 390 | 0.0306 | 0.0946 | 0.0677 | 0.1247 | 0.0652 | 0.0435 | 0.3360 | 0.0896 | 0.0295 | 0.1031 |
| 400 | 0.0304 | 0.1106 | 0.0725 | 0.1605 | 0.0729 | 0.0431 | 0.2943 | 0.1555 | 0.0282 | 0.1354 |
| 410 | 0.0305 | 0.1161 | 0.0738 | 0.1785 | 0.0729 | 0.0431 | 0.2943 | 0.1555 | 0.0282 | 0.1512 |
| 420 | 0.0308 | 0.1170 | 0.0741 | 0.1848 | 0.0735 | 0.0438 | 0.2766 | 0.1631 | 0.0290 | 0.1585 |
| 430 | 0.0307 | 0.1159 | 0.0733 | 0.1864 | 0.0733 | 0.0444 | 0.2788 | 0.1719 | 0.0290 | 0.1585 |
| 440 | 0.0308 | 0.1153 | 0.0732 | 0.1887 | 0.0734 | 0.0459 | 0.3053 | 0.1880 | 0.0294 | 0.1554 |
| 450 | 0.0309 | 0.1157 | 0.0735 | 0.1915 | 0.0739 | 0.0482 | 0.3361 | 0.2055 | 0.0301 | 0.1383 |
| 460 | 0.0310 | 0.1167 | 0.0741 | 0.1945 | 0.0748 | 0.0512 | 0.3582 | 0.2224 | 0.0308 | 0.1104 |
| 470 | 0.0309 | 0.1216 | 0.0774 | 0.1994 | 0.0787 | 0.0547 | 0.3733 | 0.2356 | 0.0318 | 0.0842 |
| 480 | 0.0308 | 0.1358 | 0.0888 | 0.2106 | 0.0893 | 0.0581 | 0.3829 | 0.2412 | 0.0326 | 0.0641 |
| 490 | 0.0309 | 0.1598 | 0.1111 | 0.2250 | 0.1052 | 0.0602 | 0.3916 | 0.2498 | 0.0336 | 0.0505 |
| 500 | 0.0308 | 0.1815 | 0.1346 | 0.2356 | 0.1181 | 0.0605 | 0.4039 | 0.2633 | 0.0347 | 0.0357 |
| 510 | 0.0306 | 0.1874 | 0.1432 | 0.2398 | 0.1218 | 0.0609 | 0.4117 | 0.2677 | 0.0357 | 0.0357 |
| 520 | 0.0304 | 0.1839 | 0.1411 | 0.2389 | 0.1173 | 0.0617 | 0.4107 | 0.2561 | 0.0371 | 0.0329 |
| 530 | 0.0305 | 0.1873 | 0.1458 | 0.2415 | 0.1116 | 0.0615 | 0.3964 | 0.2410 | 0.0385 | 0.0324 |
| 540 | 0.0305 | 0.1925 | 0.1501 | 0.2477 | 0.1111 | 0.0590 | 0.3812 | 0.2338 | 0.0401 | 0.0332 |
| 550 | 0.0305 | 0.1880 | 0.1422 | 0.2527 | 0.1152 | 0.0586 | 0.3815 | 0.2358 | 0.0419 | 0.0360 |
| 560 | 0.0306 | 0.1851 | 0.1376 | 0.2531 | 0.1185 | 0.0624 | 0.3912 | 0.2477 | 0.0437 | 0.0448 |
| 570 | 0.0305 | 0.1952 | 0.1503 | 0.2479 | 0.1228 | 0.0697 | 0.3912 | 0.2385 | 0.0456 | 0.0683 |
| 580 | 0.0301 | 0.2159 | 0.1756 | 0.2501 | 0.1352 | 0.0796 | 0.3901 | 0.2394 | 0.0476 | 0.1220 |
| 590 | 0.0300 | 0.2444 | 0.2055 | 0.2690 | 0.1544 | 0.0882 | 0.4493 | 0.3166 | 0.0500 | 0.2168 |
| 600 | 0.0299 | 0.2864 | 0.2448 | 0.3050 | 0.1753 | 0.0942 | 0.5401 | 0.4137 | 0.0522 | 0.3421 |
| 610 | 0.0300 | 0.3498 | 0.3020 | 0.3590 | 0.2012 | 0.1013 | 0.6048 | 0.4500 | 0.0547 | 0.4742 |
| 620 | 0.0302 | 0.3984 | 0.3475 | 0.3984 | 0.2270 | 0.1083 | 0.6508 | 0.4980 | 0.0574 | 0.5881 |
| 630 | 0.0307 | 0.4203 | 0.3712 | 0.4154 | 0.2464 | 0.1129 | 0.6817 | 0.5459 | 0.0601 | 0.6707 |
| 640 | 0.0311 | 0.4303 | 0.3845 | 0.4229 | 0.2575 | 0.1142 | 0.7021 | 0.5623 | 0.0631 | 0.7251 |
| 650 | 0.0317 | 0.4384 | 0.3968 | 0.4298 | 0.2640 | 0.1145 | 0.7181 | 0.5741 | 0.0662 | 0.7622 |
| 660 | 0.0324 | 0.4441 | 0.4071 | 0.4347 | 0.2676 | 0.1138 | 0.7332 | 0.5881 | 0.2695 | 0.7861 |
| 670 | 0.0330 | 0.4489 | 0.4163 | 0.4388 | 0.2699 | 0.1129 | 0.7463 | 0.5988 | 0.0729 | 0.8020 |
| 680 | 0.0337 | 0.4545 | 0.4258 | 0.4449 | 0.2729 | 0.1125 | 0.7623 | 0.6051 | 0.0767 | 0.8160 |
| 590 | 0.0344 | 0.4605 | 0.4362 | 0.4504 | 0.2757 | 0.1128 | 0.7802 | 0.6103 | 0.0805 | 0.8265 |

APPENDIX A
Spectral Reflectance of 190 Test Colors

| | | | | | | | | | | |
|---|---|---|---|---|---|---|---|---|---|---|
| 700 | 0.0352 | 0.4655 | 0.4464 | 0.4534 | 0.2774 | 0.1125 | 0.7859 | 0.6139 | 0.0845 | 0.8321 |
| 710 | 0.0353 | 0.4701 | 0.4574 | 0.4566 | 0.2784 | 0.1121 | 0.7997 | 0.6061 | 0.0889 | 0.8373 |
| 720 | 0.0358 | 0.4729 | 0.4646 | 0.4583 | 0.2797 | 0.1123 | 0.7975 | 0.5984 | 0.0933 | 0.8371 |
| 730 | 0.0362 | 0.4764 | 0.4732 | 0.4611 | 0.2806 | 0.1124 | 0.7997 | 0.4236 | 0.0979 | 0.8378 |

| | Patch Number | | | | | | | | | |
|---|---|---|---|---|---|---|---|---|---|---|
| Wavelength (nm) | 21 | 22 | 23 | 24 | 25 | 26 | 27 | 28 | 29 | 30 |
| 380 | 0.1119 | 0.0980 | 0.0000 | 0.2156 | 0.1089 | 0.0000 | 0.0000 | 0.0508 | 0.0684 | 0.0211 |
| 390 | 0.1801 | 0.1369 | 0.0365 | 0.2163 | 0.1601 | 0.0500 | 0.0415 | 0.0511 | 0.0757 | 0.0211 |
| 400 | 0.2781 | 0.1589 | 0.0300 | 0.1913 | 0.2036 | 0.0495 | 0.0410 | 0.0510 | 0.0903 | 0.0209 |
| 410 | 0.3418 | 0.1589 | 0.03 13 | 0.1505 | 0.2107 | 0.0497 | 0.0406 | 0.0497 | 0.1079 | 0.0209 |
| 420 | 0.3524 | 0.1509 | 0.0337 | 0.1118 | 0.2015 | 0.0505 | 0.0400 | 0.0494 | 0.1203 | 0.0218 |
| 430 | 0.3459 | 0.1440 | 0.0364 | 0.0789 | 0.1934 | 0.0511 | 0.0396 | 0.0493 | 0.1168 | 0.0234 |
| 440 | 0.3413 | 0.1419 | 0.0366 | 0.0541 | 0.1898 | 0.0514 | 0.0394 | 0.0493 | 0.1002 | 0.0257 |
| 450 | 0.3359 | 0.1409 | 0.0358 | 0.0370 | 0.1854 | 0.0502 | 0.0390 | 0.0492 | 0.0793 | 0.0258 |
| 460 | 0.3312 | 0.1350 | 0.0345 | 0.0261 | 0.1824 | 0.0488 | 0.0388 | 0.0482 | 0.0602 | 0.0235 |
| 470 | 0.3298 | 0.1350 | 0.0339 | 0.0198 | 0.1818 | 0.0473 | 0.0384 | 0.0466 | 0.0470 | 0.0210 |
| 480 | 0.3233 | 0.1259 | 0.0318 | 0.0161 | 0.1732 | 0.0467 | 0.0378 | 0.0449 | 0.0388 | 0.0191 |
| 490 | 0.3100 | 0.1160 | 0.0303 | 0.0141 | 0.1587 | 0.0459 | 0.0369 | 0.0440 | 0.0338 | 0.0179 |
| 500 | 0.3004 | 0.1070 | 0.0281 | 0.0130 | 0.1513 | 0.0458 | 0.0363 | 0.0436 | 0.0311 | 0.0175 |
| 510 | 0.2968 | 0.1059 | 0.0265 | 0.0126 | 0.1483 | 0.0455 | 0.0360 | 0.0430 | 0.0301 | 0.0172 |
| 520 | 0.2870 | 0.0980 | 0.0258 | 0.0124 | 0.1393 | 0.0448 | 0.0358 | 0.0432 | 0.0311 | 0.0169 |
| 530 | 0.2789 | 0.0949 | 0.0248 | 0.0122 | 0.1320 | 0.0444 | 0.0362 | 0.0447 | 0.0329 | 0.0168 |
| 540 | 0.2835 | 0.0959 | 0.0244 | 0.0125 | 0.1366 | 0.0441 | 0.0368 | 0.0470 | 0.0371 | 0.0169 |
| 550 | 0.3131 | 0.1070 | 0.0245 | 0.0131 | 0.1558 | 0.0440 | 0.0378 | 0.0495 | 0.0489 | 0.0171 |
| 560 | 0.3744 | 0.1109 | 0.0248 | 0.0141 | 0.1753 | 0.0445 | 0.0390 | 0.0529 | 0.0795 | 0.0172 |
| 570 | 0.4523 | 0.1179 | 0.0261 | 0.0173 | 0.1962 | 0.0454 | 0.0406 | 0.0595 | 0.1473 | 0.0174 |
| 580 | 0.5313 | 0.1629 | 0.0294 | 0.0254 | 0.2835 | 0.0483 | 0.0432 | 0.0712 | 0.2642 | 0.0180 |
| 590 | 0.5839 | 0.2839 | 0.0360 | 0.0432 | 0.4437 | 0.0583 | 0.0490 | 0.0987 | 0.4161 | 0.0221 |
| 600 | 0.6056 | 0.4170 | 0.0476 | 0.0779 | 0.6140 | 0.0863 | 0.0621 | 0.1774 | 0.5660 | 0.0412 |
| 610 | 0.6118 | 0.5100 | 0.0692 | 0.1413 | 0.7395 | 0.1543 | 0.0897 | 0.3375 | 0.6831 | 0.0901 |
| 620 | 0.6123 | 0.5530 | 0.1035 | 0.2407 | 0.8086 | 0.2670 | 0.1334 | 0.5120 | 0.7562 | 0.1610 |
| 630 | 0.6115 | 0.5730 | 0.1500 | 0.3579 | 0.8449 | 0.3874 | 0.1872 | 0.6247 | 0.7952 | 0.2255 |
| 640 | 0.6096 | 0.5770 | 0.2092 | 0.4827 | 0.8624 | 0.4714 | 0.2439 | 0.6765 | 0.8144 | 0.2655 |
| 650 | 0.6090 | 0.5760 | 0.2754 | 0.6112 | 0.8675 | 0.5029 | 0.2955 | 0.7010 | 0.8282 | 0.3010 |
| 660 | 0.6065 | 0.5810 | 0.3392 | 0 .7309 | 0.8716 | 0.4875 | 0.3370 | 0.7119 | 0.8348 | 0.3584 |
| 670 | 0.6025 | 0.5800 | 0.3936 | 0.8233 | 0.8700 | 0.4341 | 0.3681 | 0.7172 | 0.8374 | 0.4418 |
| 680 | 0.6009 | 0.5800 | 0.4389 | 0.8833 | 0.8674 | 0.4443 | 0.3947 | 0.7236 | 0.8428 | 0.5374 |
| 690 | 0.5996 | 0.5800 | 0.4764 | 0.9167 | 0.8612 | 0.5829 | 0.4202 | 0.7279 | 0.8467 | 0.6183 |
| 700 | 0.5961 | 0.5740 | 0.5059 | 0.9401 | 0.8726 | 0.6464 | 0.4411 | 0.7266 | 0.8465 | 0.6759 |
| 710 | 0.5921 | 0.5790 | 0.5298 | 0.9377 | 0.8583 | 0.6648 | 0.4592 | 0.7259 | 0.8482 | 0.7119 |
| 720 | 0.5875 | 0.5770 | 0.5492 | 0.9308 | 0.8724 | 0.6724 | 0.4711 | 0.7217 | 0.8448 | 0.7313 |
| 730 | 0.5826 | 0.5790 | 0.5642 | 0.9237 | 0.8641 | 0.6769 | 0.4826 | 0.7195 | 0.8442 | 0.7454 |

| | Patch Number | | | | | | | | | |
|---|---|---|---|---|---|---|---|---|---|---|
| Wavelength (nm) | 31 | 32 | 33 | 34 | 35 | 36 | 37 | 38 | 39 | 40 |
| 380 | 0.0809 | 0.1059 | 0.0716 | 0.0941 | 0.1169 | 0.0714 | 0.0000 | 0.0483 | 0.0000 | 0.0332 |
| 390 | 0.0716 | 0.1636 | 0.0855 | 0.0944 | 0.1173 | 0.0888 | 0.0195 | 0.0516 | 0.0236 | 0.0325 |
| 400 | 0.0648 | 0.2340 | 0.0912 | 0.0779 | 0.0943 | 0.1013 | 0.0220 | 0.0528 | 0.0219 | 0.0328 |
| 410 | 0.0600 | 0.2706 | 0.0888 | 0.0589 | 0.0641 | 0.1032 | 0.0236 | 0.0520 | 0.0205 | 0.0332 |
| 420 | 0.0578 | 0.2714 | 0.0847 | 0.0455 | 0.0422 | 0.1004 | 0.0225 | 0.0511 | 0.0194 | 0.0338 |
| 430 | 0.0558 | 0.2642 | 0.0820 | 0.0357 | 0.0288 | 0.0965 | 0.0203 | 0.0507 | 0.0184 | 0.0342 |
| 440 | 0.0533 | 0.2599 | 0.0812 | 0.0293 | 0.0209 | 0.0942 | 0.0184 | 0.0506 | 0.0175 | 0.0346 |
| 450 | 0.0499 | 0.2557 | 0.0802 | 0.0249 | 0.0165 | 0.0918 | 0.0170 | 0.0506 | 0.0168 | 0.0351 |
| 460 | 0.0455 | 0.2522 | 0.0798 | 0.0215 | 0.0139 | 0.0895 | 0.0155 | 0.0508 | 0.0163 | 0.0354 |
| 470 | 0.0412 | 0.2534 | 0.0795 | 0.0191 | 0.0127 | 0.0882 | 0.0140 | 0.0505 | 0.0157 | 0.0358 |
| 480 | 0.0373 | 0.2482 | 0.0758 | 0.0172 | 0.0117 | 0.0846 | 0.0128 | 0.0491 | 0.0154 | 0.0362 |
| 490 | 0.0342 | 0.2354 | 0.0719 | 0.0156 | 0.0111 | 0.0809 | 0.0122 | 0.0491 | 0.0151 | 0.0367 |
| 500 | 0.0318 | 0.2285 | 0.0715 | 0.0144 | 0.0107 | 0.0792 | 0.0115 | 0.0507 | 0.0149 | 0.0377 |
| 510 | 0.0298 | 0.2277 | 0.0710 | 0.0136 | 0.0106 | 0.0770 | 0.0115 | 0.0506 | 0.0150 | 0.0384 |
| 520 | 0.0291 | 0.2198 | 0.0684 | 0.0130 | 0.0108 | 0.0733 | 0.0115 | 0.0497 | 0.0151 | 0.0392 |
| 530 | 0.0293 | 0.2104 | 0.0699 | 0.0128 | 0.0109 | 0.0732 | 0.0115 | 0.0533 | 0.0156 | 0.0405 |
| 540 | 0.0294 | 0.2160 | 0.0774 | 0.0130 | 0.0110 | 0.0785 | 0.0119 | 0.0627 | 0.0164 | 0.0424 |
| 550 | 0.0301 | 0.2554 | 0.0896 | 0.0133 | 0.0114 | 0.0918 | 0.0129 | 0.0788 | 0.0181 | 0.0465 |
| 560 | 0.0335 | 0.3422 | 0.0992 | 0.0142 | 0.0119 | 0.1174 | 0.0166 | 0.0987 | 0.0215 | 0.0536 |
| 570 | 0.0477 | 0.4540 | 0.1068 | 0.0164 | 0.0138 | 0.1616 | 0.0286 | 0.1178 | 0.0279 | 0.0659 |
| 580 | 0.1004 | 0.5744 | 0.1471 | 0.0217 | 0.0195 | 0.2388 | 0.0635 | 0.1717 | 0.0406 | 0.0997 |
| 590 | 0.2090 | 0.6706 | 0.2524 | 0.0342 | 0.0316 | 0.3212 | 0.1356 | 0.2878 | 0.0631 | 0.1772 |
| 600 | 0.3381 | 0.7224 | 0.4076 | 0.0598 | 0.0444 | 0.3708 | 0.2436 | 0.4392 | 0.1007 | 0.2872 |
| 610 | 0.4584 | 0.7427 | 0.5600 | 0.0951 | 0.0518 | 0.3921 | 0.3715 | 0.5717 | 0.1569 | 0.3850 |
| 620 | 0.5558 | 0.7497 | 0.6765 | 0.1202 | 0.0547 | 0.3993 | 0.4851 | 0.6525 | 0.2265 | 0.4429 |
| 630 | 0.6283 | 0.7521 | 0.7579 | 0.1299 | 0.0518 | 0.4011 | 0.5679 | 0.6975 | 0.2972 | 0.4696 |
| 640 | 0.6821 | 0.7536 | 0.8030 | 0.1361 | 0.0464 | 0.4007 | 0.6227 | 0.7197 | 0.3614 | 0.4803 |

APPENDIX A
Spectral Reflectance of 190 Test Colors

| | | | | | | | | | | |
|---|---|---|---|---|---|---|---|---|---|---|
| 650 | 0.7259 | 0.7550 | 0.8221 | 0.1491 | 0.0450 | 0.4000 | 0.6503 | 0.7270 | 0.4097 | 0.4836 |
| 660 | 0.7585 | 0.7539 | 0.8345 | 0.1757 | 0.0534 | 0.3974 | 0.6685 | 0.7326 | 0.4428 | 0.4868 |
| 670 | 0.7816 | 0.7510 | 0.8374 | 0.2196 | 0.0780 | 0.3934 | 0.6808 | 0.7313 | 0.4673 | 0.4886 |
| 680 | 0.7998 | 0.7498 | 0.8328 | 0.2830 | 0.1302 | 0.3905 | 0.6901 | 0.7233 | 0.4940 | 0.4885 |
| 690 | 0.8128 | 0.7496 | 0.8260 | 0.3643 | 0.2223 | 0.3895 | 0.6902 | 0.7156 | 0.5163 | 0.4841 |
| 700 | 0.8199 | 0.7474 | 0.8436 | 0.4659 | 0.3513 | 0.3877 | 0.6917 | 0.7289 | 0.5304 | 0.4893 |
| 710 | 0.8267 | 0.7434 | 0.8345 | 0.5649 | 0.4826 | 0.3859 | 0.7006 | 0.7194 | 0.5413 | 0.4832 |
| 720 | 0.8273 | 0.7387 | 0.8519 | 0.6540 | 0.5911 | 0.3840 | 0.6992 | 0.7329 | 0.5405 | 0.4919 |
| 730 | 0.8294 | 0.7324 | 0.8465 | 0.7043 | 0.6467 | 0.3821 | 0.6990 | 0.7258 | 0.5368 | 0.4890 |

| | Patch Number | | | | | | | | | |
|---|---|---|---|---|---|---|---|---|---|---|
| Wavelength (nm) | 41 | 42 | 43 | 44 | 45 | 46 | 47 | 48 | 49 | 50 |
| 380 | 0.0834 | 0.1331 | 0.3367 | 0.1102 | 0.0850 | 0.0732 | 0.0000 | 0.0000 | 0.0596 | 0.0335 |
| 390 | 0.0836 | 0.1088 | 0.3235 | 0.1105 | 0.1110 | 0.0860 | 0.0188 | 0.1397 | 0.0598 | 0.0338 |
| 400 | 0.0905 | 0.0894 | 0.3159 | 0.0850 | 0.1283 | 0.0923 | 0.0162 | 0.1232 | 0.0443 | 0.0347 |
| 410 | 0.1314 | 0.0756 | 0.3147 | 0.0635 | 0.1293 | 0.0911 | 0.0149 | 0.1096 | 0.0344 | 0.0355 |
| 420 | 0.1627 | 0.0664 | 0.3201 | 0.0490 | 0.1247 | 0.0878 | 0.0138 | 0.1049 | 0.0291 | 0.0363 |
| 430 | 0.1652 | 0.0601 | 0.3255 | 0.0399 | 0.1206 | 0.0856 | 0.0128 | 0.0991 | 0.0264 | 0.0369 |
| 440 | 0.1584 | 0.0568 | 0.3321 | 0.0344 | 0.1188 | 0.0848 | 0.0121 | 0.0957 | 0.0256 | 0.0377 |
| 450 | 0.1542 | 0.0556 | 0.3392 | 0.0311 | 0.1171 | 0.0841 | 0.0116 | 0.0973 | 0.0269 | 0.0385 |
| 460 | 0.1552 | 0.0558 | 0.3458 | 0.0294 | 0.1167 | 0.0844 | 0.0120 | 0.0993 | 0.0302 | 0.0394 |
| 470 | 0.1611 | 0.0575 | 0.3514 | 0.0298 | 0.1181 | 0.0853 | 0.0136 | 0.1018 | 0.0361 | 0.0404 |
| 480 | 0.1685 | 0.0610 | 0.3540 | 0.0309 | 0.1156 | 0.0835 | 0.0160 | 0.0993 | 0.0427 | 0.0420 |
| 490 | 0.1750 | 0.0659 | 0.3628 | 0.0331 | 0.1105 | 0.0810 | 0.0194 | 0.1027 | 0.0470 | 0.0445 |
| 500 | 0.1796 | 0.0721 | 0.3711 | 0.0362 | 0.1109 | 0.0830 | 0.0232 | 0.1086 | 0.0467 | 0.0510 |
| 510 | 0.1822 | 0.0790 | 0.3655 | 0.0396 | 0.1168 | 0.0871 | 0.0270 | 0.1118 | 0.0432 | 0.0714 |
| 520 | 0.1839 | 0.0878 | 0.3699 | 0.0437 | 0.1163 | 0.0870 | 0.0310 | 0.1176 | 0.0402 | 0.1036 |
| 530 | 0.1866 | 0.1015 | 0.4033 | 0.0477 | 0.1132 | 0.0875 | 0.0361 | 0.1334 | 0.0382 | 0.1260 |
| 540 | 0.1927 | 0.1202 | 0.4267 | 0.0517 | 0.1219 | 0.0975 | 0.0433 | 0.1736 | 0.0379 | 0.1399 |
| 550 | 0.2054 | 0.1390 | 0.4214 | 0.0592 | 0.1568 | 0.1298 | 0.0468 | 0.2683 | 0.0408 | 0.1635 |
| 560 | 0.2319 | 0.1607 | 0.4477 | 0.0784 | 0.2166 | 0.1987 | 0.0473 | 0.4114 | 0.0520 | 0.2179 |
| 570 | 0.2783 | 0.1983 | 0.5503 | 0.1213 | 0.2594 | 0.2694 | 0.0550 | 0.5421 | 0.0781 | 0.3137 |
| 580 | 0.3488 | 0.2630 | 0.6834 | 0.1962 | 0.2751 | 0.3070 | 0.0793 | 0.6356 | 0.1171 | 0.4340 |
| 590 | 0.4356 | 0.3578 | 0.7775 | 0.2836 | 0.2800 | 0.3237 | 0.1193 | 0.6994 | 0.1440 | 0.5427 |
| 600 | 0.5143 | 0.4639 | 0.8268 | 0.3429 | 0.2819 | 0.3316 | 0.1696 | 0.7398 | 0.1459 | 0.6245 |
| 610 | 0.5635 | 0.5578 | 0.8489 | 0.3681 | 0.2801 | 0.3317 | 0.2180 | 0.7698 | 0.1421 | 0.6715 |
| 620 | 0.5892 | 0.6314 | 0.8561 | 0.3751 | 0.2771 | 0.3284 | 0.2515 | 0.7869 | 0.1392 | 0.6941 |
| 630 | 0.6095 | 0.6871 | 0.8564 | 0.3646 | 0.2750 | 0.3263 | 0.2683 | 0.7998 | 0.1285 | 0.7057 |
| 640 | 0.6345 | 0.7288 | 0.8551 | 0.3462 | 0.2731 | 0.3248 | 0.2768 | 0.8125 | 0.1160 | 0.7122 |
| 650 | 0.6712 | 0.7622 | 0.8558 | 0.3405 | 0.2704 | 0.3219 | 0.2809 | 0.8164 | 0.1158 | 0.7153 |
| 660 | 0.7174 | 0.7846 | 0.8554 | 0.3733 | 0.2689 | 0.3203 | 0.2843 | 0.8141 | 0.1411 | 0.7204 |
| 670 | 0.7563 | 0.7982 | 0.8514 | 0.4687 | 0.2662 | 0.3171 | 0.2862 | 0.8084 | 0.2087 | 0.7245 |
| 680 | 0.7781 | 0.8087 | 0.8482 | 0.6261 | 0.2624 | 0.3127 | 0.2869 | 0.8289 | 0.3387 | 0.7257 |
| 690 | 0.7865 | 0.8155 | 0.8461 | 0.8030 | 0.2579 | 0.3074 | 0.2869 | 0.8559 | 0.5315 | 0.7217 |
| 700 | 0.7997 | 0.8174 | 0.8437 | 0.9407 | 0.2588 | 0.3093 | 0.2882 | 0.8614 | 0.7393 | 0.7314 |
| 710 | 0.7996 | 0.8221 | 0.8403 | 0.9881 | 0.2523 | 0.3014 | 0.2889 | 0.8590 | 0.8692 | 0.7229 |
| 720 | 0.7996 | 0.8219 | 0.8366 | 0.9858 | 0.2543 | 0.3043 | 0.2864 | 0.8529 | 0.9232 | 0.7363 |
| 730 | 0.7976 | 0.8245 | 0.8336 | 0.9701 | 0.2497 | 0.2990 | 0.2858 | 0.8424 | 0.9333 | 0.7326 |

| | Patch Number | | | | | | | | | |
|---|---|---|---|---|---|---|---|---|---|---|
| Wavelength (nm) | 51 | 52 | 53 | 54 | 55 | 56 | 57 | 58 | 59 | 60 |
| 380 | 0.0412 | 0.0627 | 0.0258 | 0.2855 | 0.1190 | 0.0204 | 0.0550 | 0.0497 | 0.0366 | 0.1120 |
| 390 | 0.0429 | 0.0742 | 0.0201 | 0.2955 | 0.1200 | 0.0170 | 0.0610 | 0.0561 | 0.0383 | 0.1230 |
| 400 | 0.0440 | 0.0843 | 0.0161 | 0.2981 | 0.1210 | 0.0144 | 0.0639 | 0.0600 | 0.0402 | 0.1350 |
| 410 | 0.0439 | 0.0878 | 0.0135 | 0.3049 | 0.1220 | 0.0124 | 0.0639 | 0.0614 | 0.0417 | 0.1450 |
| 420 | 0.0435 | 0.0889 | 0.0120 | 0.3086 | 0.1230 | 0.0114 | 0.0639 | 0.0624 | 0.0430 | 0.1560 |
| 430 | 0.0430 | 0.0890 | 0.0108 | 0.3001 | 0.1230 | 0.0107 | 0.0639 | 0.0626 | 0.0440 | 0.1660 |
| 440 | 0.0425 | 0.0897 | 0.0104 | 0.2924 | 0.1240 | 0.0104 | 0.0639 | 0.0632 | 0.0448 | 0.1750 |
| 450 | 0.0427 | 0.0909 | 0.0106 | 0.2896 | 0.1250 | 0.0106 | 0.0650 | 0.0638 | 0.0457 | 0.1840 |
| 460 | 0.0433 | 0.0926 | 0.0112 | 0.2928 | 0.1260 | 0.0112 | 0.0709 | 0.0645 | 0.0464 | 0.1920 |
| 470 | 0.0468 | 0.0968 | 0.0123 | 0.2943 | 0.1270 | 0.0122 | 0.0799 | 0.0658 | 0.0473 | 0.2020 |
| 480 | 0.0584 | 0.1056 | 0.0158 | 0.3092 | 0.1310 | 0.0150 | 0.0930 | 0.0686 | 0.0494 | 0.2110 |
| 490 | 0.0809 | 0.1175 | 0.0321 | 0.3573 | 0.1390 | 0.0280 | 0.1099 | 0.0723 | 0.0533 | 0.2210 |
| 500 | 0.1076 | 0.1281 | 0.0918 | 0.4293 | 0.1530 | 0.0701 | 0.1199 | 0.0751 | 0.0640 | 0.2300 |
| 510 | 0.1265 | 0.1351 | 0.1815 | 0.4824 | 0.1850 | 0.1267 | 0.1440 | 0.0763 | 0.1029 | 0.2400 |
| 520 | 0.1287 | 0.1377 | 0.2112 | 0.5016 | 0.2240 | 0.1457 | 0.1869 | 0.0769 | 0.1898 | 0.2500 |
| 530 | 0.1221 | 0.1389 | 0.2063 | 0.5098 | 0.2720 | 0.1436 | 0.2589 | 0.0777 | 0.2870 | 0.2610 |
| 540 | 0.1271 | 0.1448 | 0.2033 | 0.5178 | 0.3180 | 0.1428 | 0.3589 | 0.0796 | 0.3607 | 0.2710 |
| 550 | 0.1677 | 0.1625 | 0.1930 | 0.5465 | 0.3710 | 0.1379 | 0.4520 | 0.0838 | 0.4397 | 0.2810 |
| 560 | 0.2678 | 0.1907 | 0.1651 | 0.6098 | 0.4210 | 0.1215 | 0.5200 | 0.0893 | 0.5228 | 0.2900 |
| 570 | 0.3780 | 0.2135 | 0.1378 | 0.7125 | 0.4710 | 0.1040 | 0.5640 | 0.0927 | 0.5774 | 0.3000 |
| 580 | 0.4381 | 0.2280 | 0.1836 | 0.8017 | 0.5150 | 0.1328 | 0.5950 | 0.0943 | 0.6071 | 0.3090 |
| 590 | 0.4664 | 0.2398 | 0.3517 | 0.8511 | 0.5420 | 0.2249 | 0.6190 | 0.0956 | 0.6228 | 0.3180 |

APPENDIX A
Spectral Reflectance of 190 Test Colors

| | | | | | | | | | | |
|---|---|---|---|---|---|---|---|---|---|---|
| 600 | 0.4794 | 0.2484 | 0.5075 | 0.8746 | 0.5620 | 0.2957 | 0.6300 | 0.0962 | 0.6327 | 0.3240 |
| 610 | 0.4838 | 0.2549 | 0.5768 | 0.8831 | 0.5780 | 0.3227 | 0.6380 | 0.0967 | 0.6384 | 0.3320 |
| 620 | 0.4846 | 0.2600 | 0.6001 | 0.8847 | 0.5890 | 0.3322 | 0.6420 | 0.0966 | 0.6418 | 0.3400 |
| 630 | 0.4855 | 0.2643 | 0.6115 | 0.8884 | 0.5980 | 0.3384 | 0.6540 | 0.0964 | 0.6450 | 0.3480 |
| 640 | 0.4862 | 0.2679 | 0.6183 | 0.8945 | 0.6020 | 0.3439 | 0.6550 | 0.0960 | 0.6478 | 0.3550 |
| 650 | 0.4867 | 0.2716 | 0.6212 | 0.8958 | 0.6040 | 0.3467 | 0.6560 | 0.0957 | 0.6492 | 0.3620 |
| 660 | 0.4858 | 0.2745 | 0.6295 | 0.9028 | 0.6040 | 0.3529 | 0.6630 | 0.0952 | 0.6528 | 0.3700 |
| 670 | 0.4830 | 0.2768 | 0.6347 | 0.9045 | 0.6040 | 0.3568 | 0.6690 | 0.0944 | 0.6558 | 0.3770 |
| 680 | 0.4800 | 0.2798 | 0.6397 | 0.9082 | 0.6040 | 0.3604 | 0.6670 | 0.0940 | 0.6552 | 0.3820 |
| 690 | 0.4789 | 0.2839 | 0.6356 | 0.9028 | 0.6040 | 0.3611 | 0.6760 | 0.0943 | 0.6511 | 0.3900 |
| 700 | 0.4806 | 0.2865 | 0.6486 | 0.9158 | 0.6040 | 0.3691 | 0.6730 | 0.0942 | 0.6596 | 0.3960 |
| 710 | 0.4803 | 0.2890 | 0.6474 | 0.9108 | 0.6040 | 0.3698 | 0.6780 | 0.0940 | 0.6519 | 0.4000 |
| 720 | 0.4798 | 0.2911 | 0.6571 | 0.9200 | 0.6040 | 0.3757 | 0.6800 | 0.0942 | 0.6637 | 0.4050 |
| 730 | 0.4775 | 0.2928 | 0.6552 | 0.9171 | 0.6040 | 0.3783 | 0.6890 | 0.0940 | 0.6600 | 0.4090 |

| | Patch Number | | | | | | | | | |
|---|---|---|---|---|---|---|---|---|---|---|
| Wavelength (nm) | 61 | 62 | 63 | 64 | 65 | 66 | 67 | 68 | 69 | 70 |
| 380 | 0.0000 | 0.1110 | 0.0000 | 0.0000 | 0.0000 | 0.1000 | 0.1240 | 0.1263 | 0.0552 | 0.0984 |
| 390 | 0.0641 | 0.1290 | 0.1616 | 0.0308 | 0.0501 | 0.1070 | 0.2034 | 0.2129 | 0.0560 | 0.0888 |
| 400 | 0.0687 | 0.1380 | 0.1621 | 0.0268 | 0.0555 | 0.1140 | 0.3371 | 0.3392 | 0.0570 | 0.0814 |
| 410 | 0.0893 | 0.1400 | 0.1590 | 0.0244 | 0.0568 | 0.1210 | 0.4496 | 0.4149 | 0.0577 | 0.0761 |
| 420 | 0.1044 | 0.1390 | 0.1556 | 0.0232 | 0.0502 | 0.1240 | 0.4846 | 0.4266 | 0.0592 | 0.0723 |
| 430 | 0.1111 | 0.1350 | 0.1569 | 0.0222 | 0.0520 | 0.1250 | 0.4894 | 0.4248 | 0.0612 | 0.0683 |
| 440 | 0.1157 | 0.1340 | 0.1601 | 0.0211 | 0.0445 | 0.1260 | 0.4910 | 0.4246 | 0.0645 | 0.0651 |
| 450 | 0.1132 | 0.1400 | 0.1724 | 0.0203 | 0.0416 | 0.1300 | 0.4948 | 0.4259 | 0.0702 | 0.0638 |
| 460 | 0.1241 | 0.1500 | 0.1870 | 0.0199 | 0.0550 | 0.1340 | 0.5009 | 0.4261 | 0.0792 | 0.0639 |
| 470 | 0.1440 | 0.1510 | 0.2034 | 0.0200 | 0.0558 | 0.1410 | 0.5233 | 0.4270 | 0.0945 | 0.0656 |
| 480 | 0.1423 | 0.1510 | 0.2087 | 0.0195 | 0.0504 | 0.1540 | 0.5721 | 0.4253 | 0.1202 | 0.0685 |
| 490 | 0.1595 | 0.1620 | 0.2264 | 0.0202 | 0.0893 | 0.1780 | 0.6469 | 0.4243 | 0.1585 | 0.0737 |
| 500 | 0.2213 | 0.2240 | 0.2774 | 0.0227 | 0.1934 | 0.2120 | 0.7175 | 0.4366 | 0.2197 | 0.0814 |
| 510 | 0.3001 | 0.3240 | 0.3818 | 0.0406 | 0.3432 | 0.2480 | 0.7634 | 0.4834 | 0.3291 | 0.0910 |
| 520 | 0.3461 | 0.4130 | 0.5244 | 0.1080 | 0.5087 | 0.2670 | 0.7803 | 0.5393 | 0.4965 | 0.1023 |
| 530 | 0.3643 | 0.4750 | 0.6387 | 0.2303 | 0.6350 | 0.2740 | 0.7805 | 0.5654 | 0.6599 | 0.1134 |
| 540 | 0.3755 | 0.5170 | 0.7066 | 0.3471 | 0.7055 | 0.2790 | 0.7886 | 0.5760 | 0.7500 | 0.1193 |
| 550 | 0.3857 | 0.5440 | 0.7492 | 0.4240 | 0.7406 | 0.2890 | 0.8208 | 0.5924 | 0.7830 | 0.1186 |
| 560 | 0.3965 | 0.5610 | 0.7695 | 0.4691 | 0.7610 | 0.3070 | 0.8696 | 0.6074 | 0.7973 | 0.1147 |
| 570 | 0.4116 | 0.5770 | 0.7834 | 0.5145 | 0.7811 | 0.3300 | 0.8982 | 0.6124 | 0.8090 | 0.1105 |
| 580 | 0.4279 | 0.5890 | 0.7847 | 0.5471 | 0.7927 | 0.3440 | 0.9084 | 0.6119 | 0.8158 | 0.1071 |
| 590 | 0.4444 | 0.6000 | 0.7938 | 0.5703 | 0.8024 | 0.3500 | 0.9125 | 0.6096 | 0.8240 | 0.1054 |
| 600 | 0.4605 | 0.6100 | 0.8069 | 0.5890 | 0.8097 | 0.3510 | 0.9114 | 0.6083 | 0.8294 | 0.1048 |
| 610 | 0.4756 | 0.6190 | 0.7971 | 0.6021 | 0.8145 | 0.3510 | 0.9087 | 0.6056 | 0.8333 | 0.1068 |
| 620 | 0.4881 | 0.6280 | 0.7777 | 0.6119 | 0.8177 | 0.3500 | 0.9087 | 0.6029 | 0.8382 | 0.1120 |
| 630 | 0.4979 | 0.6340 | 0.7825 | 0.6220 | 0.8213 | 0.3480 | 0.9070 | 0.6000 | 0.8413 | 0.1231 |
| 640 | 0.5038 | 0.6430 | 0.7898 | 0.6312 | 0.8245 | 0.3470 | 0.9049 | 0.5974 | 0.8421 | 0.1422 |
| 650 | 0.5056 | 0.6510 | 0.7582 | 0.6386 | 0.8260 | 0.3450 | 0.9069 | 0.5937 | 0.8483 | 0.1723 |
| 660 | 0.5065 | 0.6610 | 0.6471 | 0.6457 | 0.8243 | 0.3430 | 0.9059 | 0.5924 | 0.8499 | 0.2155 |
| 670 | 0.5047 | 0.6730 | 0.5225 | 0.6516 | 0.8236 | 0.3410 | 0.9053 | 0.5906 | 0.8505 | 0.2729 |
| 680 | 0.5078 | 0.6890 | 0.5131 | 0.6615 | 0.8287 | 0.3390 | 0.9084 | 0.5861 | 0.8551 | 0.3454 |
| 690 | 0.5198 | 0.7040 | 0.7516 | 0.6677 | 0.8441 | 0.3370 | 0.9129 | 0.5783 | 0.8613 | 0.4264 |
| 700 | 0.5259 | 0.7160 | 0.0000 | 0.6687 | 0.8588 | 0.3360 | 0.9093 | 0.5810 | 0.8560 | 0.5103 |
| 710 | 0.5280 | 0.7220 | 0.0000 | 0.6707 | 0.8740 | 0.3350 | 0.9082 | 0.5700 | 0.8573 | 0.5923 |
| 720 | 0.5292 | 0.7280 | 0.0000 | 0.6660 | 0.8892 | 0.3340 | 0.9015 | 0.5760 | 0.8505 | 0.6560 |
| 730 | 0.5302 | 0.7290 | 0.0000 | 0.6639 | 0.9030 | 0.0000 | 0.8963 | 0.5685 | 0.8479 | 0.7075 |

| | Patch Number | | | | | | | | | |
|---|---|---|---|---|---|---|---|---|---|---|
| Wavelength (nm) | 71 | 72 | 73 | 74 | 75 | 76 | 77 | 78 | 79 | 80 |
| 380 | 0.0578 | 0.2257 | 0.1155 | 0.0906 | 0.0419 | 0.0394 | 0.2115 | 0.1052 | 0.0565 | 0.0000 |
| 390 | 0.0618 | 0.2294 | 0.1185 | 0.0794 | 0.0464 | 0.0396 | 0.2203 | 0.0975 | 0.0566 | 0.0119 |
| 400 | 0.0642 | 0.2250 | 0.1189 | 0.0719 | 0.0504 | 0.0404 | 0.2183 | 0.0855 | 0.0407 | 0.0114 |
| 410 | 0.0647 | 0.2211 | 0.1203 | 0.0669 | 0.0523 | 0.0410 | 0.2172 | 0.0741 | 0.0309 | 0.0119 |
| 420 | 0.0650 | 0.2152 | 0.1206 | 0.0639 | 0.0544 | 0.0415 | 0.2127 | 0.0652 | 0.0268 | 0.0144 |
| 430 | 0.0641 | 0.2028 | 0.1157 | 0.0630 | 0.0580 | 0.0419 | 0.2016 | 0.0570 | 0.0252 | 0.0184 |
| 440 | 0.0639 | 0.1927 | 0.1116 | 0.0640 | 0.0637 | 0.0425 | 0.1920 | 0.0525 | 0.0253 | 0.0216 |
| 450 | 0.0643 | 0.1915 | 0.1125 | 0.0681 | 0.0729 | 0.0435 | 0.1912 | 0.0527 | 0.0277 | 0.0239 |
| 460 | 0.0657 | 0.2005 | 0.1182 | 0.0753 | 0.0894 | 0.0443 | 0.2017 | 0.0582 | 0.0334 | 0.0251 |
| 470 | 0.0712 | 0.2104 | 0.1246 | 0.0893 | 0.1122 | 0.0454 | 0.2122 | 0.0643 | 0.0453 | 0.0257 |
| 480 | 0.0898 | 0.2385 | 0.1394 | 0.1154 | 0.1528 | 0.0470 | 0.2418 | 0.0815 | 0.0655 | 0.0261 |
| 490 | 0.1341 | 0.3270 | 0.1810 | 0.1555 | 0.2147 | 0.0497 | 0.3351 | 0.1464 | 0.0952 | 0.0268 |
| 500 | 0.2103 | 0.5021 | 0.2472 | 0.2042 | 0.3160 | 0.0575 | 0.5272 | 0.3264 | 0.1269 | 0.0290 |
| 510 | 0.2996 | 0.6773 | 0.2974 | 0.2506 | 0.4484 | 0.0878 | 0.7278 | 0.5962 | 0.1416 | 0.0348 |
| 520 | 0.3706 | 0.7489 | 0.3143 | 0.2950 | 0.5630 | 0.1515 | 0.8128 | 0.7551 | 0.1411 | 0.0457 |
| 530 | 0.4097 | 0.7695 | 0.3183 | 0.3321 | 0.6283 | 0.2112 | 0.8299 | 0.7932 | 0.1365 | 0.0550 |
| 540 | 0.4295 | 0.7791 | 0.3192 | 0.3553 | 0.6541 | 0.2388 | 0.8310 | 0.7863 | 0.1341 | 0.0590 |

APPENDIX A
Spectral Reflectance of 190 Test Colors

| | | | | | | | | | | |
|---|---|---|---|---|---|---|---|---|---|---|
| 550 | 0.4544 | 0.7896 | 0.3186 | 0.3637 | 0.6620 | 0.2443 | 0.8238 | 0.7635 | 0.1374 | 0.0614 |
| 560 | 0.4877 | 0.8050 | 0.3193 | 0.3659 | 0.6645 | 0.2418 | 0.8080 | 0.7264 | 0.1495 | 0.0589 |
| 570 | 0.5072 | 0.8238 | 0.3183 | 0.3643 | 0.6651 | 0.2360 | 0.7845 | 0.6801 | 0.1645 | 0.0522 |
| 580 | 0.5125 | 0.8383 | 0.3193 | 0.3569 | 0.6613 | 0.2280 | 0.7649 | 0.6418 | 0.1668 | 0.0469 |
| 590 | 0.5155 | 0.8507 | 0.3224 | 0.3460 | 0.6518 | 0.2172 | 0.7554 | 0.6203 | 0.1479 | 0.0441 |
| 600 | 0.5147 | 0.8598 | 0.3266 | 0.3350 | 0.6369 | 0.2026 | 0.7485 | 0.6020 | 0.1225 | 0.0432 |
| 610 | 0.5131 | 0.8658 | 0.3325 | 0.3289 | 0.6171 | 0.1870 | 0.7444 | 0.5864 | 0.1089 | 0.0402 |
| 620 | 0.5115 | 0.8654 | 0.3381 | 0.3271 | 0.6012 | 0.1751 | 0.7447 | 0.5845 | 0.1018 | 0.0375 |
| 630 | 0.5101 | 0.8662 | 0.3447 | 0.3264 | 0.5918 | 0.1675 | 0.7534 | 0.5910 | 0.0899 | 0.0371 |
| 640 | 0.5073 | 0.8678 | 0.3511 | 0.3288 | 0.5856 | 0.1617 | 0.7631 | 0.6028 | 0.0796 | 0.0352 |
| 650 | 0.5073 | 0.8690 | 0.3553 | 0.3377 | 0.5793 | 0.1567 | 0.7723 | 0.6212 | 0.0829 | 0.0321 |
| 660 | 0.5055 | 0.8742 | 0.3632 | 0.3479 | 0.5792 | 0.1545 | 0.7910 | 0.6454 | 0.1094 | 0.0294 |
| 670 | 0.5030 | 0.8786 | 0.3697 | 0.3558 | 0.5855 | 0.1557 | 0.8035 | 0.6613 | 0.1703 | 0.0276 |
| 680 | 0.5021 | 0.8802 | 0.3762 | 0.3842 | 0.5941 | 0.1591 | 0.7984 | 0.6583 | 0.2840 | 0.0286 |
| 690 | 0.5043 | 0.8738 | 0.3791 | 0.4384 | 0.5984 | 0.1621 | 0.7878 | 0.6424 | 0.4566 | 0.0394 |
| 700 | 0.5026 | 0.8835 | 0.3889 | 0.4941 | 0.6138 | 0.1682 | 0.7863 | 0.6324 | 0.6500 | 0.0740 |
| 710 | 0.5043 | 0.8786 | 0.3926 | 0.5402 | 0.6098 | 0.1681 | 0.7681 | 0.6095 | 0.7837 | 0.1331 |
| 720 | 0.5013 | 0.8851 | 0.4022 | 0.5859 | 0.6177 | 0.1691 | 0.7823 | 0.6212 | 0.8552 | 0.2146 |
| 730 | 0.5010 | 0.8810 | 0.4070 | 0.6269 | 0.6125 | 0.1666 | 0.8006 | 0.6534 | 0.8800 | 0.3012 |

| | Patch Number | | | | | | | | | |
|---|---|---|---|---|---|---|---|---|---|---|
| Wavelength (nm) | 81 | 82 | 83 | 84 | 85 | 86 | 87 | 88 | 89 | 90 |
| 380 | 0.0000 | 0.0470 | 0.0406 | 0.0421 | 0.0000 | 0.0000 | 0.0000 | 0.0000 | 0.0000 | 0.0000 |
| 390 | 0.0300 | 0.0510 | 0.0397 | 0.0432 | 0.0904 | 0.0337 | 0.0289 | 0.0317 | 0.0284 | 0.0291 |
| 400 | 0.0285 | 0.0550 | 0.0401 | 0.0447 | 0.0929 | 0.0317 | 0.0308 | 0.0309 | 0.0282 | 0.0325 |
| 410 | 0.0288 | 0.0550 | 0.0405 | 0.0453 | 0.0964 | 0.0303 | 0.0318 | 0.0305 | 0.0296 | 0.0373 |
| 420 | 0.0297 | 0.0560 | 0.0410 | 0.0461 | 0.0989 | 0.0292 | 0.0318 | 0.0313 | 0.0322 | 0.0415 |
| 430 | 0.0299 | 0.0590 | 0.0415 | 0.0462 | 0.1007 | 0.0283 | 0.0308 | 0.0322 | 0.0344 | 0.0439 |
| 440 | 0.0303 | 0.0620 | 0.0420 | 0.0468 | 0.1019 | 0.0279 | 0.0307 | 0.0327 | 0.0357 | 0.0451 |
| 450 | 0.0319 | 0.0700 | 0.0426 | 0.0473 | 0.1062 | 0.0281 | 0.0318 | 0.0327 | 0.0377 | 0.0469 |
| 460 | 0.0333 | 0.0840 | 0.0431 | 0.0480 | 0.1093 | 0.0279 | 0.0318 | 0.0329 | 0.0384 | 0.0476 |
| 470 | 0.0342 | 0.1070 | 0.0444 | 0.0498 | 0.1107 | 0.0275 | 0.0309 | 0.0332 | 0.0385 | 0.0480 |
| 480 | 0.0356 | 0.1419 | 0.0471 | 0.0538 | 0.1118 | 0.0274 | 0.0307 | 0.0331 | 0.0386 | 0.0483 |
| 490 | 0.0389 | 0.1950 | 0.0517 | 0.0594 | 0.1174 | 0.0282 | 0.0320 | 0.0337 | 0.0394 | 0.0497 |
| 500 | 0.0518 | 0.2769 | 0.0597 | 0.0699 | 0.1338 | 0.0316 | 0.0372 | 0.0362 | 0.0430 | 0.0700 |
| 510 | 0.0875 | 0.3929 | 0.0768 | 0.0936 | 0.1725 | 0.0411 | 0.0499 | 0.0463 | 0.0528 | 0.0700 |
| 520 | 0.1513 | 0.4940 | 0.0998 | 0.1262 | 0.2394 | 0.0625 | 0.0766 | 0.0766 | 0.0733 | 0.1023 |
| 530 | 0.2082 | 0.5390 | 0.1157 | 0.1496 | 0.2974 | 0.0863 | 0.1037 | 0.1103 | 0.0929 | 0.1337 |
| 540 | 0.2336 | 0.5480 | 0.1225 | 0.1585 | 0.3240 | 0.0968 | 0.1146 | 0.1301 | 0.1020 | 0.1488 |
| 550 | 0.2469 | 0.5310 | 0.1253 | 0.1602 | 0.3358 | 0.1011 | 0.1182 | 0.1437 | 0.1067 | 0.1564 |
| 560 | 0.2368 | 0.5180 | 0.1259 | 0.1580 | 0.3245 | 0.0938 | 0.1101 | 0.1382 | 0.1018 | 0.1492 |
| 570 | 0.2039 | 0.4890 | 0.1235 | 0.1513 | 0.2908 | 0.0741 | 0.0893 | 0.1149 | 0.0891 | 0.1280 |
| 580 | 0.1718 | 0.4590 | 0.1165 | 0.1392 | 0.2579 | 0.0611 | 0.0726 | 0.0931 | 0.0782 | 0.1099 |
| 590 | 0.1537 | 0.4220 | 0.1058 | 0.1234 | 0.2415 | 0.0538 | 0.0630 | 0.0820 | 0.0724 | 0.1002 |
| 600 | 0.1446 | 0.3839 | 0.0918 | 0.1072 | 0.2315 | 0.0495 | 0.0581 | 0.0769 | 0.0700 | 0.0957 |
| 610 | 0.1286 | 0.3549 | 0.0798 | 0.0960 | 0.2128 | 0.0451 | 0.0515 | 0.0670 | 0.0640 | 0.0873 |
| 620 | 0.1121 | 0.3430 | 0.0721 | 0.0898 | 0.1945 | 0.0409 | 0.0452 | 0.0575 | 0.0581 | 0.0793 |
| 630 | 0.1086 | 0.3409 | 0.0682 | 0.0869 | 0.1905 | 0.0398 | 0.0432 | 0.0550 | 0.0568 | 0.0773 |
| 640 | 0.0883 | 0.3319 | 0.0651 | 0.0846 | 0.1723 | 0.0325 | 0.0352 | 0.0470 | 0.0519 | 0.0685 |
| 650 | 0.0665 | 0.3259 | 0.0630 | 0.0833 | 0.1517 | 0.0282 | 0.0287 | 0.0390 | 0.0458 | 0.0590 |
| 660 | 0.0538 | 0.3299 | 0.0624 | 0.0841 | 0.1326 | 0.0275 | 0.0274 | 0.0347 | 0.0411 | 0.0530 |
| 670 | 0.0445 | 0.3449 | 0.0633 | 0.0876 | 0.1189 | 0.0294 | 0.0290 | 0.0327 | 0.0374 | 0.0483 |
| 680 | 0.0533 | 0.3570 | 0.0658 | 0.0929 | 0.1255 | 0.0388 | 0.0411 | 0.0349 | 0.0397 | 0.0511 |
| 690 | 0.1264 | 0.3719 | 0.0694 | 0.0986 | 0.1983 | 0.0659 | 0.0728 | 0.0573 | 0.0611 | 0.0822 |
| 700 | 0.3309 | 0.3789 | 0.0730 | 0.1031 | 0.3680 | 0.1694 | 0.1821 | 0.1706 | 0.1254 | 0.1813 |
| 710 | 0.5352 | 0.3819 | 0.0749 | 0.1039 | 0.5295 | 0.3496 | 0.3132 | 0.3131 | 0.2192 | 0.3049 |
| 720 | 0.7143 | 0.3750 | 0.0741 | 0.1023 | 0.6918 | 0.5822 | 0.4308 | 0.4270 | 0.3385 | 0.4410 |
| 730 | 0.8321 | 0.3739 | 0.0743 | 0.1026 | 0.8164 | 0.7681 | 0.5048 | 0.5037 | 0.4680 | 0.5736 |

| | Patch Number | | | | | | | | | |
|---|---|---|---|---|---|---|---|---|---|---|
| Wavelength (nm) | 91 | 92 | 93 | 94 | 95 | 96 | 97 | 98 | 99 | 100 |
| 380 | 0.0533 | 0.0285 | 0.0296 | 0.2012 | 0.0957 | 0.0439 | 0.0422 | 0.0500 | 0.0910 | 0.0970 |
| 390 | 0.0461 | 0.0293 | 0.0309 | 0.2281 | 0.1097 | 0.0471 | 0.0433 | 0.0570 | 0.1273 | 0.0973 |
| 400 | 0.0389 | 0.0269 | 0.0280 | 0.2390 | 0.1107 | 0.0498 | 0.0446 | 0.0610 | 0.1649 | 0.0789 |
| 410 | 0.0333 | 0.0239 | 0.0239 | 0.2422 | 0.1037 | 0.0513 | 0.0458 | 0.0620 | 0.1835 | 0.0639 |
| 420 | 0.0296 | 0.0209 | 0.0208 | 0.2400 | 0.0944 | 0.0532 | 0.0469 | 0.0639 | 0.1890 | 0.0563 |
| 430 | 0.0263 | 0.0189 | 0.0185 | 0.2296 | 0.0853 | 0.0563 | 0.0483 | 0.0659 | 0.1897 | 0.0536 |
| 440 | 0.0249 | 0.0179 | 0.0174 | 0.2220 | 0.0804 | 0.0609 | 0.0501 | 0.0669 | 0.1913 | 0.0551 |
| 450 | 0.0252 | 0.0183 | 0.0174 | 0.2235 | 0.0817 | 0.0689 | 0.0525 | 0.0729 | 0.1949 | 0.0615 |
| 460 | 0.0273 | 0.0198 | 0.0189 | 0.2343 | 0.0899 | 0.0830 | 0.0587 | 0.0840 | 0.2015 | 0.0755 |
| 470 | 0.0295 | 0.0219 | 0.0211 | 0.2459 | 0.0984 | 0.1030 | 0.0726 | 0.0969 | 0.2195 | 0.1013 |
| 480 | 0.0367 | 0.0280 | 0.0276 | 0.2766 | 0.1189 | 0.1392 | 0.1087 | 0.1179 | 0.2659 | 0.1410 |
| 490 | 0.0647 | 0.0535 | 0.0568 | 0.3686 | 0.1920 | 0.1928 | 0.1633 | 0.1409 | 0.3493 | 0.1929 |

APPENDIX A
Spectral Reflectance of 190 Test Colors

| | | | | | | | | | | |
|---|---|---|---|---|---|---|---|---|---|---|
| 500 | 0.1353 | 0.1297 | 0.1620 | 0.5465 | 0.3697 | 0.2745 | 0.2200 | 0.1699 | 0.4435 | 0.2470 |
| 510 | 0.2099 | 0.2328 | 0.3403 | 0.7138 | 0.5878 | 0.3632 | 0.2559 | 0.2259 | 0.5081 | 0.2725 |
| 520 | 0.2213 | 0.2814 | 0.4375 | 0.7659 | 0.6730 | 0.4153 | 0.2685 | 0.3079 | 0.5334 | 0.2699 |
| 530 | 0.2002 | 0.2867 | 0.4414 | 0.7540 | 0.6540 | 0.4251 | 0.2679 | 0.3599 | 0.5346 | 0.2560 |
| 540 | 0.1717 | 0.2749 | 0.4074 | 0.7211 | 0.5962 | 0.4089 | 0.2595 | 0.3629 | 0.5180 | 0.2396 |
| 550 | 0.1470 | 0.2521 | 0.3553 | 0.6693 | 0.5214 | 0.3771 | 0.2440 | 0.3340 | 0.4881 | 0.2249 |
| 560 | 0.1275 | 0.2178 | 0.2891 | 0.6017 | 0.4337 | 0.3364 | 0.2224 | 0.2909 | 0.4531 | 0.2148 |
| 570 | 0.1141 | 0.1810 | 0.2273 | 0.5311 | 0.3522 | 0.2934 | 0.1976 | 0.2469 | 0.4150 | 0.2034 |
| 580 | 0.1056 | 0.1530 | 0.1832 | 0.4762 | 0.2944 | 0.2494 | 0.1700 | 0.2059 | 0.3728 | 0.1789 |
| 590 | 0.1018 | 0.1344 | 0.1573 | 0.4444 | 0.2588 | 0.2050 | 0.1404 | 0.1670 | 0.3285 | 0.1447 |
| 600 | 0.1020 | 0.1207 | 0.1372 | 0.4182 | 0.2318 | 0.1625 | 0.1119 | 0.1269 | 0.2874 | 0.1155 |
| 610 | 0.1035 | 0.1087 | 0.1212 | 0.3963 | 0.2095 | 0.1300 | 0.0913 | 0.0989 | 0.2598 | 0.1024 |
| 620 | 0.1069 | 0.1049 | 0.1167 | 0.3880 | 0.2022 | 0.1119 | 0.0808 | 0.0849 | 0.2446 | 0.0960 |
| 630 | 0.1139 | 0.1078 | 0.1195 | 0.3943 | 0.2064 | 0.1026 | 0.0755 | 0.0769 | 0.2359 | 0.0856 |
| 640 | 0.1224 | 0.1146 | 0.1271 | 0.4061 | 0.2147 | 0.0963 | 0.0719 | 0.0719 | 0.2280 | 0.0770 |
| 650 | 0.1344 | 0.1250 | 0.1411 | 0.4262 | 0.2341 | 0.0915 | 0.0692 | 0.0719 | 0.2227 | 0.0817 |
| 660 | 0.1485 | 0.1406 | 0.1601 | 0.4560 | 0.2600 | 0.0899 | 0.0685 | 0.0719 | 0.2221 | 0.1110 |
| 670 | 0.1654 | 0.1501 | 0.1732 | 0.4721 | 0.2780 | 0.0910 | 0.0691 | 0.0719 | 0.2279 | 0.1788 |
| 680 | 0.1861 | 0.1489 | 0.1715 | 0.4699 | 0.2761 | 0.0955 | 0.0717 | 0.0739 | 0.2387 | 0.3070 |
| 690 | 0.2105 | 0.1402 | 0.1605 | 0.4542 | 0.2616 | 0.1000 | 0.0747 | 0.0779 | 0.2507 | 0.5023 |
| 700 | 0.2466 | 0.1313 | 0.1472 | 0.4377 | 0.2448 | 0.1079 | 0.0801 | 0.0829 | 0.2585 | 0.7141 |
| 710 | 0.2842 | 0.1195 | 0.1315 | 0.4127 | 0.2243 | 0.1108 | 0.0815 | 0.0859 | 0.2597 | 0.8455 |
| 720 | 0.3211 | 0.1255 | 0.1377 | 0.4254 | 0.2342 | 0.1116 | 0.0812 | 0.0849 | 0.2534 | 0.9025 |
| 730 | 0.3643 | 0.1494 | 0.1705 | 0.4701 | 0.2730 | 0.1098 | 0.0793 | 0.0849 | 0.2506 | 0.9180 |

| | Patch Number | | | | | | | | | |
|---|---|---|---|---|---|---|---|---|---|---|
| Wavelength (nm) | 101 | 102 | 103 | 104 | 105 | 106 | 107 | 108 | 109 | 110 |
| 380 | 0.0323 | 0.0128 | 0.0574 | 0.0410 | 0.0331 | 0.1030 | 0.2526 | 0.0373 | 0.0663 | 0.0000 |
| 390 | 0.0324 | 0.0156 | 0.0653 | 0.0440 | 0.0332 | 0.1110 | 0.2429 | 0.0327 | 0.0842 | 0.1689 |
| 400 | 0.0228 | 0.0179 | 0.0708 | 0.0480 | 0.0252 | 0.1190 | 0.2235 | 0.0313 | 0.0989 | 0.1693 |
| 410 | 0.0170 | 0.0205 | 0.0740 | 0.0510 | 0.0207 | 0.1270 | 0.1987 | 0.0321 | 0.1051 | 0.1694 |
| 420 | 0.0146 | 0.0235 | 0.0763 | 0.0520 | 0.0181 | 0.1310 | 0.1776 | 0.0334 | 0.1086 | 0.1714 |
| 430 | 0.0139 | 0.0262 | 0.0786 | 0.0550 | 0.0173 | 0.1380 | 0.1612 | 0.0353 | 0.1127 | 0.1735 |
| 440 | 0.0139 | 0.0294 | 0.0823 | 0.0590 | 0.0174 | 0.1480 | 0.1540 | 0.0383 | 0.1183 | 0.1742 |
| 450 | 0.0154 | 0.0347 | 0.0872 | 0.0660 | 0.0185 | 0.1650 | 0.1622 | 0.0427 | 0.1257 | 0.1745 |
| 460 | 0.0190 | 0.0440 | 0.0963 | 0.0760 | 0.0213 | 0.1910 | 0.2015 | 0.0482 | 0.1394 | 0.1731 |
| 470 | 0.0277 | 0.0545 | 0.1183 | 0.0940 | 0.0279 | 0.2350 | 0.2838 | 0.0552 | 0.1628 | 0.1718 |
| 480 | 0.0458 | 0.0689 | 0.1619 | 0.1150 | 0.0415 | 0.2880 | 0.3929 | 0.0622 | 0.2021 | 0.1699 |
| 490 | 0.0800 | 0.1033 | 0.2190 | 0.1360 | 0.0690 | 0.3400 | 0.4757 | 0.0697 | 0.2365 | 0.1691 |
| 500 | 0.1307 | 0.1612 | 0.2694 | 0.1520 | 0.1151 | 0.3790 | 0.5095 | 0.0770 | 0.2587 | 0.1703 |
| 510 | 0.1657 | 0.2085 | 0.2963 | 0.1600 | 0.1516 | 0.4000 | 0.5061 | 0.0788 | 0.2668 | 0.1784 |
| 520 | 0.1658 | 0.2248 | 0.3010 | 0.1620 | 0.1498 | 0.4050 | 0.4837 | 0.0746 | 0.2655 | 0.1963 |
| 530 | 0.1450 | 0.2234 | 0.2942 | 0.1580 | 0.1211 | 0.3950 | 0.4515 | 0.0673 | 0.2593 | 0.2087 |
| 540 | 0.1212 | 0.2125 | 0.2777 | 0.1500 | 0.0887 | 0.3760 | 0.4138 | 0.0603 | 0.2496 | 0.2109 |
| 550 | 0.0988 | 0.1942 | 0.2523 | 0.1400 | 0.0625 | 0.3500 | 0.3748 | 0.0542 | 0.2348 | 0.2113 |
| 560 | 0.0769 | 0.1661 | 0.2216 | 0.1280 | 0.0453 | 0.3200 | 0.3352 | 0.0489 | 0.2148 | 0.2030 |
| 570 | 0.0582 | 0.1335 | 0.1900 | 0.1150 | 0.0346 | 0.2870 | 0.2950 | 0.0438 | 0.1921 | 0.1899 |
| 580 | 0.0446 | 0.0982 | 0.1593 | 0.1010 | 0.0264 | 0.2530 | 0.2618 | 0.0398 | 0.1669 | 0.1756 |
| 590 | 0.0358 | 0.0630 | 0.1296 | 0.0880 | 0.0210 | 0.2190 | 0.2390 | 0.0375 | 0.1399 | 0.1679 |
| 600 | 0.0292 | 0.0352 | 0.1019 | 0.0760 | 0.0182 | 0.1900 | 0.2184 | 0.0364 | 0.1126 | 0.1627 |
| 610 | 0.0231 | 0.0199 | 0.0824 | 0.0690 | 0.0176 | 0.1730 | 0.1998 | 0.0364 | 0.0913 | 0.1547 |
| 620 | 0.0194 | 0.0154 | 0.0718 | 0.0660 | 0.0178 | 0.1640 | 0.1847 | 0.0373 | 0.0800 | 0.1476 |
| 630 | 0.0187 | 0.0143 | 0.0665 | 0.0630 | 0.0176 | 0.1580 | 0.1775 | 0.0406 | 0.0741 | 0.1447 |
| 640 | 0.0210 | 0.0141 | 0.0629 | 0.0620 | 0.0175 | 0.1550 | 0.1828 | 0.0481 | 0.0707 | 0.1381 |
| 650 | 0.0286 | 0.0146 | 0.0602 | 0.0610 | 0.0191 | 0.1520 | 0.1961 | 0.0627 | 0.0679 | 0.1306 |
| 660 | 0.0459 | 0.0172 | 0.0590 | 0.0610 | 0.0234 | 0.1520 | 0.2002 | 0.0886 | 0.0674 | 0.1251 |
| 670 | 0.0811 | 0.0231 | 0.0596 | 0.0620 | 0.0314 | 0.1550 | 0.1948 | 0.1291 | 0.0685 | 0.1193 |
| 680 | 0.1413 | 0.0326 | 0.0618 | 0.0650 | 0.0453 | 0.1620 | 0.2010 | 0.1869 | 0.0716 | 0.1180 |
| 690 | 0.2278 | 0.0410 | 0.0654 | 0.0680 | 0.0740 | 0.1690 | 0.2298 | 0.2585 | 0.0748 | 0.1347 |
| 700 | 0.3371 | 0.0505 | 0.0691 | 0.0700 | 0.1298 | 0.1740 | 0.2769 | 0.3399 | 0.0798 | 0.1902 |
| 710 | 0.4488 | 0.0548 | 0.0714 | 0.0720 | 0.2089 | 0.1790 | 0.3323 | 0.4234 | 0.0807 | 0.2775 |
| 720 | 0.5507 | 0.0532 | 0.0713 | 0.0740 | 0.3025 | 0.1840 | 0.3983 | 0.4989 | 0.0805 | 0.3942 |
| 730 | 0.6101 | 0.0532 | 0.0711 | 0.0000 | 0.3685 | 0.0000 | 0.4757 | 0.5644 | 0.0787 | 0.5195 |

| | Patch Number | | | | | | | | | |
|---|---|---|---|---|---|---|---|---|---|---|
| Wavelength (nm) | 111 | 112 | 113 | 114 | 115 | 116 | 117 | 118 | 119 | 120 |
| 380 | 0.0332 | 0.0780 | 0.1548 | 0.5147 | 0.1033 | 0.1103 | 0.2776 | 0.0776 | 0.0955 | 0.2155 |
| 390 | 0.0535 | 0.0783 | 0.1525 | 0.5162 | 0.0881 | 0.1699 | 0.3032 | 0.0779 | 0.1566 | 0.2162 |
| 400 | 0.0700 | 0.0670 | 0.1562 | 0.5172 | 0.0758 | 0.2354 | 0.3454 | 0.0675 | 0.2095 | 0.2044 |
| 410 | 0.0774 | 0.0559 | 0.1693 | 0.5056 | 0.0662 | 0.2681 | 0.4065 | 0.0590 | 0.2425 | 0.1889 |
| 420 | 0.0776 | 0.0487 | 0.1849 | 0.4868 | 0.0604 | 0.2803 | 0.4622 | 0.0529 | 0.2539 | 0.1747 |
| 430 | 0.0750 | 0.0457 | 0.2015 | 0.4683 | 0.0573 | 0.2925 | 0.4964 | 0.0499 | 0.2547 | 0.1685 |
| 440 | 0.0736 | 0.0454 | 0.2228 | 0.4619 | 0.0573 | 0.3085 | 0.5152 | 0.0501 | 0.2564 | 0.1707 |

APPENDIX A
Spectral Reflectance of 190 Test Colors

| | | | | | | | | | | |
|---|---|---|---|---|---|---|---|---|---|---|
| 450 | 0.0760 | 0.0483 | 0.2485 | 0.4784 | 0.0628 | 0.3309 | 0.5333 | 0.0540 | 0.2635 | 0.1820 |
| 460 | 0.0817 | 0.0555 | 0.2789 | 0.5317 | 0.0784 | 0.3720 | 0.5561 | 0.0643 | 0.2771 | 0.2086 |
| 470 | 0.0873 | 0.0672 | 0.3169 | 0.6281 | 0.1128 | 0.4338 | 0.5862 | 0.0831 | 0.2887 | 0.2503 |
| 480 | 0.1002 | 0.0808 | 0.3575 | 0.7492 | 0.1581 | 0.5316 | 0.6100 | 0.1100 | 0.3151 | 0.3038 |
| 490 | 0.1411 | 0.0925 | 0.3934 | 0.8420 | 0.1868 | 0.6172 | 0.6211 | 0.1456 | 0.3955 | 0.3641 |
| 500 | 0.2118 | 0.0966 | 0.4136 | 0.8809 | 0.1910 | 0.6574 | 0.6317 | 0.1798 | 0.5326 | 0.4158 |
| 510 | 0.2642 | 0.0919 | 0.4143 | 0.8678 | 0.1797 | 0.6551 | 0.6421 | 0.1820 | 0.6206 | 0.4248 |
| 520 | 0.2674 | 0.0849 | 0.3999 | 0.8312 | 0.1619 | 0.6274 | 0.6481 | 0.1541 | 0.6034 | 0.3961 |
| 530 | 0.2437 | 0.0783 | 0.3759 | 0.7855 | 0.1408 | 0.5865 | 0.6457 | 0.1167 | 0.5336 | 0.3479 |
| 540 | 0.2064 | 0.0723 | 0.3487 | 0.7354 | 0.1197 | 0.5347 | 0.6326 | 0.0844 | 0.4479 | 0.2937 |
| 550 | 0.1623 | 0.0692 | 0.3229 | 0.6813 | 0.1010 | 0.4762 | 0.6093 | 0.0604 | 0.3568 | 0.2409 |
| 560 | 0.1130 | 0.0708 | 0.3006 | 0.6303 | 0.0841 | 0.4165 | 0.5796 | 0.0449 | 0.2616 | 0.1978 |
| 570 | 0.0738 | 0.0724 | 0.2788 | 0.5844 | 0.0689 | 0.3609 | 0.5445 | 0.0354 | 0.1848 | 0.1626 |
| 580 | 0.0506 | 0.0658 | 0.2589 | 0.5340 | 0.0578 | 0.3075 | 0.5024 | 0.0279 | 0.1360 | 0.1270 |
| 590 | 0.0391 | 0.0523 | 0.2465 | 0.4814 | 0.0513 | 0.2586 | 0.4533 | 0.0228 | 0.1098 | 0.0950 |
| 600 | 0.0321 | 0.0416 | 0.2420 | 0.4390 | 0.0472 | 0.2194 | 0.4046 | 0.0200 | 0.0916 | 0.0732 |
| 610 | 0.0273 | 0.0376 | 0.2428 | 0.4179 | 0.0438 | 0.1959 | 0.3735 | 0.0194 | 0.0787 | 0.0647 |
| 620 | 0.0256 | 0.0365 | 0.2435 | 0.4068 | 0.0408 | 0.1842 | 0.3610 | 0.0194 | 0.0752 | 0.0617 |
| 630 | 0.0273 | 0.0331 | 0.2439 | 0.3891 | 0.0397 | 0.1776 | 0.3574 | 0.0191 | 0.0782 | 0.0554 |
| 640 | 0.0296 | 0.0302 | 0.2506 | 0.3725 | 0.0411 | 0.1727 | 0.3560 | 0.0187 | 0.0847 | 0.0503 |
| 650 | 0.0348 | 0.0328 | 0.2726 | 0.3778 | 0.0462 | 0.1698 | 0.3602 | 0.0198 | 0.0977 | 0.0566 |
| 660 | 0.0427 | 0.0450 | 0.3141 | 0.4271 | 0.0565 | 0.1735 | 0.3742 | 0.0237 | 0.1160 | 0.0819 |
| 670 | 0.0472 | 0.0742 | 0.3766 | 0.5428 | 0.0699 | 0.1830 | 0.3959 | 0.0314 | 0.1275 | 0.1390 |
| 680 | 0.0457 | 0.1380 | 0.4596 | 0.7222 | 0.0851 | 0.1952 | 0.4202 | 0.0452 | 0.1245 | 0.2535 |
| 690 | 0.0414 | 0.2560 | 0.5514 | 0.9019 | 0.1024 | 0.2036 | 0.4414 | 0.0727 | 0.1153 | 0.4414 |
| 700 | 0.0364 | 0.4129 | 0.6354 | 1.0127 | 0.1221 | 0.2141 | 0.4541 | 0.1249 | 0.1013 | 0.6610 |
| 710 | 0.0311 | 0.5522 | 0.7041 | 0.0186 | 0.1401 | 0.2105 | 0.4566 | 0.2007 | 0.0877 | 0.8090 |
| 720 | 0.0341 | 0.6530 | 0.7450 | 0.9891 | 0.1612 | 0.2061 | 0.4545 | 0.2932 | 0.0946 | 0.8725 |
| 730 | 0.0469 | 0.7014 | 0.7715 | 0.9640 | 0.1819 | 0.2022 | 0.4606 | 0.3598 | 0.1227 | 0.8861 |

| | Patch Number | | | | | | | | | |
|---|---|---|---|---|---|---|---|---|---|---|
| Wavelength (nm) | 121 | 122 | 123 | 124 | 125 | 126 | 127 | 128 | 129 | 130 |
| 380 | 0.1070 | 0.1670 | 0.0280 | 0.0968 | 0.5207 | 0.0944 | 0.0877 | 0.4995 | 0.3120 | 0.4554 |
| 390 | 0.1679 | 0.1941 | 0.0417 | 0.1232 | 0.5222 | 0.1198 | 0.1173 | 0.5010 | 0.3160 | 0.4568 |
| 400 | 0.2629 | 0.2219 | 0.0579 | 0.1517 | 0.5356 | 0.1445 | 0.1500 | 0.5191 | 0.3210 | 0.4720 |
| 410 | 0.3169 | 0.2630 | 0.0785 | 0.1848 | 0.5509 | 0.1646 | 0.1730 | 0.5463 | 0.3270 | 0.4824 |
| 420 | 0.3290 | 0.3106 | 0.1013 | 0.2160 | 0.5592 | 0.1712 | 0.1888 | 0.5718 | 0.3340 | 0.4786 |
| 430 | 0.3389 | 0.3522 | 0.1276 | 0.2416 | 0.4670 | 0.1689 | 0.2052 | 0.5921 | 0.3430 | 0.4725 |
| 440 | 0.3539 | 0.3930 | 0.1589 | 0.2719 | 0.5764 | 0.1648 | 0.2281 | 0.6075 | 0.3550 | 0.4687 |
| 450 | 0.3759 | 0.4301 | 0.1969 | 0.3013 | 0.5942 | 0.1617 | 0.2597 | 0.6259 | 0.3690 | 0.4772 |
| 460 | 0.4069 | 0.4660 | 0.2481 | 0.3332 | 0.6252 | 0.1614 | 0.3070 | 0.6466 | 0.3910 | 0.5042 |
| 470 | 0.4640 | 0.4948 | 0.3041 | 0.3714 | 0.6652 | 0.1619 | 0.3698 | 0.6670 | 0.4130 | 0.5406 |
| 480 | 0.5250 | 0.5051 | 0.3491 | 0.4084 | 0.7029 | 0.1645 | 0.4259 | 0.6822 | 0.4260 | 0.5728 |
| 490 | 0.5750 | 0.4961 | 0.3733 | 0.4375 | 0.7334 | 0.1710 | 0.4523 | 0.6964 | 0.4300 | 0.6003 |
| 500 | 0.5910 | 0.4857 | 0.3819 | 0.4493 | 0.7527 | 0.1786 | 0.4370 | 0.7060 | 0.4240 | 0.6174 |
| 510 | 0.5860 | 0.4817 | 0.3765 | 0.4444 | 0.7483 | 0.1854 | 0.3975 | 0.7027 | 0.4130 | 0.6032 |
| 520 | 0.5780 | 0.4828 | 0.3601 | 0.4242 | 0.7285 | 0.1892 | 0.3448 | 0.6909 | 0.3990 | 0.5611 |
| 530 | 0.5540 | 0.4808 | 0.3308 | 0.3923 | 0.7006 | 0.1861 | 0.2880 | 0.6727 | 0.3820 | 0.5019 |
| 540 | 0.5240 | 0.4764 | 0.2893 | 0.3498 | 0.6595 | 0.1765 | 0.2333 | 0.6424 | 0.3620 | 0.4358 |
| 550 | 0.4820 | 0.4782 | 0.2386 | 0.2976 | 0.6073 | 0.1607 | 0.1837 | 0.5995 | 0.3390 | 0.3706 |
| 560 | 0.4370 | 0.4891 | 0.1800 | 0.2450 | 0.5568 | 0.1400 | 0.1438 | 0.5542 | 0.3160 | 0.3147 |
| 570 | 0.3899 | 0.4920 | 0.1266 | 0.2008 | 0.5113 | 0.1197 | 0.1161 | 0.5111 | 0.2910 | 0.2685 |
| 580 | 0.3469 | 0.4556 | 0.0867 | 0.1662 | 0.4592 | 0.1039 | 0.0987 | 0.4622 | 0.2670 | 0.2212 |
| 590 | 0.2999 | 0.3844 | 0.0569 | 0.1344 | 0.4033 | 0.0910 | 0.0872 | 0.4100 | 0.2380 | 0.1769 |
| 600 | 0.2600 | 0.3010 | 0.0353 | 0.1022 | 0.3588 | 0.0765 | 0.0779 | 0.3702 | 0.2150 | 0.1448 |
| 610 | 0.2359 | 0.2346 | 0.0226 | 0.0857 | 0.3391 | 0.0693 | 0.0724 | 0.3537 | 0.1990 | 0.1314 |
| 620 | 0.2209 | 0.2048 | 0.0187 | 0.0800 | 0.3300 | 0.0685 | 0.0698 | 0.3450 | 0.1900 | 0.1260 |
| 630 | 0.2169 | 0.1966 | 0.0177 | 0.0768 | 0.3115 | 0.0693 | 0.0689 | 0.3269 | 0.1850 | 0.1148 |
| 640 | 0.2119 | 0.1951 | 0.0176 | 0.0740 | 0.2932 | 0.0705 | 0.0683 | 0.3117 | 0.1810 | 0.1047 |
| 650 | 0.2059 | 0.1986 | 0.0191 | 0.0659 | 0.2963 | 0.0653 | 0.0688 | 0.3191 | 0.1790 | 0.1107 |
| 660 | 0.2090 | 0.2182 | 0.0232 | 0.0490 | 0.3437 | 0.0491 | 0.0703 | 0.3718 | 0.1790 | 0.1470 |
| 670 | 0.2189 | 0.2514 | 0.0299 | 0.0383 | 0.4589 | 0.0376 | 0.0719 | 0.4960 | 0.1850 | 0.2312 |
| 680 | 0.2289 | 0.2916 | 0.0370 | 0.0410 | 0.6526 | 0.0393 | 0.0727 | 0.6925 | 0.1910 | 0.3880 |
| 690 | 0.2429 | 0.3278 | 0.0421 | 0.0624 | 0.8784 | 0.0593 | 0.0731 | 0.8962 | 0.1970 | 0.6158 |
| 700 | 0.2509 | 0.3601 | 0.0442 | 0.1102 | 1.0468 | 0.1084 | 0.0726 | 1.0183 | 0.2040 | 0.8457 |
| 710 | 0.2529 | 0.3690 | 0.0434 | 0.1729 | 1.0891 | 0.1769 | 0.0719 | 1.0240 | 0.2110 | 0.9656 |
| 720 | 0.2419 | 0.3688 | 0.0435 | 0.2356 | 1.0760 | 0.2464 | 0.0741 | 0.9942 | 0.2180 | 0.9982 |
| 730 | 0.2389 | 0.3676 | 0.0495 | 0.2986 | 1.0563 | 0.3129 | 0.0790 | 0.9703 | 0.0000 | 0.9953 |

| | Patch Number | | | | | | | | | |
|---|---|---|---|---|---|---|---|---|---|---|
| Wavelength (nm) | 131 | 132 | 133 | 134 | 135 | 136 | 137 | 138 | 139 | 140 |
| 380 | 0.0870 | 0.1152 | 0.0379 | 0.0823 | 0.5259 | 0.2940 | 0.0893 | 0.0668 | 0.3490 | 0.1315 |
| 390 | 0.1369 | 0.1911 | 0.0871 | 0.1009 | 0.5275 | 0.2948 | 0.1279 | 0.0658 | 0.3501 | 0.2332 |

-continued

APPENDIX A
Spectral Reflectance of 190 Test Colors

| | | | | | | | | | | |
|---|---|---|---|---|---|---|---|---|---|---|
| 400 | 0.1991 | 0.3207 | 0.1535 | 0.1190 | 0.5463 | 0.2790 | 0.1781 | 0.0672 | 0.3700 | 0.4314 |
| 410 | 0.2403 | 0.4389 | 0.2174 | 0.1325 | 0.5725 | 0.2569 | 0.2416 | 0.0702 | 0.3925 | 0.6425 |
| 420 | 0.2605 | 0.4874 | 0.2592 | 0.1419 | 0.5977 | 0.2451 | 0.3035 | 0.0766 | 0.4124 | 0.7270 |
| 430 | 0.2833 | 0.5079 | 0.2942 | 0.1479 | 0.6157 | 0.2410 | 0.3639 | 0.0876 | 0.4249 | 0.7439 |
| 440 | 0.3154 | 0.5264 | 0.3330 | 0.1550 | 0.6284 | 0.2455 | 0.4331 | 0.1042 | 0.4286 | 0.7517 |
| 450 | 0.3493 | 0.5438 | 0.3636 | 0.1623 | 0.6378 | 0.2588 | 0.4739 | 0.1200 | 0.4239 | 0.7566 |
| 460 | 0.3883 | 0.5569 | 0.3727 | 0.1688 | 0.6448 | 0.2767 | 0.4912 | 0.1242 | 0.4133 | 0.7554 |
| 470 | 0.4206 | 0.5685 | 0.3753 | 0.1755 | 0.6503 | 0.2941 | 0.4977 | 0.1172 | 0.4016 | 0.7526 |
| 480 | 0.4394 | 0.5721 | 0.3702 | 0.1792 | 0.6539 | 0.3040 | 0.4796 | 0.1069 | 0.3874 | 0.7426 |
| 490 | 0.4374 | 0.5725 | 0.3565 | 0.1814 | 0.6533 | 0.3007 | 0.4485 | 0.0981 | 0.3722 | 0.7273 |
| 500 | 0.4154 | 0.5642 | 0.3348 | 0.1719 | 0.6451 | 0.2852 | 0.4075 | 0.0872 | 0.3554 | 0.7080 |
| 510 | 0.3778 | 0.5502 | 0.3010 | 0.1539 | 0.6286 | 0.2633 | 0.3634 | 0.0768 | 0.3318 | 0.6850 |
| 520 | 0.3288 | 0.5306 | 0.2554 | 0.1329 | 0.6097 | 0.2415 | 0.3187 | 0.0698 | 0.2980 | 0.6575 |
| 530 | 0.2756 | 0.5039 | 0.2021 | 0.1114 | 0.5907 | 0.2215 | 0.2751 | 0.0622 | 0.2566 | 0.6319 |
| 540 | 0.2233 | 0.4695 | 0.1492 | 0.0920 | 0.5708 | 0.2046 | 0.2322 | 0.0515 | 0.2177 | 0.6075 |
| 550 | 0.1753 | 0.4260 | 0.1011 | 0.0754 | 0.5472 | 0.1899 | 0.1906 | 0.0415 | 0.1837 | 0.5776 |
| 560 | 0.1349 | 0.3785 | 0.0611 | 0.0621 | 0.5218 | 0.1765 | 0.1540 | 0.0349 | 0.1539 | 0.5428 |
| 570 | 0.1078 | 0.3365 | 0.0353 | 0.0510 | 0.4958 | 0.1631 | 0.1246 | 0.0304 | 0.1298 | 0.5169 |
| 580 | 0.0915 | 0.3053 | 0.0224 | 0.0431 | 0.4678 | 0.1485 | 0.1018 | 0.0263 | 0.1117 | 0.5061 |
| 590 | 0.0819 | 0.2827 | 0.0168 | 0.0373 | 0.4427 | 0.1358 | 0.0821 | 0.0229 | 0.0996 | 0.5018 |
| 600 | 0.0749 | 0.2618 | 0.0140 | 0.0329 | 0.4252 | 0.1264 | 0.0633 | 0.0210 | 0.0922 | 0.4959 |
| 610 | 0.0706 | 0.2469 | 0.0119 | 0.0295 | 0.4121 | 0.1188 | 0.0544 | 0.0209 | 0.0870 | 0.4896 |
| 620 | 0.0694 | 0.2394 | 0.0117 | 0.0280 | 0.4083 | 0.1155 | 0.0520 | 0.0212 | 0.0835 | 0.4915 |
| 630 | 0.0692 | 0.2356 | 0.0122 | 0.0275 | 0.4233 | 0.1220 | 0.0504 | 0.0210 | 0.0832 | 0.5040 |
| 640 | 0.0698 | 0.2336 | 0.0136 | 0.0273 | 0.4637 | 0.1447 | 0.0487 | 0.0203 | 0.0889 | 0.5235 |
| 650 | 0.0715 | 0.2362 | 0.0163 | 0.0275 | 0.5369 | 0.1938 | 0.0438 | 0.0200 | 0.1045 | 0.5400 |
| 660 | 0.0744 | 0.2411 | 0.0209 | 0.0267 | 0.6487 | 0.2838 | 0.0334 | 0.0213 | 0.1346 | 0.5507 |
| 670 | 0.0754 | 0.2434 | 0.0243 | 0.0248 | 0.7801 | 0.4234 | 0.0268 | 0.0271 | 0.1845 | 0.5458 |
| 680 | 0.0745 | 0.2417 | 0.0243 | 0.0246 | 0.8908 | 0.5886 | 0.0280 | 0.0432 | 0.2556 | 0.5286 |
| 690 | 0.0721 | 0.2380 | 0.0221 | 0.0269 | 0.9542 | 0.7295 | 0.0404 | 0.0777 | 0.3454 | 0.5121 |
| 700 | 0.0706 | 0.2290 | 0.0195 | 0.0354 | 0.9868 | 0.8277 | 0.0751 | 0.1352 | 0.4520 | 0.5138 |
| 710 | 0.0690 | 0.2218 | 0.0171 | 0.0509 | 0.9791 | 0.8664 | 0.1288 | 0.2112 | 0.5549 | 0.5124 |
| 720 | 0.0732 | 0.2242 | 0.0196 | 0.0730 | 0.9599 | 0.8760 | 0.1921 | 0.2945 | 0.6470 | 0.5304 |
| 730 | 0.0802 | 0.2360 | 0.0292 | 0.1093 | 0.9427 | 0.8715 | 0.2586 | 0.3794 | 0.6992 | 0.5419 |

| | Patch Number | | | | | | | | | |
|---|---|---|---|---|---|---|---|---|---|---|
| Wavelength (nm) | 141 | 142 | 143 | 144 | 145 | 146 | 147 | 148 | 149 | 150 |
| 380 | 0.1058 | 0.1000 | 0.0824 | 0.0000 | 0.2500 | 0.2449 | 0.2759 | 0.0762 | 0.2105 | 0.0986 |
| 390 | 0.1753 | 0.1340 | 0.1182 | 0.4013 | 0.3350 | 0.2457 | 0.3273 | 0.0819 | 0.2112 | 0.1603 |
| 400 | 0.2842 | 0.1680 | 0.1694 | 0.3681 | 0.4200 | 0.2580 | 0.3950 | 0.0860 | 0.2236 | 0.2573 |
| 410 | 0.3694 | 0.2020 | 0.2180 | 0.3319 | 0.5050 | 0.3113 | 0.5070 | 0.0903 | 0.2348 | 0.3348 |
| 420 | 0.4029 | 0.2120 | 0.2492 | 0.3011 | 0.5300 | 0.3920 | 0.6032 | 0.0972 | 0.2378 | 0.3537 |
| 430 | 0.4305 | 0.2180 | 0.2779 | 0.2746 | 0.5450 | 0.4607 | 0.6468 | 0.0975 | 0.2298 | 0.3434 |
| 440 | 0.4694 | 0.2230 | 0.3248 | 0.2506 | 0.5580 | 0.4863 | 0.6675 | 0.0962 | 0.2127 | 0.3256 |
| 450 | 0.5094 | 0.2280 | 0.3825 | 0.2305 | 0.5700 | 0.4780 | 0.6614 | 0.0940 | 0.1905 | 0.3074 |
| 460 | 0.5220 | 0.2270 | 0.4089 | 0.2124 | 0.5680 | 0.4528 | 0.6406 | 0.0907 | 0.1678 | 0.2867 |
| 470 | 0.5181 | 0.2220 | 0.4005 | 0.1944 | 0.5550 | 0.4222 | 0.6208 | 0.0869 | 0.1485 | 0.2613 |
| 480 | 0.4967 | 0.2130 | 0.3690 | 0.1801 | 0.5320 | 0.3855 | 0.5987 | 0.0826 | 0.1301 | 0.2483 |
| 490 | 0.4626 | 0.2000 | 0.3224 | 0.1665 | 0.5000 | 0.3478 | 0.5630 | 0.0771 | 0.1140 | 0.2416 |
| 500 | 0.4180 | 0.1850 | 0.2672 | 0.1542 | 0.4620 | 0.3073 | 0.5194 | 0.0704 | 0.0990 | 0.2270 |
| 510 | 0.3650 | 0.1700 | 0.2163 | 0.1438 | 0.4250 | 0.2659 | 0.4767 | 0.0636 | 0.0844 | 0.2202 |
| 520 | 0.3073 | 0.1550 | 0.1697 | 0.1342 | 0.3870 | 0.2263 | 0.4327 | 0.0571 | 0.0691 | 0.2244 |
| 530 | 0.2521 | 0.1400 | 0.1325 | 0.1259 | 0.3500 | 0.1871 | 0.4061 | 0.0516 | 0.0544 | 0.2277 |
| 540 | 0.2031 | 0.1270 | 0.1047 | 0.1175 | 0.3170 | 0.1525 | 0.3936 | 0.0467 | 0.0433 | 0.2047 |
| 550 | 0.1616 | 0.1140 | 0.0839 | 0.1095 | 0.2860 | 0.1221 | 0.3762 | 0.0427 | 0.0352 | 0.1972 |
| 560 | 0.1304 | 0.1040 | 0.0694 | 0.1029 | 0.2590 | 0.0959 | 0.3497 | 0.0395 | 0.0292 | 0.1717 |
| 570 | 0.1124 | 0.0960 | 0.0614 | 0.0946 | 0.2400 | 0.0772 | 0.3309 | 0.0370 | 0.0251 | 0.1738 |
| 580 | 0.1047 | 0.0920 | 0.0580 | 0.0889 | 0.2310 | 0.0639 | 0.3218 | 0.0353 | 0.0225 | 0.1757 |
| 590 | 0.1010 | 0.0910 | 0.0567 | 0.0815 | 0.2270 | 0.0521 | 0.3172 | 0.0345 | 0.0211 | 0.1718 |
| 600 | 0.0974 | 0.0900 | 0.0556 | 0.0789 | 0.2260 | 0.0420 | 0.3075 | 0.0341 | 0.0208 | 0.1621 |
| 610 | 0.0953 | 0.0900 | 0.0552 | 0.0746 | 0.2260 | 0.0370 | 0.2979 | 0.0343 | 0.0204 | 0.1543 |
| 620 | 0.0971 | 0.0920 | 0.0561 | 0.0697 | 0.2290 | 0.0400 | 0.2959 | 0.0346 | 0.0203 | 0.1508 |
| 630 | 0.1024 | 0.0960 | 0.0584 | 0.0652 | 0.2390 | 0.0546 | 0.3022 | 0.0356 | 0.0209 | 0.1505 |
| 640 | 0.1104 | 0.1000 | 0.0611 | 0.0628 | 0.2500 | 0.0855 | 0.3157 | 0.0380 | 0.0222 | 0.1518 |
| 650 | 0.1178 | 0.1060 | 0.0637 | 0.0585 | 0.2650 | 0.1342 | 0.3383 | 0.0423 | 0.0255 | 0.1563 |
| 660 | 0.1227 | 0.1100 | 0.0648 | 0.0562 | 0.2750 | 0.2013 | 0.3594 | 0.0504 | 0.0327 | 0.1619 |
| 670 | 0.1195 | 0.1140 | 0.0635 | 0.0537 | 0.2850 | 0.2845 | 0.3688 | 0.0633 | 0.0473 | 0.1633 |
| 680 | 0.1105 | 0.1160 | 0.0607 | 0.0512 | 0.2900 | 0.3798 | 0.3678 | 0.0826 | 0.0751 | 0.1602 |
| 690 | 0.1038 | 0.1190 | 0.0595 | 0.0473 | 0.2980 | 0.4794 | 0.3617 | 0.1058 | 0.1213 | 0.1548 |
| 700 | 0.1040 | 0.1240 | 0.0601 | 0.0468 | 0.3100 | 0.5831 | 0.3458 | 0.1303 | 0.1905 | 0.1477 |
| 710 | 0.1057 | 0.1290 | 0.0617 | 0.0471 | 0.3220 | 0.6690 | 0.3422 | 0.1563 | 0.2739 | 0.1431 |
| 720 | 0.1127 | 0.1340 | 0.0649 | 0.0434 | 0.3340 | 0.7377 | 0.3684 | 0.1801 | 0.3634 | 0.1497 |
| 730 | 0.1221 | 0.0000 | 0.0692 | 0.0438 | 0.0000 | 0.7739 | 0.4188 | 0.2036 | 0.4230 | 0.1660 |

APPENDIX A
Spectral Reflectance of 190 Test Colors

| | Patch Number | | | | | | | | | |
|---|---|---|---|---|---|---|---|---|---|---|
| Wavelength (nm) | 151 | 152 | 153 | 154 | 155 | 156 | 157 | 158 | 159 | 160 |
| 380 | 0.1225 | 0.0993 | 0.0969 | 0.4238 | 0.1450 | 0.1220 | 0.0000 | 0.1142 | 0.1191 | 0.3236 |
| 390 | 0.2034 | 0.1503 | 0.1549 | 0.4571 | 0.1520 | 0.2144 | 0.1071 | 0.2014 | 0.2141 | 0.3246 |
| 400 | 0.3630 | 0.2092 | 0.2469 | 0.4798 | 0.1680 | 0.3773 | 0.1725 | 0.3305 | 0.4067 | 0.3416 |
| 410 | 0.5489 | 0.2493 | 0.3189 | 0.4887 | 0.1910 | 0.5155 | 0.2323 | 0.4121 | 0.6180 | 0.3766 |
| 420 | 0.6380 | 0.2762 | 0.3489 | 0.4797 | 0.2240 | 0.5619 | 0.2730 | 0.4340 | 0.7074 | 0.3971 |
| 430 | 0.6549 | 0.2986 | 0.3699 | 0.4530 | 0.2630 | 0.5761 | 0.2992 | 0.4358 | 0.7282 | 0.3823 |
| 440 | 0.6558 | 0.3152 | 0.3879 | 0.4232 | 0.3010 | 0.5829 | 0.3141 | 0.4313 | 0.7363 | 0.3470 |
| 450 | 0.6424 | 0.3207 | 0.4049 | 0.3870 | 0.3110 | 0.5812 | 0.3112 | 0.4223 | 0.7400 | 0.3060 |
| 460 | 0.6209 | 0.3028 | 0.3879 | 0.3646 | 0.2850 | 0.5649 | 0.2935 | 0.4099 | 0.7358 | 0.2682 |
| 470 | 0.5894 | 0.2664 | 0.3549 | 0.3433 | 0.2420 | 0.5436 | 0.2627 | 0.3966 | 0.7293 | 0.2373 |
| 480 | 0.5558 | 0.2056 | 0.3099 | 0.3130 | 0.1990 | 0.5029 | 0.2160 | 0.3742 | 0.7110 | 0.2079 |
| 490 | 0.5319 | 0.1499 | 0.2529 | 0.2874 | 0.1660 | 0.4501 | 0.1697 | 0.3537 | 0.6813 | 0.1808 |
| 500 | 0.5063 | 0.1081 | 0.2059 | 0.2650 | 0.1380 | 0.3998 | 0.1378 | 0.3321 | 0.6488 | 0.1567 |
| 510 | 0.4666 | 0.0811 | 0.1709 | 0.2386 | 0.1130 | 0.3563 | 0.1017 | 0.3034 | 0.6159 | 0.1383 |
| 520 | 0.4313 | 0.0650 | 0.1440 | 0.2146 | 0.0960 | 0.3163 | 0.0667 | 0.2601 | 0.5826 | 0.1263 |
| 530 | 0.4234 | 0.0556 | 0.1250 | 0.2039 | 0.0860 | 0.2921 | 0.0498 | 0.2212 | 0.5618 | 0.1179 |
| 540 | 0.4137 | 0.0497 | 0.1149 | 0.1957 | 0.0750 | 0.2803 | 0.0440 | 0.2028 | 0.5552 | 0.1123 |
| 550 | 0.3777 | 0.0460 | 0.1070 | 0.1818 | 0.0640 | 0.2679 | 0.0330 | 0.2011 | 0.5496 | 0.1112 |
| 560 | 0.3497 | 0.0437 | 0.0939 | 0.1699 | 0.0600 | 0.2494 | 0.0216 | 0.1934 | 0.5371 | 0.1172 |
| 570 | 0.3503 | 0.0422 | 0.0840 | 0.1653 | 0.0600 | 0.2384 | 0.0175 | 0.1905 | 0.5329 | 0.1274 |
| 580 | 0.3582 | 0.0411 | 0.0849 | 0.1620 | 0.0580 | 0.2424 | 0.0225 | 0.2040 | 0.5470 | 0.1314 |
| 590 | 0.3563 | 0.0403 | 0.0889 | 0.1592 | 0.0540 | 0.2530 | 0.0287 | 0.2202 | 0.5674 | 0.1218 |
| 600 | 0.3443 | 0.0402 | 0.0869 | 0.1603 | 0.0510 | 0.2587 | 0.0264 | 0.2316 | 0.5813 | 0.1047 |
| 610 | 0.3321 | 0.0403 | 0.0840 | 0.1625 | 0.0540 | 0.2551 | 0.0207 | 0.2389 | 0.5780 | 0.0948 |
| 620 | 0.3257 | 0.0405 | 0.0849 | 0.1567 | 0.0600 | 0.2518 | 0.0250 | 0.2363 | 0.5683 | 0.1031 |
| 630 | 0.3250 | 0.0411 | 0.0889 | 0.1494 | 0.0670 | 0.2608 | 0.0607 | 0.2389 | 0.5730 | 0.1381 |
| 640 | 0.3293 | 0.0421 | 0.0999 | 0.1517 | 0.0730 | 0.2862 | 0.1699 | 0.2616 | 0.5988 | 0.2049 |
| 650 | 0.3398 | 0.0436 | 0.1109 | 0.1752 | 0.0810 | 0.3173 | 0.3303 | 0.3096 | 0.6308 | 0.3012 |
| 660 | 0.3507 | 0.0465 | 0.1219 | 0.2338 | 0.0950 | 0.3454 | 0.4504 | 0.3765 | 0.6617 | 0.4194 |
| 670 | 0.3530 | 0.0500 | 0.1250 | 0.3285 | 0.1210 | 0.3540 | 0.5094 | 0.4350 | 0.6782 | 0.5432 |
| 680 | 0.3471 | 0.0563 | 0.1169 | 0.4486 | 0.1610 | 0.3437 | 0.5341 | 0.4732 | 0.6794 | 0.6554 |
| 690 | 0.3378 | 0.0643 | 0.1109 | 0.5697 | 0.2200 | 0.3317 | 0.5474 | 0.4861 | 0.6722 | 0.7434 |
| 700 | 0.3249 | 0.0809 | 0.1099 | 0.6689 | 0.2930 | 0.3358 | 0.5531 | 0.5004 | 0.6817 | 0.8153 |
| 710 | 0.3175 | 0.1038 | 0.1139 | 0.7277 | 0.3790 | 0.3418 | 0.5545 | 0.4983 | 0.6790 | 0.8546 |
| 720 | 0.3273 | 0.1370 | 0.1210 | 0.7616 | 0.4720 | 0.3626 | 0.5596 | 0.5115 | 0.7002 | 0.8799 |
| 730 | 0.3529 | 0.1749 | 0.1329 | 0.7780 | 0.5560 | 0.3802 | 0.5617 | 0.5121 | 0.7076 | 0.8893 |

| | Patch Number | | | | | | | | | |
|---|---|---|---|---|---|---|---|---|---|---|
| Wavelength (nm) | 161 | 162 | 163 | 164 | 165 | 166 | 167 | 168 | 169 | 170 |
| 380 | 0.3661 | 0.3619 | 0.1841 | 0.1181 | 0.2824 | 0.0300 | 0.2434 | 0.0840 | 0.2752 | 0.1157 |
| 390 | 0.4285 | 0.3630 | 0.2298 | 0.1314 | 0.3204 | 0.0329 | 0.2686 | 0.1289 | 0.2987 | 0.2064 |
| 400 | 0.4936 | 0.3917 | 0.2905 | 0.1452 | 0.3800 | 0.0357 | 0.2946 | 0.1810 | 0.3209 | 0.3537 |
| 410 | 0.5789 | 0.4204 | 0.4113 | 0.1623 | 0.5217 | 0.0399 | 0.3226 | 0.2119 | 0.3542 | 0.4585 |
| 420 | 0.6616 | 0.4312 | 0.5284 | 0.1785 | 0.6798 | 0.0421 | 0.3536 | 0.2119 | 0.3910 | 0.4789 |
| 430 | 0.6973 | 0.4191 | 0.5877 | 0.1871 | 0.7467 | 0.0408 | 0.3529 | 0.1969 | 0.4115 | 0.4628 |
| 440 | 0.7135 | 0.3852 | 0.6096 | 0.1860 | 0.7623 | 0.0388 | 0.3212 | 0.1720 | 0.4254 | 0.4321 |
| 450 | 0.7047 | 0.3390 | 0.5849 | 0.1768 | 0.7370 | 0.0357 | 0.2790 | 0.1469 | 0.4174 | 0.3942 |
| 460 | 0.6767 | 0.2971 | 0.5318 | 0.1613 | 0.6951 | 0.0317 | 0.2347 | 0.1250 | 0.3837 | 0.2502 |
| 470 | 0.6356 | 0.2593 | 0.4819 | 0.1386 | 0.6631 | 0.0275 | 0.1943 | 0.1029 | 0.3382 | 0.3144 |
| 480 | 0.5762 | 0.2200 | 0.4155 | 0.1179 | 0.6322 | 0.0236 | 0.1598 | 0.0909 | 0.2822 | 0.2751 |
| 490 | 0.4952 | 0.1966 | 0.3371 | 0.1013 | 0.5918 | 0.0203 | 0.1321 | 0.0769 | 0.2217 | 0.2392 |
| 500 | 0.4157 | 0.1798 | 0.2765 | 0.0853 | 0.5528 | 0.0175 | 0.1082 | 0.0679 | 0.1680 | 0.2086 |
| 510 | 0.3496 | 0.1561 | 0.2261 | 0.0712 | 0.5170 | 0.0153 | 0.0882 | 0.0600 | 0.1245 | 0.1875 |
| 520 | 0.3059 | 0.1418 | 0.1823 | 0.0606 | 0.4856 | 0.0138 | 0.0743 | 0.0590 | 0.0946 | 0.1710 |
| 530 | 0.2799 | 0.1457 | 0.1582 | 0.0539 | 0.4531 | 0.0129 | 0.0644 | 0.0540 | 0.0787 | 0.1565 |
| 540 | 0.2675 | 0.1470 | 0.1557 | 0.0495 | 0.4246 | 0.0122 | 0.0556 | 0.0520 | 0.0724 | 0.1481 |
| 550 | 0.2657 | 0.1359 | 0.1564 | 0.0465 | 0.4100 | 0.0120 | 0.0493 | 0.0520 | 0.0689 | 0.1488 |
| 560 | 0.2705 | 0.1364 | 0.1516 | 0.0450 | 0.4072 | 0.0120 | 0.0476 | 0.0530 | 0.0614 | 0.1530 |
| 570 | 0.2790 | 0.1601 | 0.1551 | 0.0453 | 0.4024 | 0.0122 | 0.0490 | 0.0520 | 0.0551 | 0.1521 |
| 580 | 0.2893 | 0.1807 | 0.1733 | 0.0481 | 0.3983 | 0.0125 | 0.0500 | 0.0520 | 0.0753 | 0.1483 |
| 590 | 0.3026 | 0.1774 | 0.1962 | 0.0536 | 0.4159 | 0.0133 | 0.0505 | 0.0510 | 0.1348 | 0.1534 |
| 600 | 0.3168 | 0.1717 | 0.2073 | 0.0607 | 0.4608 | 0.0144 | 0.0550 | 0.0550 | 0.1834 | 0.1826 |
| 610 | 0.3360 | 0.1828 | 0.2032 | 0.0681 | 0.5082 | 0.0163 | 0.0718 | 0.0679 | 0.2116 | 0.2365 |
| 620 | 0.3632 | 0.1986 | 0.1958 | 0.0754 | 0.5334 | 0.0191 | 0.1114 | 0.0899 | 0.2367 | 0.2888 |
| 630 | 0.3992 | 0.1954 | 0.2034 | 0.0862 | 0.5504 | 0.0234 | 0.1861 | 0.1289 | 0.2687 | 0.3346 |
| 640 | 0.4512 | 0.1769 | 0.2310 | 0.1029 | 0.5754 | 0.0293 | 0.2993 | 0.1580 | 0.3165 | 0.3880 |
| 650 | 0.5226 | 0.1701 | 0.2711 | 0.1266 | 0.6092 | 0.0373 | 0.4384 | 0.1879 | 0.3885 | 0.4518 |
| 660 | 0.6163 | 0.1980 | 0.3121 | 0.1581 | 0.6405 | 0.0475 | 0.5729 | 0.2249 | 0.4864 | 0.5233 |
| 670 | 0.7073 | 0.2708 | 0.3990 | 0.1967 | 0.6510 | 0.0605 | 0.6657 | 0.2600 | 0.5940 | 0.5859 |
| 680 | 0.7784 | 0.3828 | 0.3483 | 0.2430 | 0.6475 | 0.0771 | 0.7136 | 0.3029 | 0.6902 | 0.6404 |
| 690 | 0.8234 | 0.5140 | 0.3487 | 0.2930 | 0.6408 | 0.0960 | 0.7342 | 0.3509 | 0.7502 | 0.6737 |

APPENDIX A
Spectral Reflectance of 190 Test Colors

| | | | | | | | | | | |
|---|---|---|---|---|---|---|---|---|---|---|
| 700 | 0.8634 | 0.6503 | 0.3413 | 0.3453 | 0.6374 | 0.1155 | 0.7471 | 0.3959 | 0.8080 | 0.7146 |
| 710 | 0.8714 | 0.7532 | 0.3407 | 0.3996 | 0.6381 | 0.1366 | 0.7517 | 0.4440 | 0.8329 | 0.7286 |
| 720 | 0.8908 | 0.8214 | 0.3666 | 0.4489 | 0.6498 | 0.1555 | 0.7588 | 0.4840 | 0.8559 | 0.7570 |
| 730 | 0.8933 | 0.8503 | 0.4125 | 0.4953 | 0.6684 | 0.1745 | 0.7636 | 0.5230 | 0.8658 | 0.7648 |

| | Patch Number | | | | | | | | | |
|---|---|---|---|---|---|---|---|---|---|---|
| Wavelength (nm) | 171 | 172 | 173 | 174 | 175 | 176 | 177 | 178 | 179 | 180 |
| 380 | 0.3125 | 0.2139 | 0.1020 | 0.2843 | 0.2870 | 0.1276 | 0.1150 | 0.3409 | 0.1214 | 0.1916 |
| 390 | 0.3472 | 0.2411 | 0.1548 | 0.3339 | 0.3160 | 0.2253 | 0.1260 | 0.3934 | 0.1852 | 0.2258 |
| 400 | 0.3795 | 0.2563 | 0.2194 | 0.3786 | 0.3450 | 0.4135 | 0.1380 | 0.4387 | 0.2725 | 0.2856 |
| 410 | 0.4266 | 0.2646 | 0.2560 | 0.4424 | 0.4740 | 0.5976 | 0.1900 | 0.5056 | 0.3274 | 0.4558 |
| 420 | 0.4753 | 0.2529 | 0.2618 | 0.5077 | 0.5020 | 0.6571 | 0.2010 | 0.5762 | 0.3431 | 0.6272 |
| 430 | 0.5003 | 0.2310 | 0.2551 | 0.5498 | 0.4940 | 0.6598 | 0.1980 | 0.6140 | 0.3362 | 0.6882 |
| 440 | 0.5188 | 0.2081 | 0.2451 | 0.5733 | 0.4740 | 0.6551 | 0.1900 | 0.6298 | 0.3177 | 0.7010 |
| 450 | 0.5138 | 0.1758 | 0.2336 | 0.5662 | 0.4500 | 0.6482 | 0.1800 | 0.6048 | 0.2935 | 0.6725 |
| 460 | 0.4842 | 0.1622 | 0.2212 | 0.5282 | 0.4240 | 0.6394 | 0.1700 | 0.5413 | 0.2664 | 0.6322 |
| 470 | 0.4422 | 0.1458 | 0.2072 | 0.4673 | 0.3920 | 0.6331 | 0.1570 | 0.4594 | 0.2405 | 0.6081 |
| 480 | 0.3898 | 0.1208 | 0.1912 | 0.3865 | 0.3610 | 0.6176 | 0.1440 | 0.3680 | 0.2129 | 0.5850 |
| 490 | 0.3270 | 0.0967 | 0.1816 | 0.3052 | 0.3330 | 0.5975 | 0.1330 | 0.2809 | 0.1878 | 0.5583 |
| 500 | 0.2680 | 0.0746 | 0.1721 | 0.2448 | 0.3070 | 0.5819 | 0.1230 | 0.2184 | 0.1682 | 0.5388 |
| 510 | 0.2166 | 0.0603 | 0.1575 | 0.2131 | 0.2900 | 0.5648 | 0.1160 | 0.1833 | 0.1499 | 0.5051 |
| 520 | 0.1774 | 0.0523 | 0.1462 | 0.2063 | 0.2770 | 0.5326 | 0.1110 | 0.1706 | 0.1277 | 0.4727 |
| 530 | 0.1542 | 0.0445 | 0.1471 | 0.2027 | 0.2630 | 0.5038 | 0.1050 | 0.1632 | 0.1108 | 0.4592 |
| 540 | 0.1448 | 0.0376 | 0.1489 | 0.1944 | 0.2560 | 0.5031 | 0.1020 | 0.1540 | 0.1069 | 0.4595 |
| 550 | 0.1382 | 0.0362 | 0.1402 | 0.1996 | 0.2600 | 0.5193 | 0.1040 | 0.1571 | 0.1095 | 0.4479 |
| 560 | 0.1260 | 0.0393 | 0.1385 | 0.2301 | 0.2710 | 0.5272 | 0.1080 | 0.1786 | 0.1092 | 0.4306 |
| 570 | 0.1130 | 0.0406 | 0.1627 | 0.2984 | 0.2790 | 0.5490 | 0.1120 | 0.2278 | 0.1159 | 0.4426 |
| 580 | 0.1420 | 0.0383 | 0.2068 | 0.4066 | 0.2850 | 0.6005 | 0.1140 | 0.3175 | 0.1449 | 0.5318 |
| 590 | 0.2235 | 0.0411 | 0.2396 | 0.5122 | 0.3030 | 0.6500 | 0.1210 | 0.4353 | 0.1997 | 0.6681 |
| 600 | 0.2844 | 0.0608 | 0.2511 | 0.5503 | 0.3570 | 0.6815 | 0.1430 | 0.5644 | 0.2789 | 0.7634 |
| 610 | 0.3170 | 0.1132 | 0.2534 | 0.5343 | 0.4450 | 0.6952 | 0.1780 | 0.7079 | 0.3872 | 0.8050 |
| 620 | 0.3447 | 0.1914 | 0.2526 | 0.5164 | 0.5420 | 0.6996 | 0.2170 | 0.8113 | 0.5071 | 0.8225 |
| 630 | 0.3802 | 0.2595 | 0.2508 | 0.5136 | 0.6200 | 0.7002 | 0.2480 | 0.8610 | 0.6080 | 0.8314 |
| 640 | 0.4297 | 0.3054 | 0.2482 | 0.5152 | 0.6650 | 0.7006 | 0.2660 | 0.8835 | 0.6776 | 0.8374 |
| 650 | 0.5014 | 0.3583 | 0.2462 | 0.5195 | 0.6930 | 0.6981 | 0.2770 | 0.8888 | 0.7253 | 0.7427 |
| 660 | 0.5937 | 0.4435 | 0.2434 | 0.5435 | 0.7110 | 0.6985 | 0.2840 | 0.8950 | 0.7552 | 0.8451 |
| 670 | 0.6874 | 0.5492 | 0.2406 | 0.5749 | 0.7230 | 0.6980 | 0.2890 | 0.9024 | 0.7745 | 0.8458 |
| 680 | 0.7638 | 0.6440 | 0.2385 | 0.6084 | 0.7300 | 0.6948 | 0.2920 | 0.9061 | 0.7888 | 0.8483 |
| 690 | 0.8069 | 0.7043 | 0.2376 | 0.6374 | 0.7350 | 0.6867 | 0.2940 | 0.8983 | 0.8014 | 0.8500 |
| 700 | 0.8480 | 0.7386 | 0.2344 | 0.6708 | 0.7390 | 0.6919 | 0.2960 | 0.9091 | 0.8110 | 0.8518 |
| 710 | 0.8630 | 0.7542 | 0.2322 | 0.6761 | 0.7430 | 0.6797 | 0.2970 | 0.9024 | 0.8214 | 0.8512 |
| 720 | 0.8831 | 0.7680 | 0.2296 | 0.6786 | 0.7470 | 0.6889 | 0.2990 | 0.9129 | 0.8240 | 0.8496 |
| 730 | 0.8884 | 0.7733 | 0.2266 | 0.6786 | 0.0000 | 0.6812 | 0.0000 | 0.9103 | 0.8268 | 0.8475 |

| | Patch Number | | | | | | | | | |
|---|---|---|---|---|---|---|---|---|---|---|
| Wavelength (nm) | 181 | 182 | 183 | 184 | 185 | 186 | 187 | 188 | 189 | 190 |
| 380 | 0.1117 | 0.3290 | 0.4675 | 0.3252 | 0.1255 | 0.3348 | 0.2687 | 0.4874 | 0.0000 | 0.0000 |
| 390 | 0.1162 | 0.3300 | 0.4689 | 0.3578 | 0.2167 | 0.3358 | 0.2695 | 0.4888 | 0.0832 | 0.1279 |
| 400 | 0.1230 | 0.3407 | 0.4908 | 0.3837 | 0.3668 | 0.3415 | 0.2452 | 0.4999 | 0.1190 | 0.2232 |
| 410 | 0.1308 | 0.3507 | 0.5174 | 0.4278 | 0.4682 | 0.3523 | 0.2044 | 0.5168 | 0.1587 | 0.3418 |
| 420 | 0.1340 | 0.3568 | 0.5285 | 0.4749 | 0.4795 | 0.3643 | 0.1639 | 0.5319 | 0.1815 | 0.4226 |
| 430 | 0.1243 | 0.3510 | 0.5214 | 0.4959 | 0.4676 | 0.3758 | 0.1284 | 0.5444 | 0.1813 | 0.4560 |
| 440 | 0.1025 | 0.3346 | 0.4991 | 0.5005 | 0.4565 | 0.3841 | 0.1003 | 0.5527 | 0.1655 | 0.4588 |
| 450 | 0.0784 | 0.3109 | 0.4648 | 0.4740 | 0.4433 | 0.3879 | 0.0786 | 0.5561 | 0.1428 | 0.4469 |
| 460 | 0.0601 | 0.2844 | 0.4307 | 0.4198 | 0.4313 | 0.3848 | 0.0622 | 0.5531 | 0.1158 | 0.4239 |
| 470 | 0.0475 | 0.2584 | 0.3957 | 0.3548 | 0.4246 | 0.3768 | 0.0508 | 0.5439 | 0.0861 | 0.3898 |
| 480 | 0.0373 | 0.2300 | 0.3563 | 0.2877 | 0.4040 | 0.3639 | 0.0416 | 0.5265 | 0.0582 | 0.3465 |
| 490 | 0.0312 | 0.2048 | 0.3331 | 0.2265 | 0.3741 | 0.3518 | 0.0344 | 0.5043 | 0.0368 | 0.2977 |
| 500 | 0.0280 | 0.1846 | 0.3169 | 0.1827 | 0.3549 | 0.3377 | 0.0287 | 0.4790 | 0.0240 | 0.2506 |
| 510 | 0.0253 | 0.1668 | 0.2906 | 0.1612 | 0.3392 | 0.3252 | 0.0252 | 0.4531 | 0.0177 | 0.2100 |
| 520 | 0.0235 | 0.1507 | 0.2755 | 0.1578 | 0.3058 | 0.3212 | 0.0237 | 0.4316 | 0.0150 | 0.1785 |
| 530 | 0.0231 | 0.1412 | 0.2897 | 0.1565 | 0.2755 | 0.3215 | 0.0229 | 0.4177 | 0.0140 | 0.1587 |
| 540 | 0.0236 | 0.1408 | 0.3028 | 0.1532 | 0.2763 | 0.3195 | 0.0228 | 0.4129 | 0.0142 | 0.1495 |
| 550 | 0.0241 | 0.1435 | 0.2960 | 0.1635 | 0.3023 | 0.3212 | 0.0244 | 0.4202 | 0.0148 | 0.1519 |
| 560 | 0.0246 | 0.1474 | 0.3099 | 0.2025 | 0.3226 | 0.3396 | 0.0303 | 0.4509 | 0.0167 | 0.1699 |
| 570 | 0.0269 | 0.1584 | 0.3774 | 0.2856 | 0.3554 | 0.3809 | 0.0460 | 0.5166 | 0.0226 | 0.2114 |
| 580 | 0.0334 | 0.1845 | 0.4717 | 0.4280 | 0.4367 | 0.4264 | 0.0783 | 0.6268 | 0.0388 | 0.2849 |
| 590 | 0.0505 | 0.2344 | 0.5346 | 0.6051 | 0.5450 | 0.4518 | 0.1198 | 0.7718 | 0.0804 | 0.3898 |
| 600 | 0.0885 | 0.3060 | 0.5603 | 0.7468 | 0.6482 | 0.4587 | 0.1505 | 0.8989 | 0.1577 | 0.5022 |
| 610 | 0.1464 | 0.3880 | 0.5850 | 0.8283 | 0.7211 | 0.4606 | 0.1630 | 0.9572 | 0.2728 | 0.6009 |
| 620 | 0.1987 | 0.4723 | 0.6047 | 0.8618 | 0.7625 | 0.4638 | 0.1660 | 0.9651 | 0.3976 | 0.6656 |
| 630 | 0.2280 | 0.5432 | 0.5972 | 0.8754 | 0.7868 | 0.4659 | 0.1686 | 0.9643 | 0.5026 | 0.6998 |
| 640 | 0.2466 | 0.5862 | 0.5714 | 0.8872 | 0.7998 | 0.4616 | 0.1773 | 0.9589 | 0.5793 | 0.7258 |

APPENDIX A
Spectral Reflectance of 190 Test Colors

| | | | | | | | | | | |
|---|---|---|---|---|---|---|---|---|---|---|
| 650 | 0.2772 | 0.6117 | 0.5611 | 0.8904 | 0.8045 | 0.4578 | 0.1981 | 0.9435 | 0.6372 | 0.7243 |
| 660 | 0.3343 | 0.6477 | 0.5923 | 0.8983 | 0.8094 | 0.4651 | 0.2360 | 0.9255 | 0.6719 | 0.7264 |
| 670 | 0.4123 | 0.6965 | 0.6599 | 0.9036 | 0.8110 | 0.4883 | 0.2923 | 0.9084 | 0.6955 | 0.7273 |
| 680 | 0.4951 | 0.7408 | 0.7351 | 0.9087 | 0.8089 | 0.5300 | 0.3655 | 0.8926 | 0.7106 | 0.7266 |
| 690 | 0.5638 | 0.7704 | 0.7920 | 0.9020 | 0.8021 | 0.5872 | 0.4492 | 0.7857 | 0.7263 | 0.7288 |
| 700 | 0.6139 | 0.7927 | 0.8335 | 0.9141 | 0.8113 | 0.6547 | 0.5417 | 0.8677 | 0.7301 | 0.7259 |
| 710 | 0.6416 | 0.7963 | 0.8438 | 0.9074 | 0.7985 | 0.7091 | 0.6211 | 0.8478 | 0.7295 | 0.7239 |
| 720 | 0.6623 | 0.8001 | 0.8467 | 0.9188 | 0.8117 | 0.7551 | 0.6875 | 0.8322 | 0.7355 | 0.7251 |
| 730 | 0.6784 | 0.8002 | 0.8443 | 0.9145 | 0.8045 | 0.7806 | 0.7218 | 0.8219 | 0.7337 | 0.7185 |

What is claimed is:

1. A method of producing an electronic image comprising:

a) providing a photographic element that records exposure information, comprised of a support and three image-recording units coated upon said support, each image recording unit containing at least one silver halide emulsion layer, wherein said exposure information is recorded in the three image recording units and wherein the spectral sensitivities of said image recording units are chosen such that the average color error, $\overline{\Delta E^*}_{ab}$, is less than or equal to 3.1, wherein said $\overline{\Delta E^*}_{ab}$ is computed for a specified set of 190 test colors of known spectral reflectance at 10 nm increments, and the light source is specified as $D_{65}$, and wherein said $\overline{\Delta E^*}_{ab}$ is the average CIE 1976 (L*a*b*) $\Delta E *_{ab}$ between the CIE 1976 (L*a*b*)-space coordinates of said test colors and the CIE 1976 (L*a*b*)-space coordinates corresponding to transformed exposure signals, wherein said transformed exposure signals are formed by applying an exposure-space matrix to the exposure signals derived from said photographic element to transform said derived exposure signals to exposure signals corresponding to the color-matching functions of the CCIR Recommendation 709 primary set, and wherein said exposure-space matrix is derived so as to minimize $$\sum_i (\Delta E^*_{ab_i})^2,$$

and noise-gain factor, $\Psi$, defined as the sum of the square roots of the sum of the squares of each row of the elements in the exposure space matrix is less than or equal to 6.5;

b) photographically processing said photographic element to produce image-bearing density records;

c) scanning said image-bearing density records on a pixel-wise basis with an opto-electronic scanner to produce image-bearing electronic signals;

d) digitizing said image-bearing electronic signals; and e) producing the electronic image from said electronic image-bearing signals.

2. A method of producing the electronic image according to claim 1 further including compensating for optical crosstalk between image-bearing electronic signals.

3. A method of producing the electronic image according to claim 1 further including compensating for chemical crosstalk between image-beating electronic signals.

4. A method of producing the electronic image according to claim 1 further including converting density-dependent signals into corresponding exposure-dependent signals.

5. A method of producing the electronic image according to claim 1 further converting image-bearing electronic signals into a second set of image-bearing signals corresponding to an image recorded by a second image capture device of different imaging capabilities, specifically, said image capture device having different spectral sensitivities.

6. A method of producing the electronic image according to claim 1 further expressing the image-bearing signals in terms of any CIE color space description.

7. A method of producing the electronic image according to claim 1 further compensating for differences between scanning devices.

8. A method of producing the electronic image according to claim 1 further including compressing the image-bearing electronic signals prior to storage.

9. A method of producing an electronic image comprising:

a) providing a photographic element that records exposure information, comprised of a support and three image-recording units coated upon said support, each image recording unit containing at least one silver halide emulsion layer, wherein said exposure information is recorded in the three image recording units and wherein the spectral sensitivities of said image recording units are chosen such that the average color error, $\overline{\Delta E^*}_{ab}$, is less than or equal to 3.1, wherein said $\overline{\Delta E^*}_{ab}$ is computed for a specified set of 190 test colors of known spectral reflectance at 10 nm increments, and the light source is specified as $D_{65}$, and wherein said $\overline{\Delta E^*}_{ab}$ is the average CIE 1976 (L*a*b*) $\Delta E *_{ab}$ between the CIE 1976 (L*a*b*)-space coordinates of said test colors and the CIE 1976 (L*a*b*)-space coordinates corresponding to transformed exposure signals, wherein said transformed exposure signals are formed by applying an exposure-space matrix to the exposure signals derived from said photographic element to transform said derived exposure signals to exposure signals corresponding to the color-matching functions of the CCIR Recommendation 709 primary set, and wherein said exposure-space matrix is derived so as to minimize $$\sum_i (\Delta E^*_{ab_i})^2,$$

and noise-gain factor, $\Psi$, defined as the sum of the square roots of the sum of the squares of each row of the elements in the exposure space matrix is less than or equal to 6.5;

b) photographically processing said photographic element to produce image-bearing density records;

c) scanning said image-bearing photographic element on a pixel-wise basis with an opto-electronic scanner to produce image-bearing electronic signals;

d) digitizing said image-bearing electronic signals;

e) converting said image-bearing electronic signals into density-representative electronic signals using a 1-dimensional look-up table;

f) subjecting said density-representative electronic signals to a matrix operation of at least three rows and three columns to produce a second set of density-representative electronic signals;

g) converting said second set of density-representative electronic signals into exposure-representative signals using three 1-dimensional look-up tables; and h) converting said exposure-representative electronic signals into a second set of exposure-representative signals using a matrix operation of at least 3 rows and 3 columns.

10. A method of producing the electronic image according to claim 9 further including the following steps:

i) converting said exposure-representative electronic signals into a second set of exposure-representative electronic signals corresponding to image signals captured by an exposure recording device having spectral sensitivities corresponding to color matching functions for the intended output device by means of a matrix operation of at least 3 rows and 3 columns;

ii) converting said second set of exposure-representative signals into a set of output image-representative signals using three 1-dimensional look-up tables; and iii) subjecting said output image representative signals to a matrix operation of at least 3 rows and 3 columns to produce a second set of output image representative signals.

11. A method of producing an electronic image comprising:

a) providing a photographic element that records exposure information, comprised of a support and three image recording units coated upon said support, each image recording unit containing at least one silver halide emulsion layer, wherein said exposure information is recorded in the three image recording units and wherein the spectral sensitivities of said image recording units are chosen such that the average color error, $\overline{\Delta E^*}_{ab}$, is less than or equal to 3.1, wherein said $\overline{\Delta E^*}_{ab}$ is computed for a specified set of 190 test colors of known spectral reflectance at 10 nm increments, and the light source is specified as $D_{65}$, and wherein said $\overline{\Delta E^*}_{ab}$ is the average CIE 1976 (L*a*b*) $\Delta E^*_{ab}$ between the CIE 1976 (L*a*b*)-space coordinates of said test colors and the CIE 1976 (L*a*b*)-space coordinates corresponding to transformed exposure signals, wherein said transformed exposure signals to formed by applying an exposure-space matrix to the exposure signals derived from said photographic element to transform said derived exposure signals to exposure signals corresponding to the color-matching functions of the CCIR Recommendation 709 primary set, and wherein said exposure-space matrix is derived so as to minimize $$\sum_i (\Delta E^*_{ab_i})^2,$$

and noise-gain factor, $\Psi$, defined as the sum of the square roots of the sum of the squares of each row of the elements in the exposure space matrix is less than or equal to 6.5:

b) photographically processing said photographic element to produce image-bearing density records;

c) scanning said image-bearing photographic element on a pixel-wise basis with an opto-electronic scanner to produce image-bearing electronic signals;

d) digitizing said image-bearing electronic signals;

e) converting said image-bearing electronic signals into a set of exposure-representative electronic signals using a 3-dimensional look-up table.

12. A method of producing the electronic image according to claim 11 further including the following steps:

i) converting said exposure-representative electronic signals into a second set of exposure-representative electronic signals corresponding to image signals captured by an exposure recording device having spectral sensitivities corresponding to color matching functions for the intended output device by means of a matrix operation of at least 3 rows and 3 columns;

ii) converting said second set of exposure-representative signals into a set of output image-representative signals using three 1-dimensional look-up tables; and iii) subjecting said output image representative signals to a matrix operation of at least 3 rows and 3 columns to produce a second set of output image representative signals.

13. A method of producing an electronic image comprising:

a) providing a photographic element that records exposure information, comprised of a support and three image-recording units coated upon said support, each image recording unit containing at least one silver halide emulsion layer, wherein said exposure information is recorded in the three image recording units used in combination with a means of optical filtration external to said photographic element, wherein the spectral sensitivities of said image recording units are chosen such that the average color error, $\overline{\Delta E^*}_{ab}$, is less than or equal to 3.1, wherein said $\overline{\Delta E^*}_{ab}$ is computed for a specified set of 190 test colors of known spectral reflectance at 10 nm increments, and the light source is specified as $D_{65}$, and wherein said $\overline{\Delta E^*}_{ab}$ is the average CIE 1976 (L*a*b*) $\Delta E^*_{ab}$ between the CIE 1976 (L*a*b*)-space coordinates of said test colors and the CIE 1976 (L*a*b*)-space coordinates corresponding to transformed exposure signals, wherein said transformed exposure signals are formed by applying an exposure-space matrix to the exposure signals derived from said photographic element to transform said derived exposure signals to exposure signals corresponding to the color-matching functions of the CCIR Recommendation 709 primary set, and wherein said exposure-space matrix is derived so as to minimize $$\sum_i (\Delta E^*_{ab_i})^2,$$

and noise-gain factor, $\Psi$, defined as the sum of the square roots of the sum of the squares of each row of the elements in the exposure space matrix is less than or equal to 6.5;

b) recording an image of an object illuminated by scene illumination and optical filtration in the photographic element;

c) photographically processing said photographic element to produce image-bearing density records;

d) scanning said image-bearing density records on a pixel-wise basis with an opto-electronic scanner to produce image-bearing electronic signals;

e) digitizing said image-bearing electronic signals; and f) producing the electronic image from said electronic image-bearing signals.

14. A method of producing the electronic image according to claim 13 wherein said means of optical filtration is located between the recorded object and the photographic element.

15. A method of producing the electronic image according to claim 14 wherein said means of optical filtration is a transparent sheet having spectrally selective transmission.

16. A method of producing the electronic image according to claim 14 wherein said means of optical filtration is a solution having spectrally selective absorption contained in a transparent cell.

17. A method of producing the electronic image according to claim 14 wherein said means of optical filtration is a solution having spectrally selective absorption contained in a transparent filter cell in combination with a transparent sheet having spectrally selective transmission.

18. A method of producing the electronic image according to claim 13 wherein said means of optical filtration is located between the source of scene illumination and the recorded object.

19. A method of producing the electronic image according to claim 18 wherein said means of optical filtration is a transparent sheet having spectrally selective transmission.

* * * * *